(12) United States Patent
Fehrenbach et al.

(10) Patent No.: US 11,438,736 B2
(45) Date of Patent: Sep. 6, 2022

(54) UE GROUPS, UE GROUP MANAGER UES AND UE GROUP MEMBER UES

(71) Applicant: Fraunhofer-Gesellschaft zur Foerderung der angewandten Forschung e.V., Munich (DE)

(72) Inventors: Thomas Fehrenbach, Berlin (DE); Thomas Wirth, Kleinmachnow (DE); Cornelius Hellge, Berlin (DE); Robin Thomas, Berlin (DE); Thomas Schierl, Berlin (DE); Lars Thiele, Berlin (DE); Eiko Seidel, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/672,297

(22) Filed: Nov. 1, 2019

(65) Prior Publication Data

US 2020/0092685 A1    Mar. 19, 2020

Related U.S. Application Data

(63) Continuation of application No. PCT/EP2018/061391, filed on May 3, 2018.

(30) Foreign Application Priority Data

May 4, 2017    (EP) .................................... 17169604

(51) Int. Cl.
*H04W 4/08*    (2009.01)
*H04W 4/46*    (2018.01)
(Continued)

(52) U.S. Cl.
CPC ............... *H04W 4/08* (2013.01); *H04W 4/46* (2018.02); *H04W 36/08* (2013.01); *H04W 36/18* (2013.01);
(Continued)

(58) Field of Classification Search
CPC ... H04W 76/27; H04W 72/042; H04W 76/15; H04W 48/16; H04W 48/12; H04W 76/19;
(Continued)

(56) References Cited

U.S. PATENT DOCUMENTS

| 2004/0127214 A1* | 7/2004 | Reddy ................... H04W 88/06 |
| | | 455/426.2 |
| 2011/0038301 A1 | 2/2011 | Park |

(Continued)

FOREIGN PATENT DOCUMENTS

| EP | 3125643 A1 | 2/2017 | |
| WO | WO-2012041048 A1 * | 4/2012 | .............. H04M 3/00 |

(Continued)

OTHER PUBLICATIONS

"Design details for light connection model A", 3GPP TSG-RAN WG2 Meeting #96 R2-168345, Reno, USA, Nov. 14-18, 2016, Agenda item: 8.9.2, Source: Qualcomm Incorporated, Nov. 14, 2016.

(Continued)

*Primary Examiner* — Daniel Lai
(74) *Attorney, Agent, or Firm* — Perkins Coie LLP; Michael A. Glenn

(57) ABSTRACT

The present invention concerns a novel form of communication within a cellular wireless communication network. One aspect of the invention concerns a User Equipment for a cellular network, wherein the UE inter alia includes a first interface for UE-to-Basestation communication configured to communicate with a base station of the cellular network and a second interface for UE-to-UE communication configured to communicate with one or more other UEs of a UE-Group to which the UE belongs. According to the invention the UE is configured to receive via its first interface configuration data for configuring its second inter- (Continued)

face, and to coordinate, via the second interface, a communication within the UE Group.

19 Claims, 23 Drawing Sheets

(51) Int. Cl.
| | |
|---|---|
| *H04W 76/27* | (2018.01) |
| *H04W 36/08* | (2009.01) |
| *H04W 36/18* | (2009.01) |
| *H04W 68/00* | (2009.01) |
| *H04W 92/10* | (2009.01) |
| *H04W 92/18* | (2009.01) |

(52) U.S. Cl.
CPC ......... *H04W 68/005* (2013.01); *H04W 76/27* (2018.02); *H04W 92/10* (2013.01); *H04W 92/18* (2013.01)

(58) Field of Classification Search
CPC ............ H04W 48/20; H04W 72/0413; H04W 72/0446; H04W 36/08; H04W 72/14; H04W 76/11; H04W 88/06; H04W 72/0406; H04W 72/0453; H04W 72/048; H04W 76/14; H04W 36/0069; H04W 4/40; H04W 48/10; H04W 52/0216; H04W 76/10; H04W 76/30; H04W 8/08; H04W 36/0055; H04W 36/305; H04W 72/0493; H04W 72/10; H04W 72/1284; H04W 72/1289; H04W 74/006; H04W 84/042; H04W 8/186; H04W 24/02; H04W 24/04; H04W 28/0268; H04W 28/0278; H04W 36/0094; H04W 4/44; H04W 4/80; H04W 4/90; H04W 72/02; H04W 88/02; H04W 88/04; H04W 88/08; H04W 88/10; H04W 8/005; H04W 92/18; H04W 36/0005; H04W 36/0016; H04W 36/0033; H04W 36/0066; H04W 36/0072; H04W 36/0077; H04W 36/0083; H04W 36/00837; H04W 36/14; H04W 36/24; H04W 40/24; H04W 48/18; H04W 4/08; H04W 72/04; H04W 72/1268; H04W 72/1273; H04W 74/02; H04W 76/00; H04W 76/16; H04W 76/25; H04W 4/46; H04W 36/18; H04W 68/005; H04W 92/10; H04W 84/005; H04W 84/047; H04B 7/15507; H04B 7/2606
See application file for complete search history.

(56) References Cited

U.S. PATENT DOCUMENTS

| | | | |
|---|---|---|---|
| 2013/0046841 A1* | 2/2013 | Park | H04W 8/186 709/206 |
| 2013/0250843 A1* | 9/2013 | Zhou | H04L 1/1864 370/312 |
| 2014/0092833 A1* | 4/2014 | Vannithamby | H04L 5/0057 370/329 |
| 2015/0223217 A1* | 8/2015 | Chen | H04W 72/044 370/329 |
| 2016/0021526 A1* | 1/2016 | Niu | H04W 76/27 370/230 |
| 2016/0037322 A1* | 2/2016 | Nguyen | H04W 8/005 370/329 |
| 2016/0128053 A1* | 5/2016 | Wei | H04W 72/048 455/450 |
| 2016/0212682 A1 | 7/2016 | Chung et al. | |
| 2016/0373970 A1 | 12/2016 | Kulal | |
| 2017/0273055 A1* | 9/2017 | Xu | H04W 76/14 |
| 2019/0335348 A1* | 10/2019 | Hou | H04W 4/06 |

FOREIGN PATENT DOCUMENTS

| | | | |
|---|---|---|---|
| WO | WO-2015051843 A1 * | 4/2015 | ............ H04W 76/14 |
| WO | 2016129269 A2 | 8/2016 | |
| WO | 2018171941 A1 | 9/2018 | |

OTHER PUBLICATIONS

"Discussion on PC5 handover and Uu handover for V2X", 3GPP TSG-RAN2#93bis, R2-162488, Dubrovnik, Republic of Croatia, Apr. 11-15, 2016, Source: ITRI, National Taiwan University, Apr. 11, 2016.
"Introduction of V2X feature in 26.300", 3GPP, Change Request: Addition of Features.
3GPP TS 36.300 V13.4.0 (Jun. 2016) 3rd Generation Partnership Project;Technical Specification Group Radio Access Network; Evolved Universal Terrestrial Radio Access (E-UTRA) and Evolved Universal Terrestrial Radio Access Network (E-UTRAN), Jun. 2016. Uploaded in 2 parts.
"Study on enhancement of 3GPP Support for 5G V2X Services (Release 15)", 3GPP TR 22.886 V15.1.0 (Mar. 2017), 3rd Generation Partnership Project; Technical Specification Group Services and System Aspects, Mar. 2017.
Schlienz, J et al., "Device to Device Communication in LTE", Whitepaper, Rodhe-Schwarz, pp. 1-36, pp. 1-36.
"Group Mobility Procedures", 3GPP, 3GPP Technical Contribution, R2-1703469.

* cited by examiner

UE GROUPS, UE GROUP MANAGER UES AND UE GROUP MEMBER UES

CROSS-REFERENCES TO RELATED APPLICATIONS

This application is a continuation of copending International Application No. PCT/EP2018/061391, filed May 3, 2018, which is incorporated herein by reference in its entirety, and additionally claims priority from European Application No. EP 17 169 604.0, filed May 4, 2017, which is incorporated herein by reference in their entirety.

BACKGROUND OF THE INVENTION

The present invention is concerned with a novel concept of communication between one or more user equipments within a radio cell served by a base station of a wireless communication network.

Embodiments of the present invention relate to a User Equipment (UE) being able to act as a Group Manager UE having the features of claim 1, to a User Equipment being able to act as a Group Member UE, a base station for providing UE Group Functionality having the features of claim 17, and a wireless communication network having the features of claim 19.

SUMMARY

According to an embodiment, a User Equipment—UE— for a cellular network may have a first interface for UE-to-Basestation communication configured to communicate with a base station of the cellular network, and a second interface for UE-to-UE communication configured to communicate with one or more other UEs of a UE-Group to which the UE belongs, wherein the UE is configured to receive via its first interface configuration data for configuring its second interface, and to coordinate, via the second interface, a communication within the UE Group.

According to another embodiment, a User Equipment— UE—for a cellular network may have a first interface for UE-to-Basestation communication configured to communicate with a base station of the cellular network, and a second interface for UE-to-UE communication configured to communicate with one or more other UEs of a UE Group to which the UE belongs, wherein the UE is configured to communicate via its second interface with at least one or more of the other UEs of the UE Group, wherein the communication is coordinated by a predetermined UE of the UE Group.

According to another embodiment, a base station for a cellular network may be configured to communicate with one or more User Equipments—UEs—of a UE Group, wherein the base station has a first mode in which the base station coordinates the communication with the one or more UEs of the UE Group, and a second mode in which the base station is configured to appoint a predetermined UE for coordinating the communication within the UE Group.

According to another embodiment, a cellular network may have inventive UEs and an inventive base station.

A communication network may comprise a base station, also called eNB or gNB, serving a radio cell. Within said radio cell one or more User Equipments, also called UE, may reside. UEs may be stationary or moving. Examples of stationary UEs are, for instance, sensors in a sensor network. Examples of moving UEs are, for instance, vehicles being equipped with communication interfaces.

One example of such a vehicle scenario is called V2X, which stands for Vehicle-to-Everything. This could be, for example, a vehicle communicating with a base station, with a roadside unit or the like. Communication between individual vehicles may also be possible, which is referred to as V2V, Vehicle-to-Vehicle Communication.

For the ease of explaining the concept of the present invention, reference will often be made to such V2X and V2V communication scenarios. However, this will only be used as a non-limiting example. Further non-limiting examples may be IoT-Devices (IoT: Internet of Things) and clusters thereof, drones, e.g. flying in a swarm, smartphones on a plane, bus or any kind of public safety or the like. In more general terms, the present invention is to be understood as covering any mobile or stationary network scenarios.

However, before the present invention shall be described in more detail, reference is made to FIG. 10 which shows a communication network according to the conventional technology. It contains a base station 1 and one or more User Equipments 2, 3, 4, 5 which are exemplarily depicted as moving vehicles.

An User Equipment 2, 3, 4, 5 will in the following also be referred to as an UE. A base station will in the following also be referred to as eNB or gNB.

The UEs 2, 3, 4, 5 may interact with the eNB 1 via a communication link protocol which is depicted by means of the arrows in dashed lines. This may also be referred to as Uu (eNB-UE-link) which describes a communication link between eNB and UE.

Communication between the individual UEs 2, 3, 4, 5 may also be possible, for instance, via a PC5 protocol which is depicted by means of the arrows in solid lines. This may also be referred to as side link. Via this side link the UEs 2, 3, 4, 5 may exchange user data.

For the large moving UE groups using V2X services the signaling overhead for Uu transmission as well as the PC5 scheduled mode becomes significant since each car 2, 3, 4, 5 has to request resources individually from each eNB 1 and gets resource assignments from the eNB 1 individually.

For each UE 2, 3, 4, 5 an uplink scheduling request need to be sent to the eNB 1 via an uplink control channel (e.g. PUCCH) assuming no data transmission was ongoing.

In the next step a scheduling decision is made by the base station 1 that is communicated via a downlink control channel (e.g. PDCCH) assigning resources. For V2X services resources on the uplink might be assigned, for V2V services to other moving UEs PC5-resources might be assigned.

Since the PDCCH control channel has to be reliable a strong coding has to be applied, so the resource assignment might be as big as the data packet itself. Particularly in dense automotive scenarios this generates too much overhead and congestion on the downlink or the side link might be a consequence.

Link adaptation also requires Channel State Information (CSI) to be sent to the base station 1 from every UE 2, 3, 4, 5 with an ongoing data transmission. In 5G, MIMO and beam forming will be used requiring other control information such as rank indicator or pre-coding information. To avoid excessive overhead in the uplink such signaling is minimized which reduces link adaptation performance and beam forming accuracy particularly for moving UEs 2, 3, 4, 5.

Furthermore, to support the eNB resource assignment (scheduling decisions) for V2V sidelink communication, further side information needs to be sent to the base station 1 in the uplink via a control channel (e.g. RRC assistance information or at application layer to the V2X server). Among others this might include UE positioning information (GPS or configured geographical zones) as well as speed and direction, suggestions for resource assignments (e.g. suggested patterns for Semi-Persistent Scheduling) to support eNB scheduling process, load information obtained by sensing (e.g. Channel Busy Ratio) to support eNB congestion control.

Due to the excessive signaling overhead the message sizes need to be very limited, reducing the accuracy and the periodicity of the signaling supporting the centralized control by the eNB 1.

Therefore in state of the art LTE V2X the autonomous mode is considered today to be more applicable for dense scenarios. The conventional technology suggests that decisions are made locally by the UEs 2, 3, 4, 5. This reduces the signaling overhead to or from the eNB 1, however, at the expense of radio efficiency. Radio resource assignments are based on local information that cannot take into account the overall information that is available to an eNB 1 providing a centralized control.

Thus, there is a need for providing a solution for an efficient communication between an eNB and one or more UEs within a radio network which solves the aforementioned problems of the conventional technology.

A first aspect of the invention concerns a User Equipment (UE) for a cellular network. Said UE comprises a first interface for UE-to-Basestation communication configured to communicate with a base station of the cellular network. The UE further comprises a second interface for UE-to-UE communication configured to communicate with one or more other UEs of a UE-Group to which the UE belongs. According to this aspect of the invention, the UE is configured to receive via its first interface configuration data for configuring its second interface, and to coordinate, via the second interface, a communication within the UE Group.

According to this first aspect of the invention, the UE may become a Group Manager UE which manages the UE Group and the communication of the members (UEs) within its UE Group. Said members of the UE-Group may on the other hand be referred to as Group-Member-User-Equipments, or Member-UEs. The communication of the group members may also be referred to as an intra-group-communication.

According to the invention, the Group Manager UE may coordinate the communication of the Group Member UEs within its UE Group. The Group Member UEs may also have such a second interface for UE-to-UE communication. Thus, the Group Member UEs may communicate with each other which may also be referred to as a side link communication.

In common networks, the eNB controls the side link communication, for instance, by assigning required resources to each of the UEs. Therefore, each UE has to be connected to the eNB.

However, according to the present invention, the above described Group Manager UE coordinates the communication within the UE Group. In other words, the Group Manager UE may coordinate the side link communication between itself and one or more Group Member UEs and/or the side link communication between one or more Group Member UEs.

That is, the inventive Group Manager UE takes over the coordination tasks that may have previously been handled by the eNB.

In order to be able to take over these tasks, the Group Manager UE may receive configuration data from the base station via its first interface, e.g. via an Uu link. This configuration data may contain information for the Group Manager UE how to configure its second interface so as to provide group manager functions, e.g. to coordinate the intra-group communication with and/or between Group Member UEs of it UE Group.

So, the Group Manager UE coordinates the communication over the second interface. One could say, the Group Manager UE coordinates the communication on the side link by having its second interface appropriately configured in order to act as a Group Manager UE as he was told by the configuration data received from the eNB.

Thus, the coordination of the side link communication (i.e. UE-to-UE communication via the second interface of an UE) is based on the configuration data that the Group Manager UE may have received from the eNB.

For example, the Group Manager UE may also send control information to one or more Group Member UEs to inform them how they should set up or configure their respective second interface.

According to an embodiment, the Group Manager UE (who now knows that he is to act as the Group Manger UE) may be configured to allocate physical resources regarding the second interface to one or more Group Member UEs so as to coordinate the communication with and/or between the Group Member UEs. Said physical resources can be, for instance, in the code, spatial, time or frequency domain, which domains may also be switched during operation. Physical resources may also be ISM spectrum or dedicated V2V spectrum (e.g. VTS spectrum).

As mentioned before, the configuration data may inform the Group Manager UE how to set up his second communication interface to be in a condition to act as a Group Manager UE. If the Group Manager UE has configured its second interface appropriately so that the Group Manager UE can act as such (i.e. having group management functionality), he may then begin to coordinate the side link communication within its UE Group. For example, the Group Manager UE may then assign available physical resources to the Group Member UEs that are within its UE Group.

Regarding the physical resources, the first and the second interface may use same, or different, or at least partially the same portions of physical resources.

A resource pool may be available or created which resource pool may contain one or more of these physical resources. These physical resources in turn may be assigned to the Group Member UEs, namely by the Group Manager UE.

For the resource pool creation and resource allocation, the following options may be possible according to the invention.

1. The base station may signal to all UEs within a UE Group a resource pool and the Group Manager UE may allocate the resources to the UEs within the UE Group. This may also be referred to as a scheduled mode.
2. The base station may signal to a UE Group a resource pool and may allocate resources to the UEs. Additionally or alternatively, the UEs of a UE Group may perform random access/LBT (Listen Before Talk). Any data from the UEs may be relayed via the Group Manager UE. This may also be referred to as a scheduled mode with relayed Uplink.
3. The Group Manager UE may signal to a UE Group the resource pool and resources may be allocated by the Group Manager UE to all the Group Member UEs. Additionally or alternatively, the Group Member UEs within a UE Group perform LBT (Listen Before Talk) or random access (e.g. for IoT Devices).

4. A geo location based resource assignment may be re-used, wherein the Group Manager UE may be configured to assign resources based on the database (typically provided by the base station).

According to yet a further embodiment, the above discussed physical resources may be pre-allocated by the cellular network. The resource pool may even be a globally agreed VTS frequency spectrum pool.

As an example, the above mentioned configuration data may have been provided to the Group Manager UE by the eNB, for example via the base stations downlink control information. Said configuration data may, for instance, comprise control/configuration information about how to set up and configure the second interface (e.g. side link).

This may include control/configuration information of the second interface of the Group Manager UE and maybe also of the respective second interface of the respective Group Member UEs, wherein the Group Manager UE may signal these control/configuration information to the respective Group Member UEs via a corresponding message via the second interface (e.g. side link message).

The configuration data may also include physical resources of the second interface (e.g. side link resources). The Group Manager UE may assign these resources to the Group Member UEs and/or may signal the respective allocated resources to the respective Group Member UE via its respective second interface. This may also be done by using a corresponding message via the second interface (e.g. side link message).

Accordingly, the Manager-UE may act as a manager for its UE-Group by assigning or coordinating physical resources (which may have been reserved or pre-allocated for this UE Group by the cellular network) to its Member-UEs in order to provide and coordinate intra-group-communication.

One could say, the Manager-UE overtakes the configuration and the resource management for its UE-Group which was previously handled by the eNB. In the conventional technology (FIG. 10) each UE has received control/configuration information (e.g. physical resources) individually from the eNB.

However, according to the present invention the Group Manager UE may have physical resources for the whole group which may have been provided to him in form of configuration data from the eNB. The Group Manager UE may signal this control/configuration information to the Group Member UEs within its UE Group, e.g. via the second interface (e.g. side link) thereby informing them that he is the Manager-UE who manages this UE-Group in which UE-to-UE communication is possible and that he is responsible for allocating and/or distributing the required network resources.

In other words, the Group Manager UE may overtake a function to coordinate side link communication within the group. Additionally or alternatively, the Group Manager UE may also coordinate communication of the Group Member UEs with the base station.

Due to the coordination between Group Member UEs of the UE-Group, messages can be sent per group and not per UE. Furthermore collisions between group members are avoided and resources are more efficiently coordinated by the Group Manager UE.

A second aspect of the invention concerns a UE for a cellular network, the UE comprising a first interface for UE-to-Basestation communication configured to communicate with a base station of the cellular network, and a second interface for UE-to-UE communication configured to communicate with one or more other UEs of a UE group to which the UE belongs. According to this aspect, the UE is configured to either receive predetermined data via the second interface, and to relay said predetermined data to the base station via the first interface, or to receive predetermined data via the first interface from the base station, and to relay said predetermined data via the second interface.

Accordingly, the UE of this aspect may serve as a Relay-UE that relays said predetermined data from the eNB to one or more of the Group Member UEs (downlink), or to relay said predetermined data from one or more of the Group Member UEs to the eNB (uplink). Said predetermined data may, for instance, be portions of the configuration data, any further control information and/or user data.

In the downlink scenario, the Relay-UE may receives control data and/or user data from the eNB via its first interface (e.g. Uu link). The Relay-UE may relay said data to one or more Group Member UEs via its second interface (e.g. side link).

In the uplink scenario, the Relay-UE may receive control data and/or user data from one or more Group Member UEs via its second interface (e.g. side link). The Relay-UE may relay said data to the eNB via its first interface (e.g. Uu link).

For example, services with small data transmissions such as V2X services, MTC/IoT services or voice services might be sent via the second interface (e.g. side link) to the Group Manager UE that may relay the data to the base station. This will provide latency benefits particularly if the UEs do not have ongoing data transmission. The link between the base station and the Group Manager UE can be more optimized since more feedback reporting can be done with positive impact on the accuracy of the link adaption, the beam forming and the transmission of HARQ ACK/NACKs.

According to a further aspect, the invention is concerned with a UE for a cellular network, wherein said UE comprises a first interface for UE-to-Basestation communication configured to communicate with a base station of the cellular network and a second interface for UE-to-UE communication configured to communicate with one or more other UEs of a UE Group to which the UE belongs. According to this aspect, the UE is configured to communicate via its second interface with at least one or more other UEs of the UE Group, wherein the communication is coordinated by a predetermined UE of the UE Group.

Said predetermined UE of the UE Group may be the above discussed Group Manager UE. Accordingly, this aspect of the inventive UE may describe a Group Member UE that is part of the UE Group managed by said Group Manager UE.

This Group Member UE may have two different communication modes. A first communication mode may be a legacy mode in which the communication is coordinated by the base station.

However, the Group Member UE of the present embodiment may have a second communication mode, namely the above mentioned communication mode in which the communication with and/or between other Group Member UEs is coordinated by the Group Manager UE of this UE Group.

The coordination may be realized as described above. Therefore, the Group Member UE of this embodiment may be configured to get assigned physical resources of the second interface from the Group Manager UE for a communication within the UE Group (e.g. side link communication).

For example, the Group Member UE may receive, via its second interface, control/configuration information from the Group Manager UE. From said control information the Group Member UE may derive or may get informed about configuration details of his second interface so as to communicate within the UE Group. Furthermore, the Group Member UE may derive or determine from said control information those physical resources that the Group Manager UE may have exclusively assigned to him.

Furthermore, according to this aspect any UE that may not yet be a member of a particular UE Group may also get enabled by the Group Manager UE to become a member of this UE Group. By receiving certain control/configuration information from the Group Manager UE via the second interface (e.g. side link), the UE becomes a Group Member UE.

According to still a further aspect, the invention is concerned with a UE for a cellular network, wherein said UE comprises a first interface for UE-to-Basestation communication configured to communicate with a base station of the cellular network and a second interface for UE-to-UE communication configured to communicate with one or more other UEs of a UE group to which the UE belongs. According to this aspect, the UE is configured to send predetermined data via the second interface in a manner relayed by a predetermined UE (e.g. Group Manager UE) to the base station. Additionally or alternatively, the UE is configured to receive predetermined data via the second interface in a manner relayed by a predetermined UE (e.g. Group Manager UE) from the base station.

According to this aspect, this UE is a Group Member UE which may communicate with the eNB via the Group Manager UE of its UE-Group, namely in such a manner that said Group Manager UE may relay the predetermined data (e.g. control data and/or user data) between the eNB and the Group Member UE in a way as already explained above.

That is, the Group Member UE may send predetermined data, which may, for instance, be control data or user data, via its second interface to the Group Manager UE of its UE Group, and said Group Manager UE may relay said predetermined data to the eNB (uplink).

This may also work in the other direction (downlink), wherein the Group Member UE may receive predetermined data from the eNB, said predetermined data being relayed by the Group Manager UE from the eNB to the Group Member UE. In other words, the Group Manager UE may receive said predetermined data from the eNB and may relay said predetermined data via the second interface to the one or more of the Group Member UEs.

According to yet a further aspect, the invention is concerned with a base station for a cellular network. Said base station is configured to communicate with one or more UEs of a UE Group. According to this inventive aspect, the base station comprises two communication modes. In a first mode the base station coordinates the communication with the one or more UEs of the UE Group. In a second mode the base station is configured to appoint a predetermined UE for coordinating the communication within the UE Group.

Said predetermined UE may be the above described Group Manager UE. That is, in the second mode, the base station may be configured to appoint a Group Manager UE. The base station may appoint one Group Manager UE for each UE Group individually, or more than one Group Manager UEs for each UE Group.

Furthermore, in the second mode the base station leaves the coordination of the communication within a UE Group to the Group Manager UE, i.e. the appointed Group Manager UE is responsible for coordinating the intra group communication.

This coordination may be done in the way as described above with respect to the Group Manager UEs or the Group Member UEs, respectively.

For example, according to a further embodiment, the base station may be configured to send configuration data to the appointed Group Manager UE, wherein said configuration data contains information for the appointed Group Manager UE how to configure its communication interface for a UE-to-UE communication (i.e. its second interface, e.g. side link) so as to coordinate the communication between the one or more UEs of the UE Group.

As an example, the base station may be configured to provide to the appointed Group Manager UE physical resources for the communication between the one or more Group Member UEs of the UE Group. The Group Manager may assign these resources to the Group Member UEs of its UE Group in a manner as described above.

Yet a further aspect of the invention concerns a base station for a cellular network, wherein said base station is configured to send predetermined data to a first UE (e.g. Group Member UE) of an UE Group via a second UE (e.g. Group Manager UE) of the UE Group in a manner relayed by the second UE (e.g. Group Manager UE). Additionally or alternatively, the base station of this aspect is configured to receive predetermined data from a first UE (e.g. Group Member UE) of the UE Group via a second UE (e.g. Group Manager UE) of the UE Group in a manner relayed by the second UE (e.g. Group Manager UE).

BRIEF DESCRIPTION OF THE DRAWINGS

Embodiments of the present invention will be detailed subsequently referring to the appended drawings, in which.

DETAILED DESCRIPTION OF THE INVENTION

Figure 1:
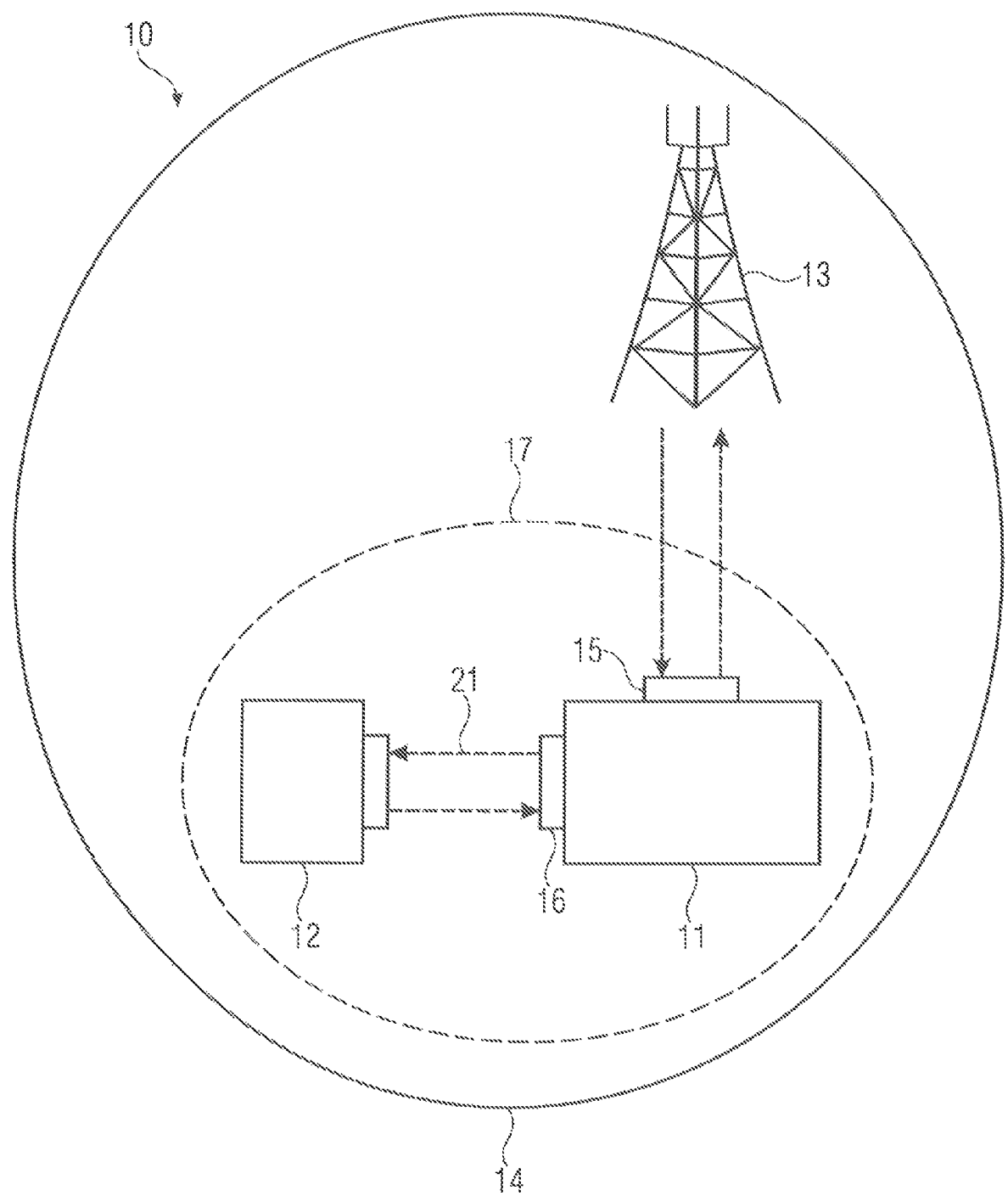
FIG. 1 shows a first embodiment of an User Equipment according to the invention.

Equal or equivalent elements or elements with equal or equivalent functionality are denoted in the following description by equal or equivalent reference numerals.

FIG. 1 shows a first embodiment of a User Equipment according to the invention. It shows a cellular network 10 comprising a base station 13 serving a cell 14 of said network. Within said cell 14 a first and a second User Equipment 11, 12 may be located. In the following, User Equipments will be referred to as UEs.

The first UE 11 and the second UE 12 are within a UE-Group 17. Said UE Group 17 will be explained in more detail below. However, both the first and the second UEs 11, 12 are members of this UE Group 17.

The first UE 11 may comprise a first interface 15 for UE-to-Basestation communication configured to communicate with the base station 13 of the cellular network 10. The first UE 11 may further comprise a second interface 16 for UE-to-UE communication configured to communicate with one or more other UEs 12. In the example shown in FIG. 1, the second interface 16 may be configured to communicate with the depicted second UE 12.

According to the invention, the first UE 11 may be configured to provide a Group-Management-Functionality. Therefore, the first UE 11 may be configured to receive configuration data 21 for configuring its second interface 16. The Group Manager UE 11 may receive said configuration data 21 via its first interface 15, for instance, via a Uu link from the base station 13.

Furthermore, the Group Manager UE 11 may coordinate the communication with the members of the UE Group 17. In this example, the Group Manager 11 may coordinate the communication with the second UE 12, which is a Group Member UE.

For example, the Group Manager UE 11 may derive from the configuration data 21 information on how to set up and configure his second interface in order to being able to communicate with the Group Member UE 12, or even with a multitude of other members of this UE-Group 17.

Furthermore, the Group Manager UE 11 may assign physical resources to the members of its UE Group 17.

Thus, the Group Manager UE 11 may know, based on the configuration data, how to communicate with one or more Group Member UEs 12 via the second interface (e.g. side link) by using which physical resources.

Accordingly, the Group Manager UE 11 may communicate with the Group Member UE 12 by the second interface via which it may transmit or receive messages 23 from or to the Group Member UE 12.

Thus, the Group Manager UE 11 may now overtake group management functions (i.e. the coordination of the side link communication via the second interface within its UE Group 17) that were previously provided and managed by the base station 13.

In other words, the Group Manager UE 11 may manage the members of its UE-Group 17. For example, the Group Manager UE 11 may assign physical resources to its group members, for example, to the depicted Group Member UE 12.

Figure 2:
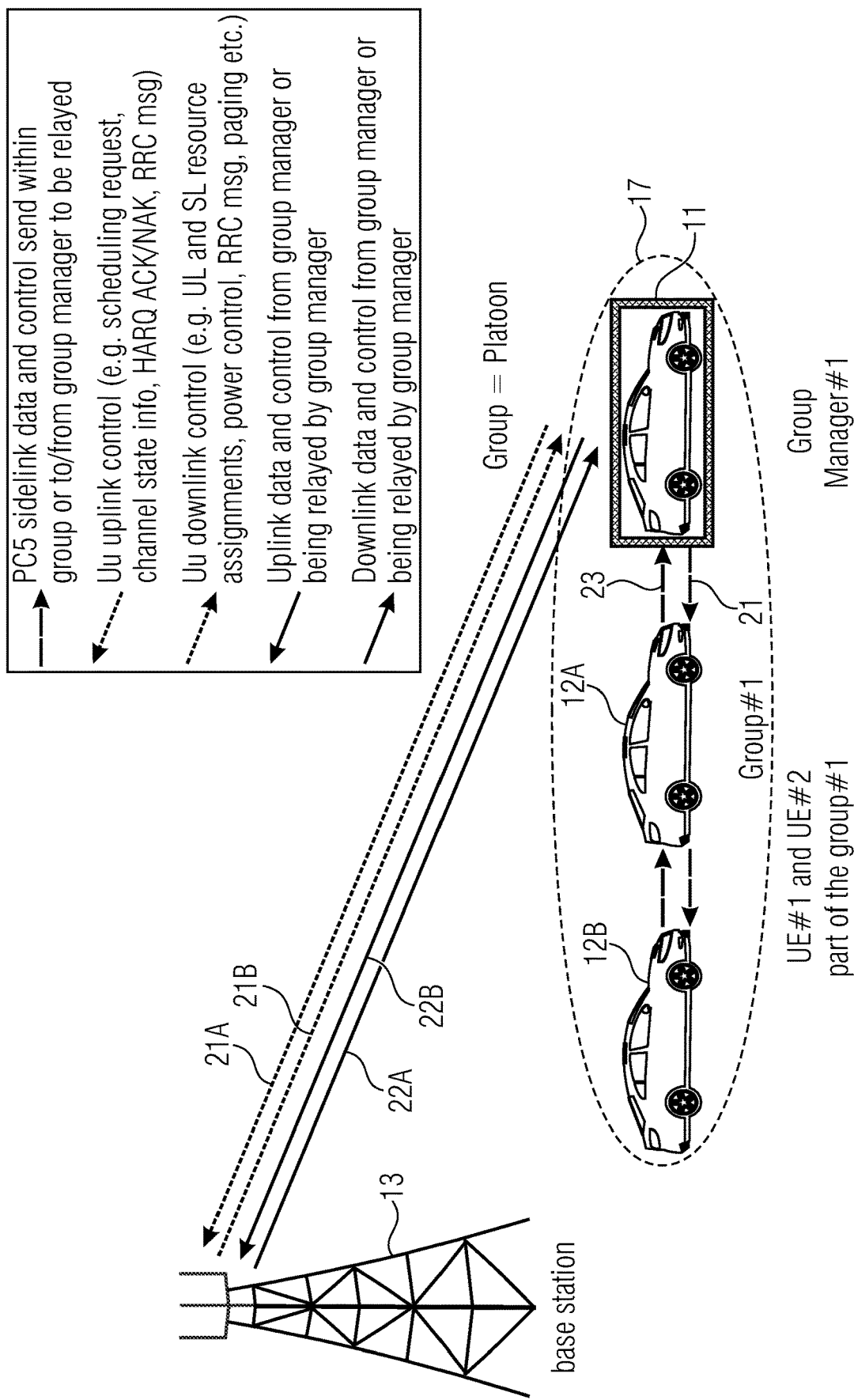
FIG. 2 shows an example of UE Group communication according to an embodiment.

FIG. 2 depicts a further embodiment of the invention. In this embodiment, a UE Group 17 may comprises a Group Manager UE 11 and two (or even more) Group Member UEs 12A, 12B. The Group Manager UE 11 may communicate with the second and the third UE 12A, 12B. All of them may communicate with each other via their respective second interface. This kind of UE-to-UE communication may in the following also be referred to as a side link communication, and the messages sent via this side link may also be referred to as side link messages.

As mentioned before, the Group Manager UE 11 coordinates the side link communication within its UE Group 17. Therefore, he may configure its second interface 16 based on the configuration data 21 that may have been provided by the base station 13. Furthermore, the Group Manager UE 11 assigns physical resources to both Group Member UEs 12A, 12B, which physical resources may have been provided to the Group Manager UE 11 by the base station 13.

The first UE 11 may communicate with its both Group Member UEs 12A, 12B, as depicted in FIG. 2, by passing on side link messages 23 in a chain, i.e. from UE to UE. In this example, a side link message 23 may be transmitted from the Group Manager UE 11 to the first Group Member UE 12A. The first Group Member UE 12A will pass the side link message to the second Group Member UE 12B.

The other direction may also be possible, wherein the second Group Member UE 12B transmits a side link message to the first Group Member UE 12A. The first Group Member UE 12A passes this message to the Group Manager UE 11.

This example may describe a so-called Daisy Chain. However, it may also be possible that the UEs 11, 12A, 12B communicate in a star-shaped topology within the communication network, wherein each of the first and the second Group Member UE 12A, 12B may communicate directly with the Group Manager UE 11.

As mentioned above, the side link messages are transmitted via the respective second interface of the respective Group Member UE 12A, 12B and Group Manager UE 11. The Group Manager UE 11 coordinates this side link communication by, for example, assigning physical resources to its Group Member UEs 12A, 12B. Of course, the Group Manager UE 11 may only provide available physical resources. These resources may have been provided to the Group Manager UE 11 by the base station 13, for example as part of the configuration data.

Therefore, the configuration data may inform the Group Manager UE 11 on how to set up his second communication interface to be in a condition to act as a Group Manager UE 11. If the Group Manager UE 11 has configured its second interface appropriately so that the Group Manager UE 11 can act as such (i.e. to have group management functionality), he may then begin to coordinate the communication within its UE Group 17. That is, the Group Manager UE 11 may then assign available physical resources to the Group Member UEs 12A, 12B that are within its UE Group 17.

Thus, the Group Manager UE's ability to coordinate the side link communication is based on the configuration data that he may have received from the base station 13.

FIG. 2 shows a further aspect, namely a Group Manager UE 11 that is configured to provide a relay function in a downlink and/or an uplink mode.

In an uplink mode, the Group Manager UE 11 may be configured to receive predetermined data via its second interface, i.e. from one of the first Group Member UE 12A or the second Group Member UE 12B. This predetermined data may be control data (e.g. configuration data) and/or user data. The Group Manager UE 11 is configured to relay said predetermined data to the base station 13 via the first interface.

As mentioned before, the predetermined data may be control data and/or user data. Accordingly, the second interface of the Group Member UEs 12A, 12B and the Group Manager UE 11 may have to be configured to receive and/or transmit control data and/or user data.

Accordingly, said predetermined data 23 may, for instance, be relayed to the base station 13 via an Uu uplink control channel 21A if the predetermined data 23 comprises control data. Additionally or alternatively, said predetermined data 23 may, for instance, be relayed to the base station 13 via an uplink data channel 22A if the predetermined data 23 comprises user data.

In a downlink mode, the Group Manager UE 11 may be configured to receive predetermined data via the first interface from the base station 13, and to relay said predetermined data via the second interface. In this example, the predetermined data may be relayed to the first Group Member UE 12A. However, it may also be possible that the predetermined data may be relayed to the first Group Member UE 12B, or even to other UEs which are not part of the UE-Group 17.

If said predetermined data comprises control data, then the Group Manager UE 11 may receive said predetermined data, for instance, via an Uu downlink control channel 21B. If said predetermined data comprises user data, then the Group Manager UE 11 may receive said predetermined data, for instance, via a downlink data channel 22B.

Independent from via which link the Group Manager UE 11 may have received the predetermined data, the Group Manager UE 11 may relay said predetermined data to at least one or more Group Member UEs 12A, 12B being members of its UE-Group 17, or to UEs outside its UE-Group 17.

Accordingly, the first UE 11 may or may not relay predetermined data. The first UE 11 may be configured to decide, based on a decision criterion, whether to relay the predetermined data. One of several examples for such a decision criterion may be a size of the predetermined data to be relayed. Other examples may be the maximum delay and/or a combined constraint and/or a jitter constraint of the predetermined data to be relayed.

For instance, if the size of the predetermined data is below a certain threshold, then the Group Manager UE 11 may decide to relay said predetermined data from the Group Member UEs 12A, 12B to the base station 13, or from the base station 13 to the Group Member UEs 12A, 12B.

If the predetermined data may exceed a certain threshold, then the Group Manager UE 11 may decide not to relay said predetermined data from the Group Member UEs 12A, 12B to the base station 13, or from the base station 13 to the Group Member UEs 12A, 12B. In this case, the Group Member UEs 12A, 12B may communicate directly with the base station 13 in order to send and/or transmit the predetermined data.

For example, if the predetermined data may be a text message, then the Group Manager UE 11 may relay said text message to the Group Member UEs 12A, 12B. However, if the predetermined data may be a data stream containing video data, then the Group Manager UE 11 may decide not to relay said video data.

In other words, the Group Manager UE 11 may be configured to relay data packets and/or RRC control messages from other Group Member UEs 12A, 12B of its UE-Group 17 received via, for example the side link shared channel (PSSCH) 23, and to transmit same to the serving eNB 13 it is connected to, for example, via the uplink shared channel (e.g. PUSCH) 21A, 22A.

Furthermore, the Group Manager UE 11 may be configured to relay a data packet and/or RRC control messages received from its serving eNB 13, for example via a downlink shared channel 22A, 22B (e.g. PDSCH), and to transmit the data to other Group Member UEs 12A, 12B of its UE-Group 17 via the side link shared channel 21 (PSSCH).

It shall be briefly mentioned here that a shared channel, and in particular the PDSCH (Physical Downlink Shared Channel) channel is the main data bearing channel which is allocated to users on a dynamic and opportunistic basis. The PDCH (Physical Downlink Channel) is also used to transmit broadcast information not transmitted on the PBCH (Physical Broadcast Channel) which include System Information Blocks (SIB) and paging & RRC signalling messages. PDSCH is also used to transfer application data, e.g.:

Paging messages—These are broadcast using PDSCH channel. LTE UE in RRC IDLE mode monitor PDCCH for paging indications. Based on trigger it will decode the paging message carried in PDSCH RBs.

Downlink RRC Signalling messages—These are carried by PDSCH. Signalling Radio Bearers (SRB) will use PDSCH. Every connection usually will have its own set of SRB.

Accordingly, the (physical) shared channel may occasionally also be referred to as (physical) data channel.

The Group Manager UE 11 may do so while the Packet Data Units of the different UEs are transmitted and/or received in different resource allocations using the same or different logical channels, or while the Packet Data Units of the different UEs 12A, 12B can be multiplexed by the MAC layer within single MAC PDUs. In the latter, the MAC header information may provide control information about the PDU session, the logical channel, or the UE the packet belongs to.

As mentioned above, the Group Manager UE 11 may or may not relay data. However, the Group Manager UE 11 has, in any case, the inventive Group-Management functionality.

The first UE 11 may be configured to decide whether to become a Group Manager UE 11 that comprises said Group Management functionality. This shall be explained in the following with reference to FIG. 3.

Figure 3:
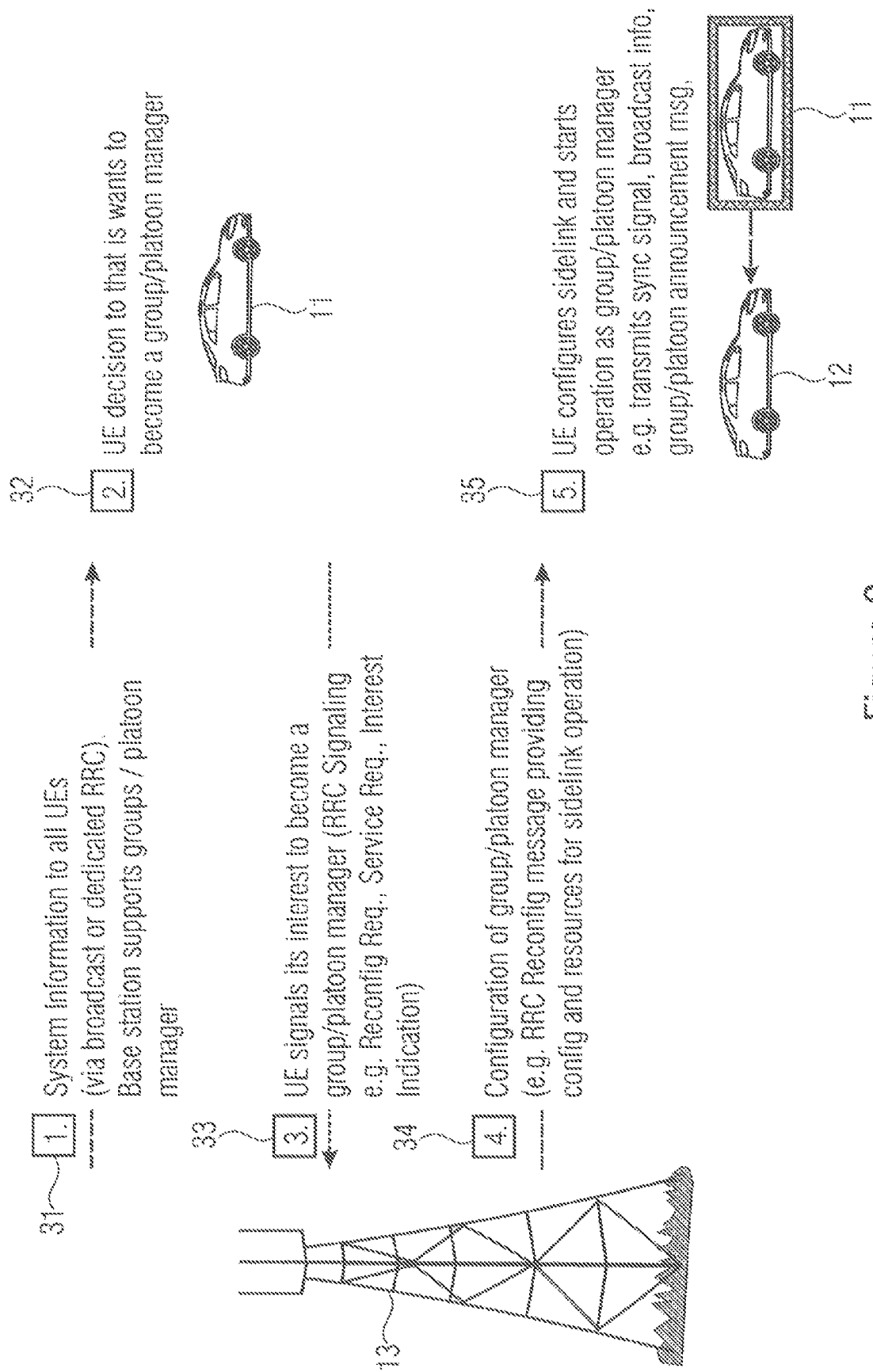
FIG. 3 shows an embodiment of a message flow for providing a Group Manager UE according to an embodiment.

FIG. 3 shows a simplified diagram of how the UE 11 may become a Group Manager U E.

A UE 11 may first need to register at the base station 13 and may need to be authorized to become a Group Manager UE. The procedure is explained in FIG. 3. First all the UEs in the cell may receive system information from the base station 13.

The novel aspect in the first step 31 is that the base station 13 may support and indicate that it supports Group Managers in its cell.

This could be done by sending system information, e.g. specific system information elements or also by sending a system information block for UEs supporting Group Management functionality and/or UEs supporting Group Member functionality. Such system information might either be sent cell wide to all UEs or only to UEs that support such functionality, for example based on UE request or as part of a request to serve as a Group Manager or to become a Group Member.

The UE 11 may be configured to receive such system information from the base station 13 via its first interface, for example by means of broadcast information on a physical broadcast channel, and/or via a physical shared channel, and/or via dedicated Radio Resource Control (RRC) signal.

For example, this system information may comprise an indicator to support the Group-Management-Functionality and/or a Group Communication Functionality in the cell served by the base station 13.

The system information sent in the first step 31 may already contain at least a portion of the configuration data, for example a system information block with configuration details related to the Group Management Function and/or the Group Communication Coordination Function and/or a radio resource configuration message with configuration details related to the UE Group 17. However, the above mentioned configuration data, or portions thereof, may also be sent in the fourth step 34, as will be described later.

Based on this system information that the UE 11 may have received in the first step 31, the UE 11 may now know that the base station 13 provide Group Functionality supporting Group Manager UEs 11 and/or Group Member UEs 12. Since the UE 11 itself comprises Group Management and/or Group Member functionality it may start to monitor its surrounding for signals from other UE Groups.

As mentioned before, based on this system information a UE with Group Management and/or Group Member Functionality will first start to monitor its surrounding for signals from other UE Groups. After the reception of the system information the UE 11 will have knowledge (e.g. receive resource pool information) on the side link resources it needs to monitor. If the UE 11 may find other side link synchronization signals and may be able to decode other side link control information it may get to know that there are other UE Groups it may join instead of forming a new Group.

In the second step 32 the UE 11 may decide to request to become a Group Manager.

This decision may be done based on certain criteria that may also be controlled by the serving base station's 13 system information. Otherwise a user of the UE 11 might manually trigger the procedure via the user interface or a car internal control element might trigger the procedure (e.g. depending on other UEs in its proximity, driving in the same direction with the same target etc.). This could for instance be triggered after receiving V2V messages from the cars in the proximity providing such information.

Well, once the decision to request to become a Group Manager is done by the UE 11, the UE 11 may send a request message to the base station 13, as shown in the third step 33.

The message may be a RRC reconfiguration message, a service request message or an interest indication.

By means of said request message, the UE 11 may request the base station 13 to be authorized and/or allowed to coordinate the communication within the UE Group 17, i.e. to overtake Group Management Functionality.

For this, the base station 13 may also communicate with the core network to see if the UE 11 is authorized and/or allowed to become a Group Manager and it may also run a kind of admission control procedure for such functionality.

Once the UE 11 is authorized the base station 13 may send at least a portion of the configuration data (or all of the configuration data), e.g. in a RRC control message, with the response to the request. The base station 13 may provide further control information with configuration details, all of which is done in the fourth step 34 and will be described afterwards in more detail.

However, said request message that may be sent in the third step 33 may also serve to request the base station 13 to provide the appropriate configuration data that enables the UE 11 to configure its second interface so as to coordinate the communication within the UE Group 17, i.e. to get the Group Management Functionality.

As mentioned above, sending the request message may be triggered in different ways. According to an embodiment, the UE is configured to send the request message, wherein sending the request message may be initiated by a user and/or a car control of the UE, and/or by a reception of V2V messages from other UEs within the proximity of the UE. Furthermore, the UE may be configured to decide, based on its power status (e.g. battery status), whether to send the request message.

However, the second step 32 and/or the third step 33 may also be triggered by the network side. controlled by the base stations system information. In case the base station 13 is for instance connected to a V2X server that contains information about cars 11, 12 in proximity to each other, about the position, direction, speed and targets of the cars. In such cases the network could trigger the configuration of a Group Manager based on its knowledge of the UEs capabilities and based on the knowledge of the V2X messages. Similarly such procedure might be triggered by a Road Side Unit that gathers information about UEs sending V2X messages in its proximity.

According to a further embodiment, the request message may comprise at least one of a reconfiguration request message comprising a request to provide system information comprising at least a portion of the configuration data for the UE-to-UE communication within the UE Group 17, and/or a service request message and/or an interests indication message.

According to an embodiment, the UE 11 may be configured to receive one or more response messages from the base station 13, wherein said response message comprises at least a portion of the configuration data, and wherein the at least a portion of the configuration data comprises at least system information with configuration details for UE-to-UE communication within the UE Group 17.

According to an example, the one or more response messages may comprise configuration information for at least one of a transmission and/or reception handling to be used for UE-to-UE communication within a UE Group 17, an uplink control channel for UE-to-Basestation communication, an uplink data channel for UE-to-Basestation communication, or an uplink random access channel for UE-to-Basestation communication.

Receiving said at least one more response messages is shown in the fourth step 34. The response message may contain the configuration data or at least portions thereof.

According to an embodiment, the configuration may comprise physical resource assignments for UE-to-UE communication between the Group Manager UE 11 and one or more of the Group Member UEs 12A, 12B of the UE-Group 17. Additionally or alternatively, the configuration data may comprise physical resource assignments for UE-to-UE communication between two or more of the Group Member UEs 12A, 12B of the UE-Group 17.

According to a further embodiment, the configuration data may contain physical resource assignments for UE-to-UE communication between the Group Manager UE 11 and at least one further UE that is not part of the UE-Group 17. Such a scenario will be described later with respect to the foreign UE 52 FIG. 4 and the foreign UEs 52A, 52B in FIG. 5.

Additionally or alternatively, the configuration data may comprise physical resource assignments for UE-to-UE communication between one of the Group Member UEs 12A, 12B of the UE-Group 17 and the at least one further UE 52 that is not part of the UE-Group 17.

Thus, according to the above examples, the Group Manager UE 11 may assign physical resources to Group Member UEs 12A, 12B for side link communication, and/or to other foreign UEs 52 that are not yet part of the UE Group 17 and/or that want to join the UE Group 17, and/or to other Group Member UEs of other UE Groups. Thus, the Group Manager UE 11 may be configured to coordinate not only intra-group side link communication but also inter-group side link communication.

According to an embodiment, the UE 11 may be configured to provide a synchronization signal and/or physical broadcast channel and/or system information on a side link data channel to other Group Member UEs 12A, 12B within the UE Group 17 and/or to other (foreign) UEs 52 outside the UE Group 17 that may be interested in being connected to the UE-Group 17 that is managed by the Group Manager UE 11.

For example, the synchronization signal and/or the physical broadcast channel and/or the system information on the side link data channel may contain a Group Identity. The Group Identity, which may also be referred to as a Group Identifier (Group ID), may serve to identify the UE Group 17 among other UE Groups that may also be present within the cell served by the base station 13. It may also be possible that each Group Member UE 12A, 12B of a UE Group may contain an individual Group Member ID.

As indicated by the fifth step 35, once the UE 11 is configured as Group Manager it may configure its lower layer according to the configuration received by the base station 13 and will start transmission of sidelink synchronisation signal, sidelink broadcast channel and other predefined messages such as a group manager announcement message.

The Group Manager UE 11 may communicate with its Group Member UEs 12A, 12B and/or with the base station 13. According to an, the Group Manager UE 11 may be configured to transmit control information to the base station 13, the control information comprising status information regarding the UE-to-UE communication within the UE-Group 17 to which the UE 11 belongs.

For example, the control information being sent to the base station 13 may comprise at least one of a scheduling request requesting the physical resources for the UE-to-UE communication within the UE Group 17 and/or for the UE-to-Basestation communication, a channel state information, or a Power Headroom or Power Control Reporting, or a timing advance value.

Summarizing FIG. 3 in some other words, the UE 11 may be configured to receive downlink control information from the serving eNB 13, for example via a control channel (e.g. PSCCH).

Said downlink control information may contain physical resource assignments from the eNB 13 for transmissions on the side link control channel (e.g. PSCCH) and/or side link data channel (e.g. PSSCH) to/from other UEs 12A, 12B of the UE-Group 17 or between UEs 12A, 12B of the UE-Group 17.

Additionally or alternatively, said downlink control information may contain resource assignments from the eNB 13 for transmissions on the sidelink control channel (e.g. PSCCH) and/or sidelink shared channel (e.g. PSSCH) to other UEs not part of the UE-Group 17 or to other UE-Groups.

Additionally or alternatively, said downlink control information may contain resource assignments from the eNB 13 for uplink data transmissions on the uplink shared channel (e.g. PUSCH).

During configuration of the UE 11, the UE 11 may receive one or more response messages from the base station 13. These one or more response messages may comprise configuration information for at least one of a transmission and/or reception handling to be used for UE-to-UE communication, an uplink control channel for UE-to-Basestation communication, an uplink shared channel for UE-to-Basestation communication, or an uplink random access channel for UE-to-Basestation communication.

In other words, during configuration of the Group manager by the eNB 13 the UE 11 that will become the Group Manager may receive and process one or more RRC Reconfiguration messages with configuration details from the serving eNB 13.

Said RRC Reconfiguration messages may contain, for example, information for the transmission and/or reception pool to be used for sidelink transmission/reception.

Said RRC Reconfiguration messages may contain, for example, information for uplink control channel (e.g. PUCCH) for channel feedback reporting and/or scheduling requests and/or sending HARQ feedback information.

Said RRC Reconfiguration messages may contain, for example, information for the uplink shared channel (e.g. PUSCH) for data transmission e.g. user plane information of PHY, MAC, RLC and PDCP layer Said RRC Reconfiguration messages may contain, for example, information for the uplink random access channel (e.g. RACH).

In other words, during configuration of the Group manager by the eNB 13 the UE 11 that will become the Group manager may transmit one or more RRC Configuration messages with configuration details of the UE-Group to the serving eNB 13. Said configuration details may comprise information about the UEs 12A, 12B that might be or become part of the UE-Group using certain UE identities (e.g. Common Radio Network Temporary Identity (C-RNTI) for connected UEs or Temporary Mobile Station Identity (TMSI) for Idle UEs or other identities for other UE states. The UEs are thus visible and reachable by the network.

The UE 11 that has become the Group Manager may coordinate or manage the sidelink communication between the UEs 12A, 12B which are members of its UE-Group. Therefore, the Group Manager UE 11 may send respective configuration or control information to the base station 13. Said configuration information may, for example, comprise at least one of a scheduling request requesting resources for the UE-to-UE communication and/or the UE-to-Basestation communication, a channel state information, or a Power Headroom Reporting.

In other words, the Group Manager UE 11 may be configured to provide uplink control information towards the base station 13 for the UE-Group.

Said uplink control information may, for example, comprise Scheduling Requests via a control channel (e.g. PUCCH), Buffer Status Reports in-band on a shared channel (e.g. PUSCH) via MAC Control Elements, while the scheduling requests might request resources for the uplink and/or the sidelink, and/or while scheduling requests might comprise data request of other UEs of the UE-Group on a per UE basis or based on a combined scheduling request. The scheduling request information may be used by the eNB 13 to schedule sidelink or uplink transmissions.

Additionally or alternatively, said uplink control information may, for example, comprise Channel State Information via a control channel (e.g. PUCCH). Said Channel State Information may be based on measurements of the Group manager 11 of the eNB signal. The eNB signal may be demodulation reference symbols of the downlink shared channel (e.g. PDSCH) and/or downlink synchronization signals (e.g. PSS/SSS).

The Channel State Information may also contain a channel quality indicator and/or a suggest coding and modulation scheme. The channel state information may be used by the eNB 13 for link adaptation (e.g. to adjust coding/modulation etc.).

The Channel State Information may also contain a rank indicator suggesting a MIMO rank to be used and/or a pre-coding matrix indicator suggesting a pre-coding to be used. The rank indicator and pre-coding index may be used by the eNB 13 for adaptive MIMO (e.g. to adjust rank and pre-coding).

Additionally or alternatively, said uplink control information may, for example, comprise Power Headroom Reporting in-band on a shared channel (e.g. PUSCH) via MAC Control Elements. Said Power Headroom Reporting may be based on the actual transmission power relative to the maximum transmit power of the Group manager UE 11. The power headroom reporting may be used by the eNB 13 for uplink power control.

The first UE 11, i.e. the Group Manager UE 11, may also have further capabilities. For example, according to yet a further embodiment, the Group Manager UE 11 may be configured to provide a synchronization signal to the other UEs interested in being connected to the UE-Group to which the UE belongs.

In other words, the Group Manager UE 11 may be configured to provide a synchronization signal to other UEs interested in being connected to the group Manager UE 11. Said synchronization signal may, for example, be a physical sidelink primary or secondary synchronization signal—PSPSS/PSSSS.

The Group Manager UE 11 may also be configured to send an group identity (Group ID) for the reception of other UEs interested in being connected to the Group Manager UE 11.

According to yet a further embodiment, the Group Manager UE 11 may be configured to provide control information about the UE-to-UE communication to the other Group Member UEs 12A, 12B of the UE-Group 17. This control information may comprise at least a portion of the configuration data and/or physical resources that the Group Manager UE 11 may have received from the base station 13. The Group Manager UE 11 may forward this control information to its Group Member UEs 12A, 12B via its second interface, i.e. via side link. For example, the Group Manager UE 11 may simply forward the configuration data to one or more other UEs which may use this configuration data for setting up their respective second interface accordingly.

For example, the Group Manager UE 11 may be configured to provide control information about the side link or the group relay functions to other UEs, e.g. via a physical side link broadcast channel (e.g. PSBCH) or via broadcast information mapped on the physical side link data channel (e.g. PSSCH). The Group Manager UE 11 may do so by, for example, sending a control indication that group relay functionality is supported, and/or by, for example providing other sidelink control information (e.g. sidelink bandwidth, D2D system frame number, TDD UL/DL configuration).

According to yet a further embodiment, the Group Manager UE 11 may be configured to provide control information to the Group Member UEs 12A, 12B of the UE-Group 17, wherein said control information is to announce the Group-Management-Functionality of the Group Manager UE 11 towards the Group Member UEs 12A, 12B. By doing so, the Group Member UEs 12A, 12B know that there is a Group Manager UE 11 that is responsible for coordinating the side link communication.

In other words, the Group Manager UE 11 may be configured to announce its operation as a Group Manager to other UEs 12A, 12B, for instance, via a sidelink control channel (e.g. PSCCH) or a sidelink discovery channel. The Group Manager UE 11 may do so by, for example, sending a periodic announcement message indicating that group relay functionality is supported.

Once, a communication with or between the UEs 12A, 12B of a UE Group 17 has been established by the Group Manager UE 11, the Group Manager UE 11 may have one or more of the following possibilities to coordinate or manage the intra-group communication or the communication of the Group Members 12A, 12B with the base station 13.

The Group Manager UE 11 may be configured to exchange control data and user data with its Group Member UEs 12A, 12B.

Such data may comprise, for example, data for proving system information to the group members via a multicast transmission.

Figure 5:
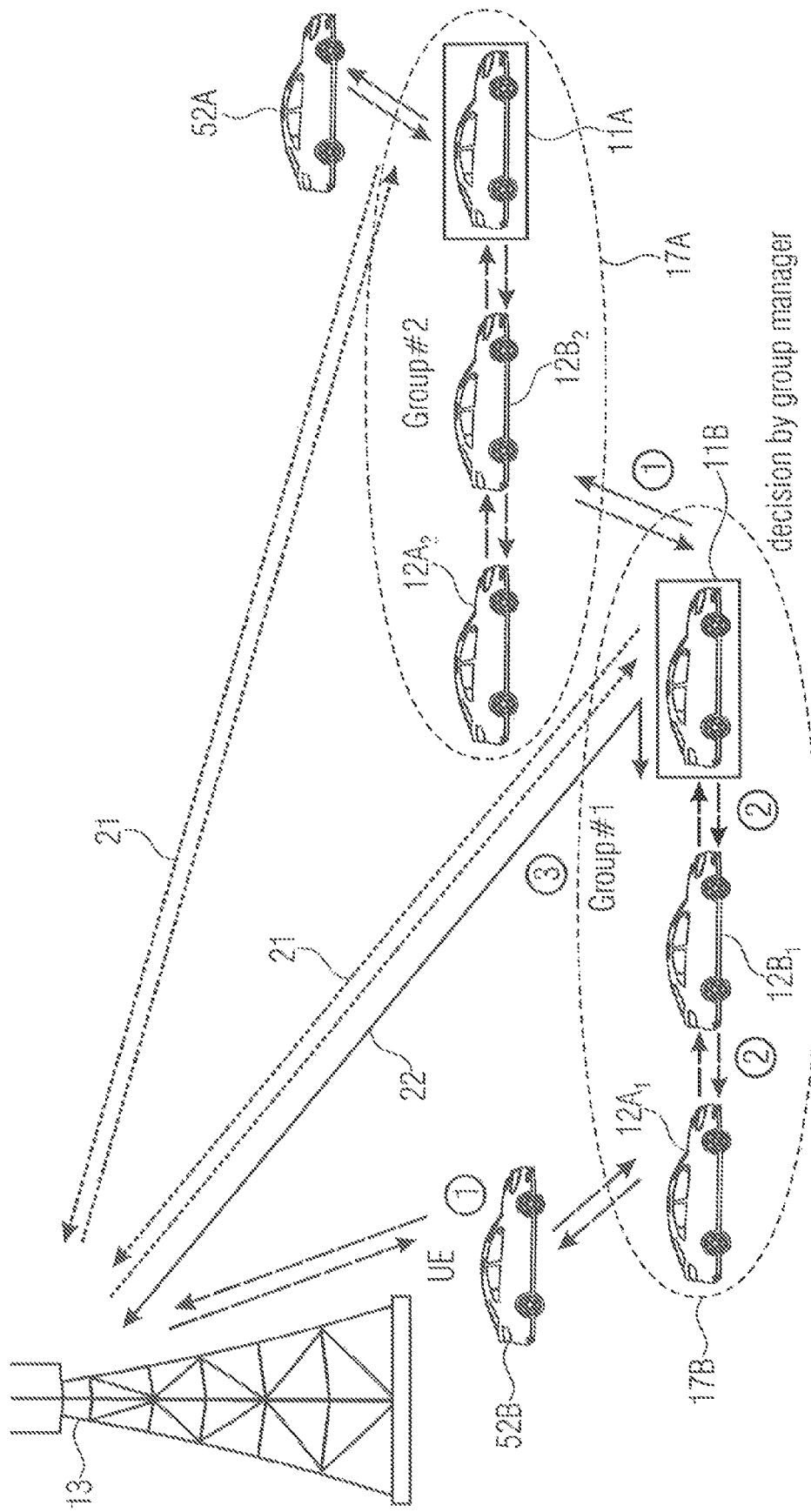
FIG. 5 shows an example of UE Group communication according to an embodiment.

An example of intra-group communication is shown in FIG. 5, wherein, according to an embodiment, the Group Manager UE 11B may be configured to exchange the control data and/or user data directly with a Group Member UE $12B_1$. Additionally or alternatively, the Group Manager UE 11B may be configured to exchange the control data and/or user data with a Group Member UE $12A_1$ via a second Group Member UE $12B_1$.

The Group Manager UE 11 may be configured to exchange data within its UE Group 17, for example, via a control channel or via predefined V2V messages such as UE Group management and UE Group status information exchanges that are mapped to sidelink data channels, e.g. join/leave platoon, change distance between UEs of the platoon, and/or platoon status information such as e.g. speed, direction, target or intended actions such as brake, accelerate, overtake.

According to an exemplary embodiment, the Group Manager UE 11 may be configured to exchange user data via its second interface with at least one or more of the other UEs 12A, 12B of the UE-Group 17.

The Group Manager UE 11 may do so by, for example, scheduling resources using a side link control channel (e.g. PUCCH), and/or sharing sensor or video information e.g. from the Group Manager UE 11, and/or communication between UEs 12A, 12B e.g. infotainment.

According to yet a further example, the UE 11 may be configured to receive, via its second interface, scheduling request information from at least one of the Group Member UEs 12A, 12B of the UE-Group 17, when said at least one Group Member UE 12A, 12B intends to send predetermined data to at least another one of the Group Member UEs 12A, 12B of the UE-Group 17, or when said at least one Group Member UE 12A, 12B intends to send predetermined data to the base station 13 via the Group Manager UE 11.

In other words, the Group Manager UE 11 may be configured to receive scheduling request information from UEs 12A, 12B within the UE-Group 17 that either want to send data within the UE-Group 17 or that want to send data via the Group Manager UE 11 to the base station 13.

The Group Manager UE 11 of this embodiment may do so by, for example, forwarding or relaying the scheduling request on an uplink control channel (e.g. out-of-band control channel such as PUCCH) or in-band Buffer Status Reports as an MAC Control Element on the uplink shared channel (e.g. PUCCH) to the eNB 13. Additionally or alternatively, the Group Manager UE 11 may do so by multiplexing the scheduling requests of multiple UEs 12A, 12B into a joint scheduling request/buffer status report send in the uplink to the controlling base station 12.

As already mentioned above, the UE 11 may also be configured to send the physical resource assignments for the UE-to-UE communication to at least one of the Group Member UEs 12A, 12B of the UE-Group 17.

In other words, the Group Manager UE 11 may be configured to send side link resource assignments to the Group Member UEs 12A, 12B within the UE-Group 17.

Said resource assignments may, for instance, allow Group Member UEs 12A, 12B to send data within the UE-Group 17 via the side link.

Said resource assignments may, for instance, also allow to send data to the Group Manager UE 11 to be relayed to the base station 13.

Said resource assignments may, for instance, also allow to order Group Member UEs 12A, 12B to send signals and control data to UEs (e.g. foreign UE 52—FIG. 5) outside the UE-Group 17 or to other UE-Groups.

The Group Manager UE 11 may also be configured to receive, for instance on the side link data channel, e.g. RRC messages from UEs 12A, 12B within the UE Group 17 to be relayed to the base station 13. This may be used, for example, to set up unicast sessions/connections towards the base station 13.

It may also be possible that some UEs 12A, 12B of the UE-Group 17 might relay the signal/messages of other UEs towards the Group Manager UE 11 by multi-hop transmission. This would allow for smaller range in case of high bandwidth transmission.

As already mentioned above, the UE 11 may be configured to relay data from another UE 12A, 12B to the base station 13, and/or from the base station 13 to one or more of the other UEs 12A, 12B.

Thus, it shall be again referred to FIG. 3. The Group Manager UE 11 may, for example in the above described first step 31 and/or fourth step 34, receive a RRC request message and/or a RRC Reconfiguration message from a base station 13 or a road side unit to order the UE 11 to start operation as a group manager, as described above.

Additionally or alternatively, the base station 13 or road side unit may be connected to a V2X server and/or it may receive and decode V2X messages of UEs in its proximity and based on this information ordering the base station 13 to configure the UE 11 as a Group Manager.

As also described above, the UE 11 may receive system information from the base station 13 (e.g. via broadcast as part of the cell's group manager configuration or dedicated signaling e.g. as part of the group manager configuration). Upon reception of said system information from the base station 13, the UE 11 may be configured to relay predetermined data.

In other words, the UE 11 may or may not relay other control data (e.g. system information updates, paging or other RRC messages) and/or other user data (e.g. for specific services such as V2X, MTC/IoT or voice services).

According to one example, the base station 13 may provide some decision criterial to relay or not to relay said predetermined data. An exemplary selection criterial may be the message size or the amount of data in the queue.

The above examples have described embodiments wherein the UE 11 has been chosen as a Group Manager UE 11, and wherein several examples of its management functionality were described in the case that one or more other UEs 12A, 12B were members of the UE-Group of the Group Manager UE 11.

In the following, some examples shall be described how the Group Manager UE 11 may handle requests from other UEs which want to join the UE-Group 17 that is managed (e.g. the side link communication is coordinated) by the Group Manager UE 11. Since these other UEs are not yet a member of the UE Group 17, but want to become a member, they will also be referred to as foreign UEs.

Such an example is, for instance, shown in FIG. 5 wherein the foreign UEs 52A, 52B want to become a member of a UE Group 17A, 17B, each of which being managed by a respective Group Manager UE 11A, 11B.

For the first example, reference shall be made to the UE-Group 17A (also referred to as Group #2) on the right hand side of FIG. 5. This UE Group 17A may be managed by the Group Manager UE 11A.

According to this embodiment, the Group Manager UE 11A may be configured to receive, via its second interface, a connection setup request message from the foreign UE 52A that is not yet a member of the UE-Group 17A. Said connection setup request message may indicate towards the Group Manager UE 11A that the foreign UE 52A wants to join the UE-Group 17A. (More details on said connection setup request message will be given below with reference to FIG. 4.)

In other words, the Group Manager UE 11A of the UE Group 17A, may be configured to receive a connection setup request message (e.g. RRC Connection Setup Request) from a foreign UE 52A that wants to connect and/or join the UE-Group 17A and/or the Group Manager 11A.

The Group Manager UE 11A may be configured to ask the base station 13, for example via a RRC control message, if the UE 52A requesting to join the UE-Group 17A is authorized to do so.

Additionally or alternatively, the Group Manager UE 11 may be configured to perform admission control to accept or reject a connection setup request message. The admission control decision may be based on its processing capabilities, the radio signal quality to the base station 13 as well as the foreign UE 52A that wants to connect, the available bandwidths on the uplink to and downlink from the base station 13 and available bandwidth on the sidelink to other UEs 12A1, 12A2, 12B1, 12B2.

In response to said connection setup request message, the Group Manager UE 11A may send a connection setup response message to the foreign UE 52A. This connection setup response message may contain control information related to the connection setup. For example, It contains information being relevant for the foreign UE 52A to join the UE-Group 17A managed by the Group Manager UE 11A.

The Group Manager UE 11A in turn may have been provided with this control information by the base station 13, namely by the configuration data. Accordingly, this information contained in the connection setup response message may be based on at least a portion of the configuration data that the Group Manager UE 11A may have previously received from the base station 13.

For example, based on this portion of control information, the Group Manager UE 11A may assign the foreign UE 52A physical resources for side link communication. Furthermore, the Group Manager UE 11 may provide configuration details to the foreign UE 52A on how to set up or configure its second interface for a UE-to-UE communication within this UE-Group 17A.

According to non-limiting examples, the control information that may be sent to the foreign UE 52A may comprise control information about one or more services and/or logical channels and/or data bearer and/or data flows that are to be relayed by the Group Manager UE 11A to the base station 13 via its first interface, or that are to be sent directly from the foreign UE 52A to the base station 13.

Additionally or alternatively, the control information that may be sent to the foreign UE 52A may comprise control information about a connection state that is to be used by the foreign UE 52A in order to join the UE Group 17.

Additionally or alternatively, the control information that is sent to the foreign UE 52A may comprise control information if paging and/or system information and/or system information updates and/or data packets below a predetermined size are to be relayed by the UE 11A to the base station 13 via its first interface, or that are to be sent directly from the foreign UE 52A to the base station 13.

In other words, the Group Manager UE 11 may be configured to transmit a connection setup message (e.g. RRC Connection Setup) to a foreign UE 52A that previously was sending a connection setup request message (e.g. RRC Connection Setup Request). For example, the control messages may be exchanged via a side link data channel (e.g. PSSCH), via a Radio Resource Control protocol and/or via a new control channel for Group management functionality and/or via pre-defined side link messages.

Said control messages may, for instance, provide control information about certain services or logical channels or data bearer that should be relayed in the uplink via the group manager 11A or should be sent directly to the base station 13.

Additionally or alternatively, said control messages may, for instance, provide control information about the RRC state the UE 52A should use e.g. RRC Inactive State.

Additionally or alternatively, said control messages may, for instance, provide control information about if paging and/or system information and/or system information updates and/or small packets are relayed via the group manager 11A or should be received directly by the eNB 13.

Additionally or alternatively, said control messages may, for instance, provide control information if handover and/or tracking area update and/or RAN notification area updates are managed by the group manager 11A or by each UE 12A, 12B, 52A of the UE-Group 17A independently.

According to the above embodiment, the Group Manager UE 11A may be configured to coordinate communication with other foreign UEs 52A that are not belonging to its UE-Group 17A.

In yet another embodiment, the Group-Manager UE 11A may be configured to assign physical resources to Group Member UEs 12A, 12B to communicate with other foreign UEs 52A that are not belonging to its UE-Group 17A.

Such an embodiment is shown at the left hand side of FIG. 5, namely in the other UE-Group 17B (also referred to as Group #1) managed by Group Manager UE 11B. In this case the UE $12A_1$ which is a member of the UE Group 17B may communicate with the foreign UE 52B in a manner as described above.

In either the first UE Group 17B or the second UE Group 17A, the Group Manager UE 11B or another UE $12A_1$ being in communication to foreign UEs 52B not belonging to its UE Group and/or to other UE Groups may, for example, be configured to transmit and receive V2V messages.

Additionally or alternatively, they may be configured to make other UEs 52A, 52B aware of the UE-Group 17A, 17B by announcement/warning messages.

According to yet another embodiment, the Group Manager UE 11A, 11B that is in communication with the base station 13 may be configured to be requested to pass its context to the network or over the side link to another managing capable UE to facilitate changing of the group manager.

As mentioned above, the Group Manager UE 11A, 11B may assign physical resources to Group Member UEs 12A, 12B of its UE-Group 17A, 17B to communicate with one or more foreign UEs 52A, 52B that are not members of its UE-Group 17A, 17B.

According to this example, the Group Manager UE 11A, 11B may be configured to configure other UEs 12A, 12B of its UE-Group 17A, 17B to communicate to foreign UEs 52, 52B not belonging to its UE-Group 17A, 17B and/or belonging to other UE-Groups.

For this purpose, the Group Manager UE 11A, 11B may be configured to configure multiple UEs 12A, 12B for transmission (incl. the Group Manager UE 11A, 11B itself). This provides diversity transmission/message duplication by having multiple side link transmissions.

The Group Manager UE 11A, 11B may be configured to appoint an UE $12A_1$ at the end and/or at the front of the UE-Group 17A, 17B to communicate with the foreign UE 52A, 52B. This may provide maximum diversity by transmission at the beginning and at the end of the UE-Group 17A, 17B e.g. in case the Group Manager UE 11A, 11B is in the middle.

Still for this purpose, the Group Manager UE 11A, 11B may additionally or alternatively be configured to assign physical resources of the same pool and/or the same slot/minislot/subframe in case of transmission by multiple Group Member UEs 12A, 12B. This may have the advantage that, due to the half-duplex constrain, UEs 12A, 12B can either transmit or receive on the sidelink. Furthermore, using the same resource pool/subframe reduces the resource consumption for transmission, minimizes the reception time and thus power consumption for the receiving UEs 12A, 12B and provides the transmitting UEs 12A, 12B more time for receiving.

Still for this purpose, the Group Manager UE 11A, 11B may additionally or alternatively be configured to assign the same physical resources in case for a synchronized transmission by multiple UEs 12A, 12B. This may have the advantage that basically transmit diversity can be provided by the physical layer. The signal looks like multipath reception of a single signal by the receiver and improve the receive signal quality.

According to an example, the Group Manager UE 11A, 11B may be connected to a local application server (e.g. V2X Server or local IOT server) for its UE-Group 17A, 17B handling local message exchange and aggregation towards the network.

In view of the explanations above, FIG. 5 shall be briefly summarized. As can be seen, there is a first UE-Group 17B being managed by a Group Manager UE 11B. The UE-Group 17B comprises two other UEs $12A_1$, $12B_1$ being members of this UE-Group 17B.

A second UE-Group 17A is managed by a Group Manager UE 11A. The UE-Group 17A comprises two other UEs $12A_2$, $12B_2$ being members of this UE-Group 17A.

Both the Group Manager UE 11A of the one UE-Group 17A and the Group Manager UE 11B of the other UE-Group 17B may receive configuration data 21 from the base station 13.

The UE-Group Managers 17A, 17B may, based on this configuration data, coordinate the intra-group and/or inter-group communications as explained above. For example, the Group Manager UE 11A, 11B may distribute certain physical resources (e.g. side link channel resources) among the Group Member UEs $12A_1$, $12B_1$; $12A_2$, $12B_2$ of its UE-Group 17A, 17B.

The Group Manager UE 11B of the one UE-Group 17B may also receive user data and/or control data from the base station 13 which it may relay to its Group Member UEs $12A_1$, $12B_1$.

A Group Manager UE 11A, 11B might be in the middle, at the end or at the front of a UE Group 17A, 17B. In the middle would be beneficial for the side link transmission/reception. The manager may receive data by all Group Member UEs 12A, 12B of the UE-Group 17A, 17B most reliable with the least delay. At the front of the UE-Group 17A, 17B would be the best location to inform other UEs $12A_2$, 52A or other UE-Groups or another Road Side Unit ahead of the UE-Group 17A, 17B or approaching the UE-Group 17A, 17B. At the end of the UE-Group 17A, 17B is beneficial for other UE-Groups or UEs following the UE-Group 17A, 17B.

Besides assigning resources to UEs 12A, 12B for communication within the UE-Group 17A, 17B, the Group Manager UE 11A, 11B may also make other UEs responsible to send side link signals, channels and messages to surrounding UEs/UE-Groups while keeping its Group Management function.

In such a case resource allocations may be centrally controlled by the Group Manager UE 11A, 11B to optimize resource usage and to avoid collisions with other signals/channels.

The UEs 12A, 12B may also be assigned resources for communication to the Group Manager UE 11A, 11B to relay respective data to the base station 13.

Communication between the UE-Groups 17A, 17B may be done via the base station 13 as the Uu link to the Group Manager UEs 11A, 11B is efficient. Alternatively a SL pool can be defined for inter group communication.

A request to change UE-Groups 17A, 17B may be made by a group member 12A, 12B, by the base station 13, by the network or by a higher layer (e.g. V2X server or car control).

This may initiate the sensing and group selection procedure at the UE and the UE may request a group handover. After allocating resources and informing the new group manager a RRC reconfiguration message may be sent allowing the UE to change groups. After a successful handover resources may be released at the old Group Manager.

This may be triggered by the network in connected mode (for example on request of the old Group Manager UE, to combine two small UE-Groups, or a new UE has more managing capabilities).

In this case the base station 13 may select a new Group Manager UE 11 according to the Group Manager setup procedure described above. Then it may initiate a handover RRC reconfiguration procedure for the connected group members 12A, 12B.

Additionally the group context may be requested to be passed on to the next Group Manager UE reducing handover signaling.

In the above description, examples were mentioned of how a UE may become a Group Manager UE 11 and how said Group Manager UE 11 may coordinate intra-group and inter-group communications. Said Group Manager UE 11 may have the capability of forming a UE-Group 17 that may contain one or more Group Member UEs 12A, 12B.

In the following, examples will be described for a Group Member setup procedure, i.e. examples of how a UE may become a Group Member UE 12A, 12B.

Figure 4:
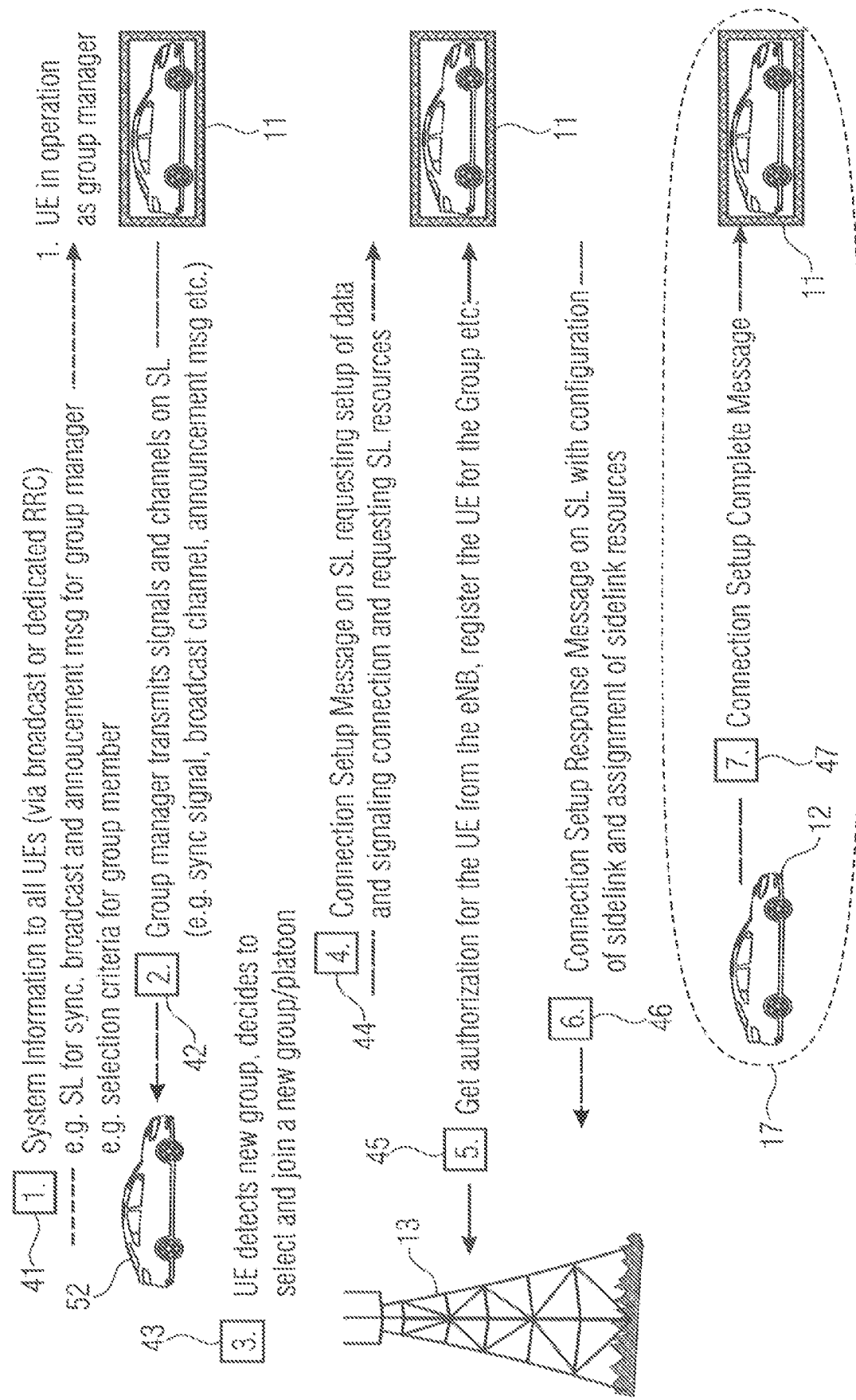
FIG. 4 shows an example of a message flow for providing a Group Member UE according to an embodiment.

For a brief introduction reference shall be made to FIG. 4 which shows an overview of how an UE may become a Group Member UE 12. For this purpose, the messages 41 to 47 may be transmitted between UEs 11, 12, 52 and the base station 13. In this example, before a UE becomes a Group Member UE 12, it may be one of an above described foreign UEs 52 that may either be within another UE Group or that is not yet a member of any UE Group.

Similar to above discussed FIG. 3, also in FIG. 4 all the UEs may receive system information from the base station 13 in the first step 41. Said system information may be sent via broadcast or dedicated RRC signaling over the first interface.

Based on this system information UEs 52 with side link capabilities and with Group Member capabilities will be able to monitor respective side link resources and may find signals and channels transmitted by Group Managers in its proximity.

For example, the depicted Group Manager UE 11 may transmit a signal to a yet foreign UE 52 in the second step 42. The signal transmitted by the Group Manager UE 11 might be a side link primary and secondary synchronization signal (e.g. PSPSS/PSSSS) for synchronization purposes, to provide an identity (possibly being a UE-Group identity) and to measure the receive signal strength. Channels being transmitted by the Group Manager UE 11 might be a side link broadcast channel with control information (e.g. side link bandwidth, D2D system frame number, TDD UL/DL configuration) or with detailed Group information.

In the third step 43 the yet foreign UE 52 may detect the UE-Group 17 of this Group Manager UE 11 and may make a decision to join this UE-Group 17 based on certain criteria such as, e.g. initiation by a user via a user interface and/or initiation by a car control via a control interface to the UE 52 and/or after decoding of some side link signals and control information. The UE 52 may also consider its power status for the decision.

In case multiple UE-Groups may be visible, the UE 52 may select the Group Manager 11 based on the Receive Signal Strength of the side link, and/or based on priority information part of the control signaling, and/or relative speed and direction, and/or Group capabilities (e.g. coordinated/platoon driving or low bandwidth IOT group), and/or based on the synchronization source (highest priority is typical to GPS/GNSS, followed by base station synchronization, followed by relayed synchronization, followed by independent synchronization source).

After decision in the third step 43 the UE 52 may send a Connection Setup Request message in the fourth step 44. Said Connection Setup Request message may be sent, for instance, via RRC or via predefined messages on the side link requesting the setup of data and signaling connections to the Group Manager UE 11.

The Connection Setup Request message may also contain a service request as well as a request for further system information and additional side link resources.

The message flow might be successfully completed by a response message from the Group Manager UE 11 (e.g. containing further control information, a side link configuration) in the sixth step 46 and a complete message from the UE 52 joining the UE-Group 17 in the seventh step 47. After that, the previously foreign UE 52 is now a Group Member UE 12 of the UE-Group 17 managed by the Group Manager UE 11.

The Group Manager UE 11 may communicate with the network that the network is aware, which UEs 12 are part of the UE-Group 17. For the case that a UE 12 joins or leaves the UE-Group 17 the Group Manager UE 11 may inform the network. In case there was a loss of connection (radio link failure) the Group Manager UE 11 might send an update message to the network with a list of the members of the UE-Group 17.

According to this brief introduction above with reference to FIG. 4, embodiments for such Group Member UEs will be described. One embodiment is depicted in FIG. 9 which is similar to FIG. 1.

Figure 9:
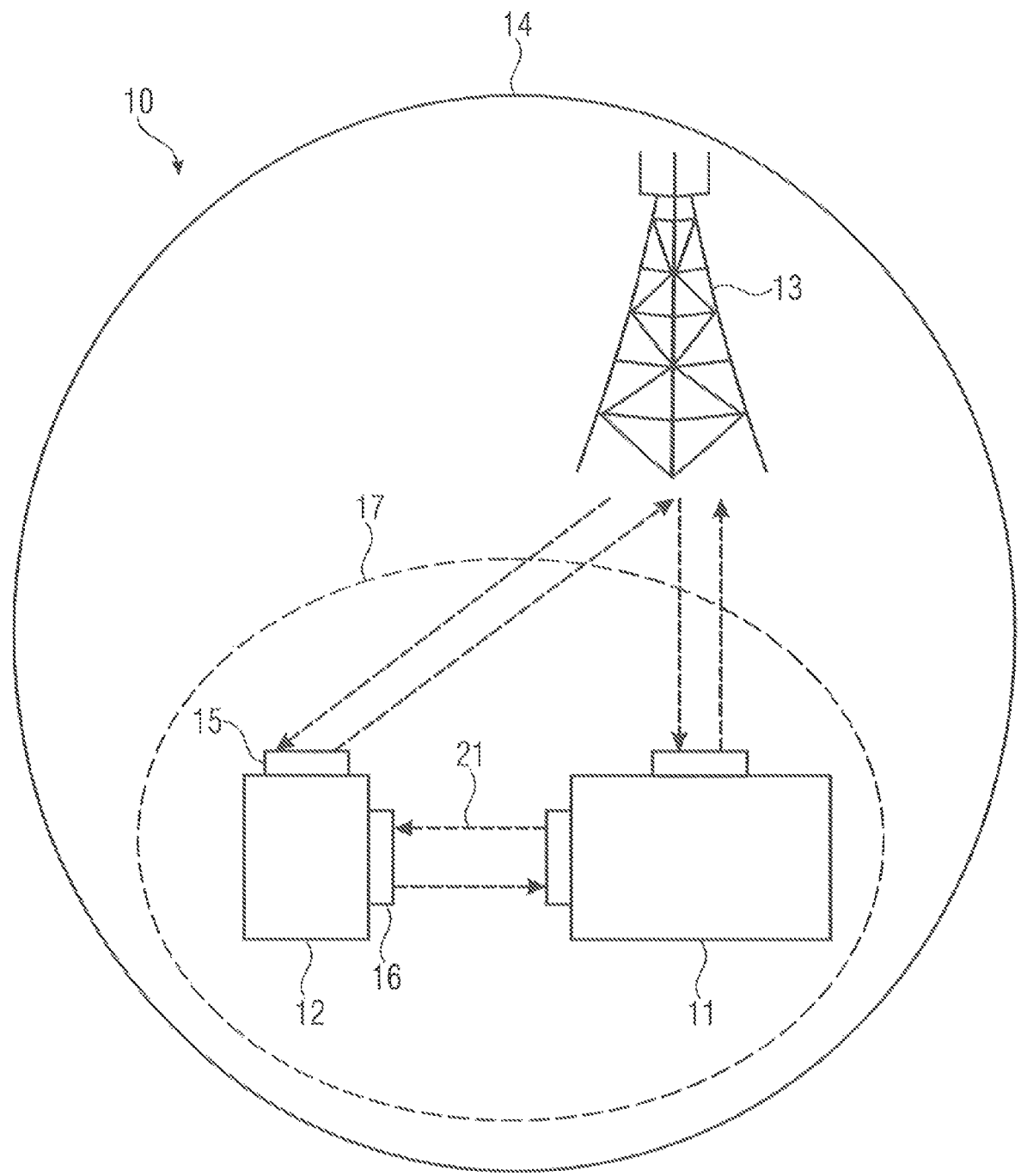
FIG. 9 shows a further embodiment of a User Equipment according to the invention.
Figure 10:
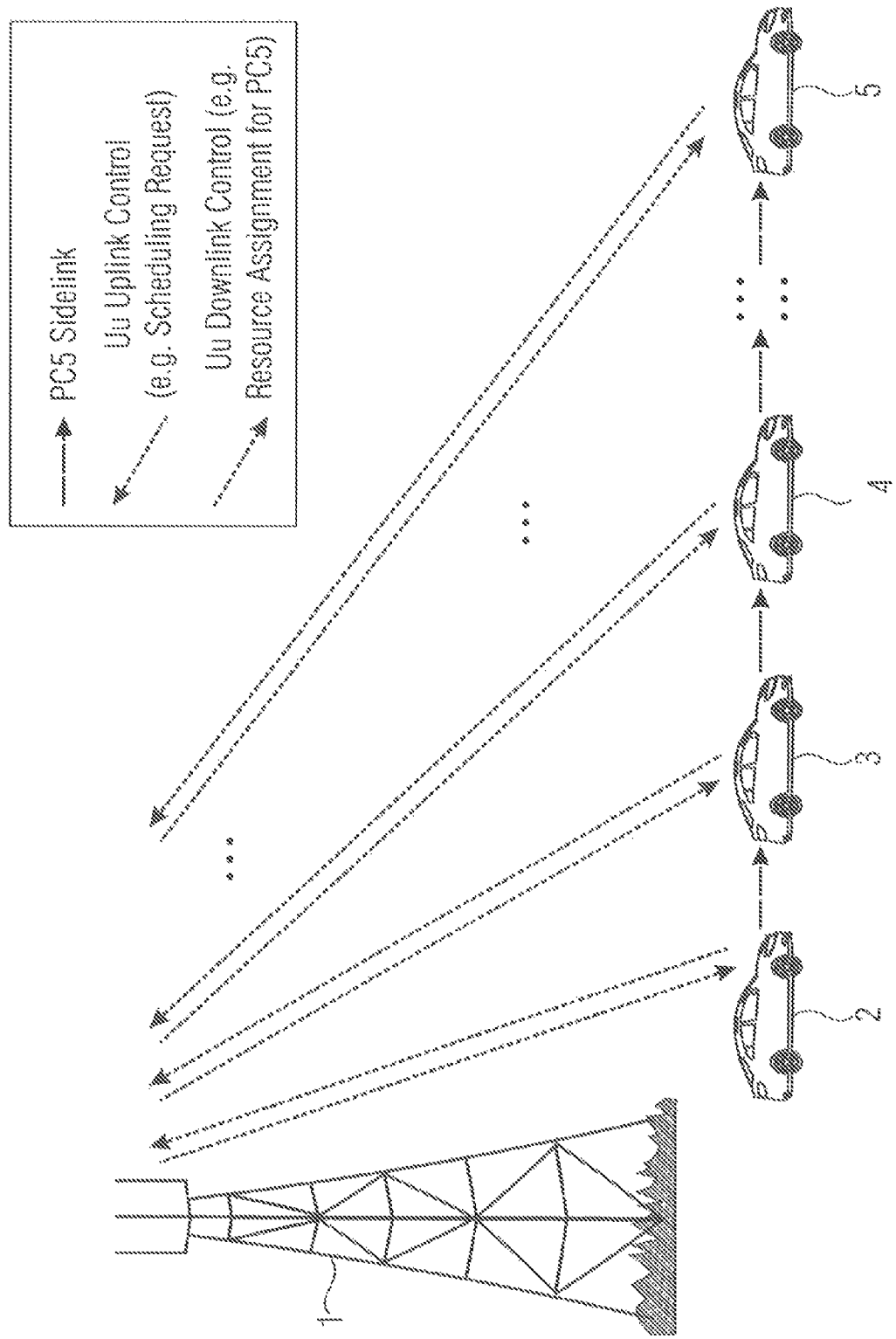
FIG. 10 shows a communication network of the conventional technology.

FIG. 9 shows an UE 12 that is a Group Member UE of the UE Group 17 which is managed by the Group Manager UE 11, as discussed above. Said Group Member UE 12 comprises a first interface 15 for UE-to-Basestation communication configured to communicate with the base station 13 of the cellular network 10.

The Group Member UE 12 further comprises a second interface 16 for UE-to-UE communication configured to communicate with one or more other UEs, which may, for example, be the Group Manager UE 11 or other Group Member UEs (not explicitly depicted here).

According to the invention, the communication is coordinated by a predetermined UE, namely by the depicted Group Manager UE 11.

According to an embodiment, the Group Member UE 12 may comprise two communication paths (which may occasionally also be referred to as communication modes). A first communication path is the one that has been described above, namely wherein the Group Member UE 12 is configured to communicate via its second interface 16 with at least one or more of the other Group Member UEs 11, 12A, 12B of the UE Group 17, wherein the communication is coordinated by the Group Manager UE 11 of the UE Group 17.

In a second communication path, the Group Member UE 12 is configured to communicate via its second interface 16 with at least one or more of the other Group Member UEs 11, 12A, 12B of the UE Group 17, wherein the communication is coordinated by the base station 13.

Once the UE 12 joins the UE-Group 17 the sidelink resources for UE-to-UE communication may be controlled by the group manager UE 11. Any transmission on the sidelink may be controlled by the group manager 11. Therefore scheduling requests, measurements etc. may have to be reported to the group manager 11 that may control the resources within the UE-Group 17 centrally.

Nevertheless, depending on the state, the UE 12 may also be in direct communication with the base station 13 on the first interface. This decision may be done by the UE 12 independently of the group manager UE 11. That means if the UE 12 may be part of the UE-Group 17 the group manager 11 may centrally control resources of the sidelink (the second interface) while the base station 13 may control resources of the uplink/downlink (the first interface).

It is up to the UE 12 (and criteria might be controlled by the base station 13 and/or the group manager UE 11) to select the interface to be used for communication. V2V data within the UE-Group 17 may be sent on the sidelink (second interface) controlled by the group manager UE 11. Similarly small packets up to a certain size, a data rate, a certain max. latency might be routed via the group manager UE 11.

For other data (e.g. larger packets or higher bit rates or delay critical data to the network) the UE 12 may decide to send via the uplink/downlink with the base station 13. In case UE 12 is not yet connected to the base station 13 it may send a random access message to the base station 13. In a next step it may send a scheduling request via PUCCH or a buffer status report on the shared channel to request Uplink resources from the base station 13.

That is, physical resources 211 for side link communication may be provided by the Group Manager UE 11 in the first mode. Additionally or alternatively, physical resources 212 for side link communication may be provided by the base station 13 in the second mode.

Accordingly, the Group Member UE 12 may be configured to get assigned physical resources of the second interface 16 from the Group Manager UE 11 for a communication within the UE Group 17.

According to an example, these physical resources may be pre-allocated by the cellular network 10.

FIG. 5 shows a further embodiment of a Group Member UE 12 which may be configured to send and/or receive data relayed by a Group Manager UE 11.

According to this embodiment, the Group Member UE 12 (12A$_1$, 12B$_1$, 12A$_2$, 12B$_2$) may be configured to send predetermined data 22 via the second interface in a manner relayed by the predetermined Group Manager UE 11 to the base station 13. Said predetermined data 22 may be control information data and/or user data.

In other words, the Group Member UE 12 is configured to send data to the base station 13 via a relay, wherein the Group Manager UE 11 acts as the relay in this example. However, the Group Member UE 12 may use other Group Member UEs (or even UEs of other UE Groups) as a relay.

Additionally or alternatively, the Group Member UE 12 (12A$_1$, 12B$_1$, 12A$_2$, 12B$_2$) may also be configured to receive predetermined data 22 via the second interface in a manner relayed by the predetermined Group Manager UE 11 from the base station 13. Said predetermined data 22 may be control information data and/or user data.

In other words, the Group Member UE 12 may be configured to receive data from the base station 13 via a relay, wherein the Group Manager UE 11 may act as the relay in this example. However, the Group Member UE 12 may use other Group Member UEs (or even UEs of other UE Groups) as a relay.

As can be seen in FIG. 5, said predetermined data 22 may be relayed by the Group Manager UE 11 in the described uplink and/or downlink direction.

According to yet another embodiment, the Group Member UE 12 may be configured to decide, based on a predetermined criterion, to send the predetermined data 22 via the first interface 15 directly to the base station 13 or to send the predetermined data 22 via the second interface 16 in a manner relayed by the predetermined Group Manager UE 11 to the base station 13.

Yet another aspect of the invention is packet duplication in up- and downlink direction. The base station may decide to send the same predetermined data or message directly to the UE (12) via the first interface (15) as well as relayed via the UE (11) via the second interface (16). This will increase the reliability of the data which is an important aspect for services requiring ultra-high reliability.

Accordingly, the Group Member UE 12 may decide based on said criterion whether to send said predetermined data in an uplink direction either directly to the base station 13 or to have that predetermined data relayed by the Group Manager UE 11 to the base station 13.

Additionally or alternatively, the Group Member UE 12 may be configured to decide, based on a predetermined criterion, to receive the predetermined data 22 via the first interface 15 directly from the base station 13 or to receive the predetermined data 22 via the second interface 16 in a manner relayed by the predetermined Group Manager UE 11 from the base station 13.

In downlink it is not the UE 12 that decides to receive data on the downlink or the sidelink. It is the base station 13 that decides the path the data is send. The UE in the downlink just follows the configuration of the downlink received by the base station 13 and the configuration of the sidelink received by the group manger UE 11.

Once the UE joins the UE-Group 17 decisions are done if relaying via the group manager UE 11 is possible or not. This is also known by the base station that might receive relayed data from the UE 11. The base station 13 is also aware of its direct link to the group member UE 12, the UE RRC state (connected to the base station or not connected to the base station) and is aware if it has received scheduling requests in the uplink. The base station also knows all details about the downlink data that shall be send to the UE 12. If this data is delay critical, how many packets need to be send, the data rate, the QoS that is required etc. Furthermore the base station is aware of the priority of this data and all the other data that is to be scheduled to other UEs. The base station 13 also knows the quality and radio efficiency (e.g. the coding/modulation and the beam forming) of the two links 15, 16. Based on all this information, it is the base station scheduler that makes the decisions in the downlink.

Accordingly, the Group Member UE 12 may decide based on said criterion whether to receive said predetermined data in a downlink direction either directly to from base station 13 or to receive said predetermined data from the Group Manager UE 11 that relays said predetermined data from the base station 13.

According to the invention, the Group Member UE 12 may be configured to receive said predetermined criterion from the base station 13, for example via system information that the Group Member UE 12 may have received from the base station 13, for instance, during the first step 41 shown in FIG. 4.

While the base station 13 may provide some decision criteria to relay or not relay the predetermined data 22, one selection criterion may be the message size, periodicity, minimum and/or maximum delay demands, a Power Class and/or Power Headroom, a battery status of the Group Member UE 12, a distance from a base station 13, or an availability of physical resources assigned to the Group Member UE 12, or the amount of data in the queue.

While certain messages or services may be relayed, e.g. voice service, V2V or V2X messages may be handled by the Group Manager UE 11 or certain UEs in the UE Group 17 that are assigned sidelink resources. For example small V2X messages, i.e. messages having a size below a predetermined threshold, may be relayed via the Group Manager UE 11.

According to an embodiment, the Group Member UE 12 may be configured to receive control information from the base station 13 via its first interface 15 and/or from the Group Manager UE 11 via its second interface 16.

The Group Member UE 12 may be configured to determine from the control information its transmission and reception behavior of its second interface 16.

The control information may comprise, for example at least one of

- an information as to which services and/or logical channels and/or data bearers and/or data flows and/or service flows are to be relayed in the uplink to the base station 13 in manner relayed by the Group Manager UE 11 or to be directly sent from the Group Member UE 12 to the base station 13;
- information as to a network connection state of the UE 12 that the UE 12 is to use when being connected to a UE Group 17;
- information about if paging and/or system information and/or system information updates and/or packets of a predetermined size are to be received in the downlink in a manner relayed by the Group Manager UE 11 or to be received by the Group Member UE 12 directly from the base station 13;
- information if the Group Member UE 12 is to relay configuration data and/or user data to the Group Manager UE 11 via the second interface 16 or to send said configuration data and/or user data directly to the base station 13.

For explaining more details of this control information that may be used for a connection setup process for a foreign UE 52 to become a Group Member UE 12, it shall be referred to FIG. 4 again.

In the first step 41, the base station 13 may send system information to all UEs in the cell served by said base station 13.

The UE 52 is not yet a member of the UE Group 17 managed by the Group Manager 11 but it wants to become a Group Member UE 12. Thus the UE 52 that wants to join the UE Group 17 may, in this case, still be a foreign UE 52, as described above.

The UE 52 may be configured to receive a signal from the base station 13 that indicates the support of UE Group Functionality, e.g. group relays and/or Group Managers and/or Group Members. The UE 52 may be configured to use side link transmission and reception, i.e. UE-to-UE communication via its second interface 16.

The UE 52 may further be configured to connect to a Group Manager UE 11 and to indicate its interest to connect to another UE 11 operating as a group relay and/or Group Manager UE 11.

According to an example, the UE 52 may be configured to base its decision to connect on at least one predetermined criterion.

One criterion to connect may be, for instance, an initiation by a user via a user interface at the UE 52, which may be for example a handset and/or a car.

In the latter case, the UE 52 may be configured to base said decision to connect on, for instance, on an initiation by a car control connected to the UE 52 via a control interface, e.g. after some message exchange via other radio technologies and/or wireless network protocols such as WI-FI or 802.11p.

One further exemplary criterion may be, for instance, having successfully received and decoded a synchronization signal (e.g. physical sidelink primary or secondary synchronization signal—PSPSS/PSSSS) of a group relay and/or a Group Manager UE 11 with or without an embedded UE identity associated to a group relay and/or Group Manager UE 11.

One further exemplary criterion may be, for instance, having successfully received and decoded control information sent on a physical sidelink broadcast channel (e.g. information about sidelink bandwidth, D2D system frame number, TDD UL/DL configuration).

One further exemplary criterion may be, for instance, having successfully received and decoded a V2V control message (e.g. relay group announcement message) from a group relay and/or a Group Manager UE 11 and/or a physical sidelink discovery channel or a physical sidelink shared channel.

One further exemplary criterion may be, for instance, decoding one or more V2V messages detecting that there is a relay group and/or UE Group 17 in its proximity which Member UEs are moving with the same direction and/or speed. Said detecting may be done, for instance, by evaluating the sidelink signal strength (e.g. Reference Symbol Receive Power or Reference Symbol Receive Quality) against a threshold detecting that the signal strength of the sidelink is sufficiently good to connect to the group relay and/or Group Manager UE 11. Additionally or alternatively, said detecting may be done, for instance, by considering its battery status and/or its connection to power, detecting that it is advantageous to connect to group relay and/or a Group manager UE 11 for power saving.

According to yet a further example, the base station 13 may be configured to control the decision of the UE 52 to connect to a certain Group Manager UE 11.

According to an example, this controlling may be done by providing side link resource information to the UE 52 to receive and decode a signal or a control message from a Group Member UE and/or a Group Manager UE 11 to indicate to the UE 52 what resources it shall monitor and decode.

Said resource information may, for instance, be a side link reception pool. Furthermore, the information may be sent to the UE 52 via broadcast signaling or dedicated RRC signaling.

According to yet a further example, this controlling may be done by providing at least one Group Manager selection criteria. As an example, said selection criteria may be a threshold for side link signal strength (e.g. Reference Symbol Receive Power or Reference Symbol Receive Quality) and/or a certain V2V control message.

As depicted by the second step 42 in FIG. 4, the Group Manager UE 11 may transmit signals and/or channels via the side link communication to the UE 52 that wants to connect to a certain UE Group 17.

Thus, according to an example, the UE 52 may be configured to receive and/or decode a signal from a specific Group Manager UE 11 to connect to.

According to an example, the UE 52 may be configured to receive side link signals (e.g. a primary and secondary synchronization signal) and/or synchronize to the signals and/or to make a signal strength measurement (e.g. RSRP and RSRQ) on the signal and/or to decode an identity from the signal and/or to identify another UE Group from the signal.

According to a further example, the UE 52 may be configured to receive additional control information from the UE Group via decoding a side link broadcast channel (e.g. PSBCH) and/or a side link control channel (e.g. PSCCH).

According to yet a further example, the UE 52 may be configured to receive and decode other V2X messages on a side link data channel (e.g. PSSCH) with information about other UE Groups such as direction, speed, target, number or members, selection priority, synchronization source etc.

Based on one or more of the information and criteria mentioned above, the UE 52 may take its decision (third step 43) to join a certain UE Group 17, which joining may be done, for instance, by connecting to the respective Group Manager UE 11 of this UE Group 17.

According to an embodiment, the UE 52 may be configured to send a connection setup request message (fourth step 44) via the second interface 16 to the Group Manager UE 11 in order to request the Group Manager UE 11 to send at least a portion of the configuration data and/or control information to the UE 12 via the second interface 16. The UE 52 may, for example, request the Group Manager UE 11 to assign physical resources for the side link communication (i.e. for the second interface for the UE-to-UE communication).

According to a further embodiment, the UE 52 may also be configured to receive a connection setup response message from the Group Manager UE 11, wherein said connection setup response message may comprise at least the requested control information.

As mentioned above, the control information may comprise, for example at least one of
- an information as to which services and/or logical channels and/or data bearers and/or data flows and/or service flows are to be relayed in the uplink to the base station 13 in manner relayed by the Group Manager UE 11 or to be directly sent from the Group Member UE 12 to the base station 13;
- information as to a network connection state of the UE 12 that the UE 12 is to use when being connected to a UE Group 17;
- information about if paging and/or system information and/or system information updates and/or packets of a predetermined size are to be received in the downlink in a manner relayed by the Group Manager UE 11 or to be received by the Group Member UE 12 directly from the base station 13;
- information if the Group Member UE 12 is to relay configuration data and/or user data to the Group Manager UE 11 via the second interface 16 or to send said configuration data and/or user data directly to the base station 13.

As mentioned above, according to one example the UE 52 may be configured to receive physical resources for the side link communication and/or control information and/or at least a portion of the configuration data from the base station 13. For example, the UE 52 may receive physical resources and/or control information and/or configuration data from the base station 13 via system information (e.g. broadcast as part of the cell's group manager configuration) or via dedicated RRC signaling (e.g. as part of a RRC reconfiguration message).

According to a further embodiment, the UE 52 may be configured to determine from said control information its transmission and reception behavior of at least its second interface.

For example, the control and/or configuration information may comprise an information as to which services and/or logical channels or data bearers are to be relayed in the uplink to the base station 13 via the Group Manager UE 11 and which should be sent directly to the base station 13.

As a further example, the control and/or configuration information may comprise information about the RRC state the UE 52 should use once being connected to a Group Manager UE 11, e.g. RRC Inactive State or a new RRC state that indicates that the UE 52 is connected to a Group Manager UE 11.

As a further example, the control and/or configuration information may comprise information about if paging and/or system information and/or system information updates and/or small packets in the downlink are to be relayed via the Group Manager UE 11 or should be received directly from the base station 13.

As a further example, the control and/or configuration information may comprise information if the UE 52 is to relay uplink control data (e.g. RRC messages) and/or other user data toward the Group Manager UE 11 or should send such data directly to the serving base station 13.

As discussed above, but stated yet in different words, after the UE 52 may have decided to join the UE Group 17 managed by the Group Manager UE 11, the UE 52 may send a request to the Group Manager UE 11 to join said UE Group 17.

As depicted by the fourth step 44 in FIG. 4, the UE 52 may be configured to send a connection setup request message via the second interface to the predetermined Group Manager UE 11 in order to request the predetermined Group Manager UE 11 to send the control information to the UE 52 via the second interface.

That is, the UE 52 may request the predetermined Group Manager UE 11 to send control information regarding side link configuration details, for instance.

For example, the UE 52 may be configured to request from the predetermined Group Manager UE 11 (e.g. by means of the aforementioned setup request message) setup of data and/or signaling connection and requesting physical resources for transmission on the side link.

The request message to the Group Manager UE 11 might also contain a request to provide further system information with configuration details.

According to an example, the UE 52 may be configured to wait for a connection setup response message on the side link from the Group Manager UE 11.

Furthermore, the UE 52 may be configured to receive and/or decode the setup response message and to configure its second interface (side link) for transmission and reception.

According to yet a further embodiment, the UE 52 may be configured to receive a connection setup response message from the predetermined Group Manager UE 11.

As depicted by the sixth step 46 in FIG. 4, the UE 52 may receive the setup response message from the predetermined Group Manager UE 11 via the second interface, i.e. via side link. The connection setup response message may comprise at least side link setup information, based on the configuration data, which may be used by the UE 52 for setting up and configuring its side link and/or an assignment of side link (physical) resources, for instance. The side link resources may be provided by the Group Manager UE 11 via the second interface.

In an optional seventh step 47, the UE 52 may be configured to signal the predetermined Group Manager UE 11 that the connection setup is complete. Thus, the UE 52 is successfully connected to the Group Manager UE 11 and has thus become a Group Member UE 12 of the UE Group 17 managed by said Group Manager UE 11.

In the above examples, it has been described how a UE 52 may connect to one single predetermined Group Manager UE 11. However, in real network scenarios it may happen that there are a multitude of Group Manager UEs, each of which may manage a UE Group.

In this case, the UE 52 may have to decide which one of the UE Groups it might want to join.

Therefore, according to an embodiment, the UE 52 may be configured to select one predetermined Group Manager UE 11 out of a multitude of predetermined Group Manager UEs based on a signal characteristic of signals received from said multitude of predetermined Group Manager UEs, and to receive the physical resources and/or the above mentioned control information from the selected one of the predetermined Group Manager UEs.

In other words, the UE 52 may decide which UE Group to join based on certain signal characteristics from signals that it might have received from a multitude of nearby Group Manager UEs 11.

For example, the UE 52 may be configured to select a specific Group Manager UE 11 to connect to from multiple receive signals transmitted by multiple Group Manager UEs based on, for example, the measured signal strength of the side link (e.g. RSRP and RSRQ) and/or based on certain selection priorities being part of the control information provided by the Group Manager UE 11 and/or based on the synchronization source (e.g. GPS, a based station or none of it) and/or based on the identity broadcasted by the Group Manager UE 11.

Additionally or alternatively, the UE 52 may also be configured to select the one predetermined Group Manager UE 11 based on a selection criterion, wherein said selection criterion is provided by the base station 13.

In other words, the base station 13 may be configured to provide the UE 52 with at least one selection criterion based on which the UE 52 chooses one of the multitude of Group Manager UEs 11 to connect to.

For example, said selection criterion may be a threshold for side link signal strength (e.g. Reference Symbol Receive Power or Reference Symbol Receive Quality), and/or it may be a certain V2V control message.

A lot of further functions and capabilities may be realized by a Group Member UE 12.

For example, a Group Member UE 12 may be configured to receive control signaling indicating a change of its Group Manager UE 11.

As a further example, a Group Member UE 12 may be configured to perform sensing for better UE Groups to join while being connected to a Group Manager UE 11. A handover request may be initiated when reaching a certain threshold or when a UE Group with higher capabilities is sensed.

As a further example, a Group Member UE 12 may be configured to request an inter-group handover by sending a control message to the base station 13 (either directly or in a relayed manner).

The invention also concerns the base stations 13 which have to be configured such that the above described communication between Group Manager UEs 11 and Group Member UEs 12A, 12B may be possible within the cell served by said base station.

According to an embodiment the base station 13 may be configured to communicate with one or more UEs 11, 12A, 12B of a UE Group 17, wherein the base station 13 comprises two modes.

In a first mode the base station 13 may coordinate the communication with the one or more UEs 11, 12A, 12B of the UE Group 17.

In a second mode the base station 13 may appoint a predetermined UE 11 for coordinating the communication within the UE Group 17. In other words, the base station may appoint a Group Manager UE 11 that is responsible for coordinating the side link communication in the way as described above.

According to an embodiment the base station 13 may be configured to send configuration data to the appointed UE (11), wherein said configuration data contains information for the appointed UE (11) how to configure its communication interface (16) for a UE-to-UE communication so as to coordinate the communication between the one or more UEs (11, 12A, 12B) of the UE Group (17). In other words, the configuration data configures the appointed UE to become a Group Manager UE 11 having Group Management and/or Group Communication functionality (e.g. coordinating intra-group and/or inter-group communication).

According to yet a further embodiment the base station 13 may be configured to provide to the appointed Group Manager UE 11 physical resources for the communication between the one or more UEs 11, 12A, 12B of the UE Group 17.

Since the Group Manager UE 11 is also a member of its UE Group 17, the Group Manager 11 may be considered as being a Group Member UE, but with having Group Management and/or Group Communication and/or Group Coordination functionality.

According to yet a further embodiment, the base station 13 may support relaying of data by one or more of the Group Member UEs of a UE Group, in particular by the Group Manager UE.

According to this embodiment, the base station 13 may be configured to send predetermined data to a first UE 12A, 12B of a UE Group 17 via a second UE 11 of the UE Group 17 in a manner relayed by the second UE 11, or to receive predetermined data from a first UE 12A, 12B of the UE Group 17 via a second UE 11 of the UE Group 17 in a manner relayed by the second UE 11.

Further examples and embodiments for the base station according to the invention may be described in the following. However, it should be understood that the base station 13 is configured to provide means for each of the features that have been discussed above with respect to the UEs, and in particular with respect to the Group Manager UE 11 and the Group Member UEs 12A, 12B. That is, the features of the Group Manager UEs 11, the Group Member UEs 12A, 12B and the base station 13 may be interchangeable.

Furthermore, it should be understood that each device feature of the base station 13 and/or of the UEs 11, 12A, 12B may of course also be formulated as a respective method step such that these method steps are at least implicitly disclosed herein.

Accordingly, further examples and embodiments of the present invention provide a base station 13 that is configured to be in communication with one or more UEs 11, 12A, 12B, and which may optionally be configured to support relay UEs 11 acting as a Group Manager UE 11.

According to an example, the base station 13 may be configured to send broadcast information and/or radio resource control information to indicate its support of UEs 11 acting as a Group Manager in the cell and/or to provide configuration information to the Group Manager UE 11 and/or to Group Member UEs 12A, 12B supporting this functionality.

According to an example, the base station 13 may be configured to do so by sending a bit that indicates the support of this function and/or by sending a separate system information block with configuration details for the group/platoon manager and/or the UEs member of a group/platoon.

According to an example, at least a portion of the system information with configuration data for the Group Manager UE 11 may be sent on request to the Group Manager UE 11 supporting this functionality.

According to a further example, at least a portion of the system information with configuration data for Group Member UEs 12A, 12B may be sent on request to the Group Member UEs 12A, 12B supporting this functionality.

According to a further example, the base station 13 may be configured to receive a RRC control message with a request from a UE 11 supporting Group Management functions to become a Group Manager UE 11.

For example, the base station 13 may be configured to forward said request to a Mobility Management Entity in the core network, e.g. via the S1-MME interface in case of being EPC connected. Additionally or alternatively, the base station 13 may be configured to forward said request to the Core Network Control Plane Function, e.g. via the N2 interface in case of being 5G core connected.

According to an example, the core network may be configured to authorize the UE 11 to become a Group Manager UE 11 via a response message and/or to provide security credentials and other required control information.

According to yet a further example, the base station 13 may be configured to send a RRC control message to respond to the request to become a Group Manager UE 11 and to provide detailed configuration information.

Said detailed configuration information may be a portion of the control information and may, for instance, comprise at least one of an SL resource pool configuration, a Relay configuration (max. packet size, only V2X traffic/VOIP), Group parameters (max. UEs, type of supported services e.g. low latency), Feedback configuration (keep alive or periodic group member status).

According to this example, the base station 13 is configured to send control information to the Group Manager UE 11. However, the base station 13 may also be configured to receive control information from the Group Manager UE 11.

Therefore, the base station 13 according to yet another example may be configured to be connected to a Group Manager UE 11 and to receive at least a portion of the control information from the Group Manager UE 11. Said portion of control information may, for instance, contain a request to add (UE joins) or to remove (UE leaves) a UE 12A, 12B (e.g. with a certain user identity) to/from a UE Group 17 (e.g. with a certain UE Group Identity).

Said portion of control information may, for example, comprise at least one of SL pool adjustments, SL broadcast adjustments (available resources, group full), Group member left notification, Group member configuration (Group ID, capabilities, granted services), or RRC reconfiguration message (passed on to joining UE).

According to a further example, the base station 13 may be configured to be in communication with one or more configured Group Manager UEs 11 that may be, for instance, in RRC connected state and may be assigned a unique identity in the cell.

According to a further example, the base station 13 may be configured to schedule resources for the Group Manager UE 11 using a downlink control channel (e.g. PDCCH)

According to a further example, the base station 13 may be configured to use beam forming for the downlink control channel and/or the downlink shared channel and/or the side link channel to the Group Manager.

According to a further example, the base station 13 may be configured to transmit pre-coded dedicated reference symbols to support UEs channel estimation.

According to a further example, the base station 13 may be configured to use channel feedback information provided by the Group Manager UE 11. Said channel feedback information may, for instance, be at least one of a beam index indication, a rank indication, a pre-coding matrix indicator etc.

According to a further example, the base station 13 may be configured to use uplink measurements on the demodulation reference symbols and/or the data symbols of uplink shared channel (e.g. PUSCH) or the uplink control channel (e.g. PUCCH). For example, Time Division Duplex mode can be based on channel reciprocity.

According to a further example, the base station 13 may be configured to use other information available at the gNB 13, e.g. angle of arrival of the receive signal, UE position information.

According to a further example, the base station 13 may be configured to use link adaptation for the downlink control channel and/or the downlink shared channel and/or the sidelink channel.

In this case, the base station 13 may be configured to transmit with different coding and/or modulation.

According to a further example, the base station 13 may be configured to use channel feedback information provided by the Group Manager UE 11. Said channel feedback information may, for instance, be at least one of a channel quality indicator, a suggested coding and/or modulation scheme.

According to a further example, the base station 13 may be configured to use uplink measurements on the demodulation reference symbols and/or the data symbols of uplink shared channel (e.g. PUCCH) or the uplink control channel (e.g. PUCCH). For example, Time Division Duplex mode can be based on channel reciprocity.

According to a further example, the base station 13 may be configured to use other information available at the gNB 13 such as measurement of pathloss, UEs timing advance or UE position information.

According to yet a further example, the base station 13 may be configured to connect to a V2X server receiving a message from the server triggering the initiation to configure a UE as a Group Manager UE 11. For example, the V2X server may have knowledge about all UEs 11, 12A, 12B in the cell and the direction and speed and other UE internal information that can be used to trigger the establishment of a UE Group 17.

According to yet a further example, the base station 13 may be configured to connect to a core network and to communicate with a network to request authorization for UEs 11 to become a Group Manager UE 11 and/or to become a Group Member UE 12A, 12B and/or to provide security credentials.

Figure 6:
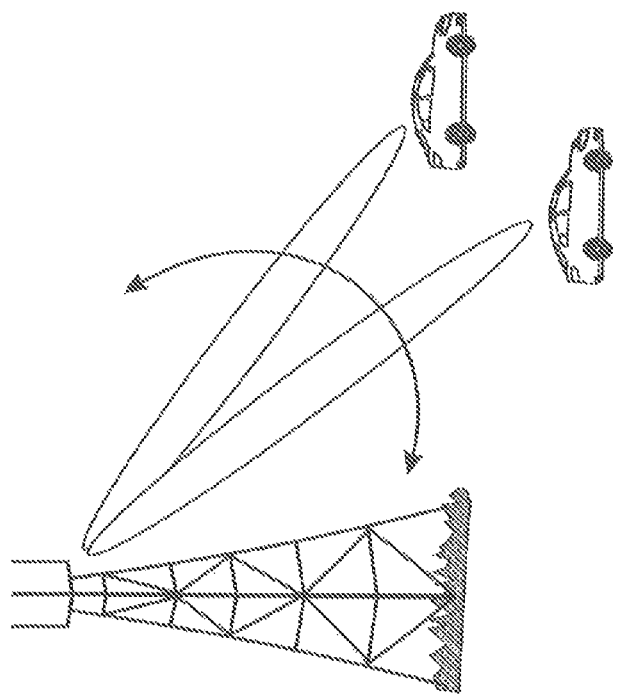
FIG. 6 shows a cellular communication network of the conventional technology.
Figure 6:
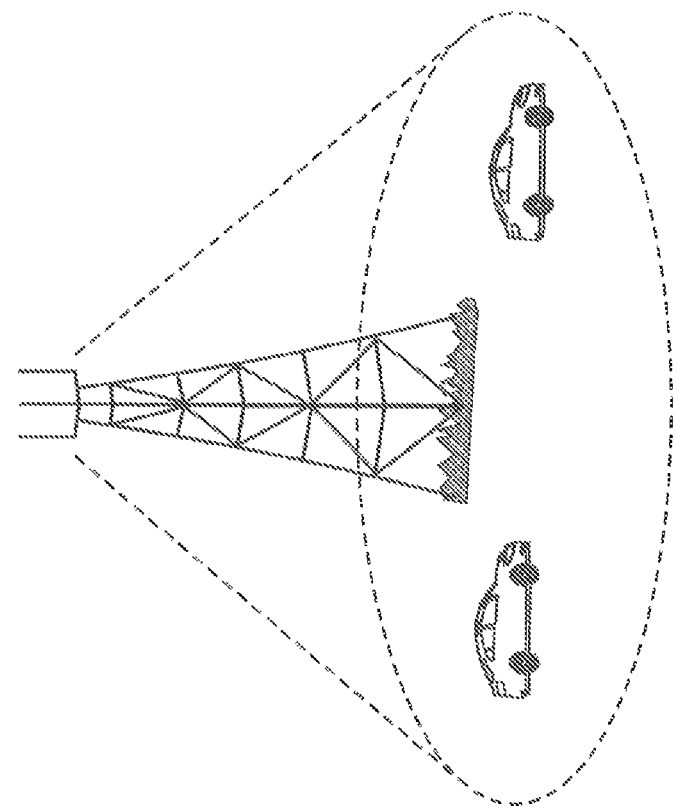
Figure 7:
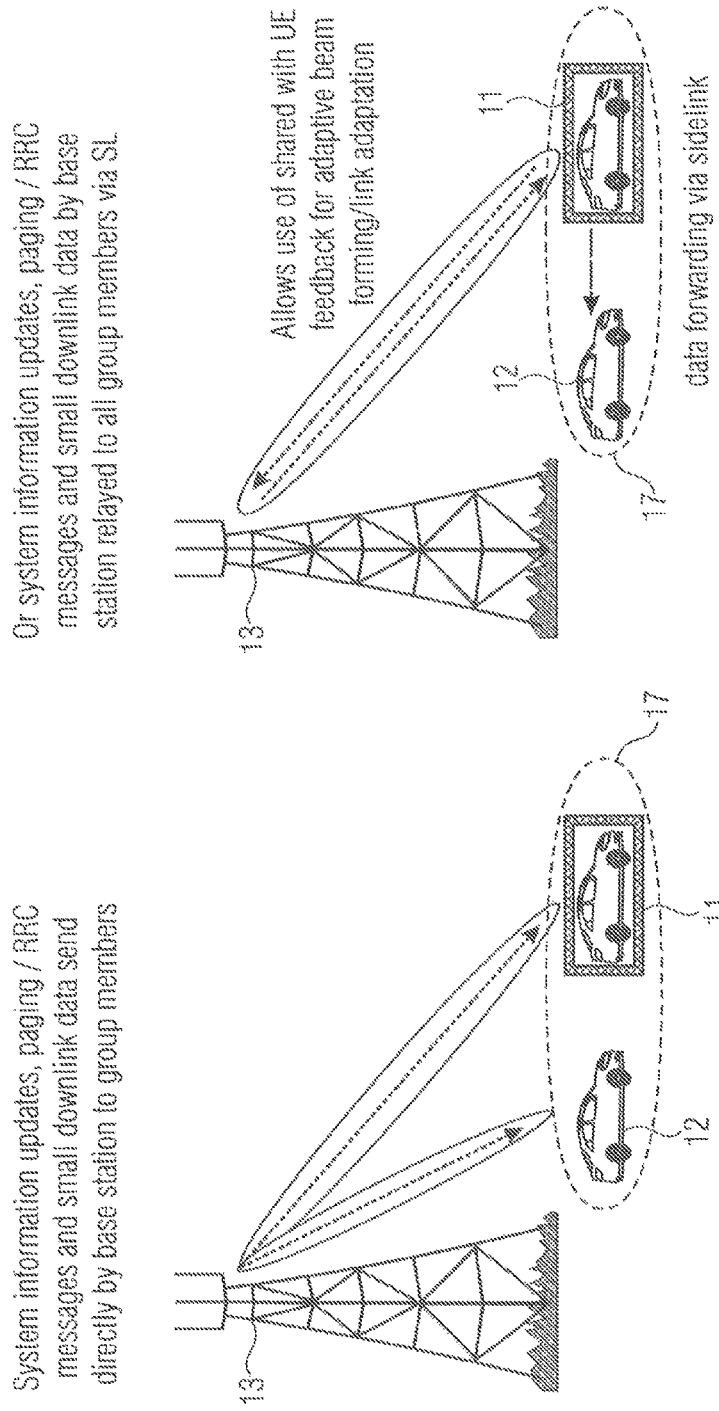
FIG. 7 shows a concept of reception of downlink data directly from the base station or relayed via the Group Manager UE according to an embodiment.
Figure 8:
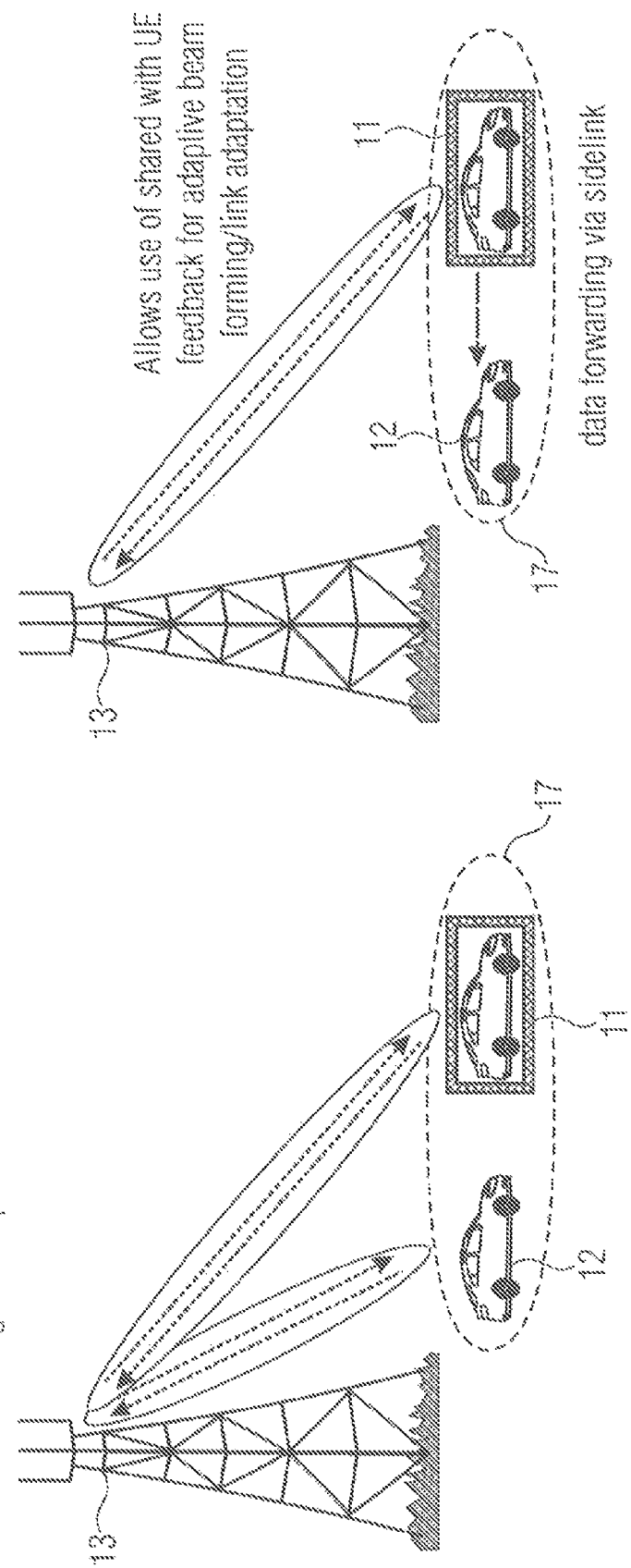
FIG. 8 shows a concept of transmission of data directly to the base station or relayed via the Group Manager UE according to an embodiment.

FIGS. 6, 7 and 8 shall serve to explain why the inventive concept of a communication via a Group Manager UE 11 is advantageous over individual transmissions, in particular for infrequent transmissions of small data packets.

FIG. 6 shows a cellular network according to the, conventional technology with full coverage transmission in LTE (left) versus beam sweeping in 5G (right). FIG. 7 shows an example of reception of downlink data (e.g. system information updates, paging/RRC messages and small packets) directly from the base station 13 or relayed via the Group Manager UE 11. FIG. 8 shows an example of transmission of data (e.g. uplink RRC messages, PUCCH scheduling requests or small packets) directly to the base station 13 or relayed via the Group Manager UE 11.

At present, for example in common LTE networks, UEs may only remain in RRC Connected state for an ongoing data transmission. Otherwise they may move to RRC Idle or RRC Inactive and can only be reached via paging, as shown on the left hand side of FIG. 6. Paging has to be done in the full paging area. Paging is inherently less efficient since link adaptation and per UE beam forming cannot be applied.

For example, in 5G using higher frequency bands, full coverage may only be obtained via time and resource intensive beam sweeping where the energy is concentrated in a certain direction or area, as can be seen on the right hand side of FIG. 6.

FIG. 7 shows an overview of the inventive concept. That is, in case there is a Group Manager UE 11 the base station 13 may connected to said Group Manager UE 11. Thus, there may be no need for paging anymore since the Group Member UEs 12 may be reached from the Group Manager UE 11 via paging.

Additionally or alternatively for closely co-located UEs, the paging beam may be derived from the active link to the Group Manager UE 11. The same may apply for beam sweeping of system information. Dedicated transmissions with beam forming are much more efficient compared to beam sweeping over the whole cell area. System information in 5G is thus provided more often on a request basis per UE. In this invention the system information as well as system information updates to all UEs 12 may simply be provided via a Group Manager UE 11 which may optionally provide a relay functionality.

A benefit when being relayed via the Group Manager UE 11 may be that the Group Manager UE 11 may be in RRC Connected mode and may thus provide feedback such as HARQ to the base station 13.

On the shared channel with UE specific pre-coded reference symbols may be used.

Due to feedback information such as Channel Quality Reporting, Rank Indicators or Pre-Coding Matrix indicators the link may provide a much higher spectral efficiently compared to a channel using beam sweeping or a channel that has just been established for a single small message that is being sent.

The packet may be forwarded on the sidelink (i.e. UE-to-UE communication via second interface 16) that may be of much shorter range. In case of system information updates or paging messages multicast may be used to forward the data to all the Group Member UEs 12A, 12B of the UE Group 17.

Since the information from multiple UEs 11, 12A, 12B of the UE Group 17 may be forwarded to the base station 13, it is worthwhile to transmit detailed channel state information to the base station 13 to support link adaptation and accurate beam forming.

In case of common transmissions per UE, such feedback information has to be sent by each UE causing significant signaling overhead particularly for small packets or for data that is being sent to many UEs.

Similarly HARQ ACK/NACK feedback information in the uplink may be sent for the combined transmissions of multiple UEs 12A, 12B of the UE Group 17 according to the invention.

In case of a TDD system, due to regular uplink transmissions of the Group Manager UE 11, the channel reciprocity may be exploited more since the Group Manager UE 11 may transmit more often on the uplink.

The Group Manager UE 11 may only decide to act as a Group Manager UE 11 if it may have sufficient battery power or is being connected to a power supply (can be assumed when being used in a car). The Group Member UEs 12A, 12B may actually save power since relaying data to the Group Manager UE 11 in close proximity consumed far less power.

As part of the cell configuration, transmitted already by system information, the base station 13 configures (i.e. decides) if system information updates, paging messages or small data packets should be sent directly by the Group Member UEs 12A, 12B or will be sent via the Group Manager UE 11.

If, for instance, a low frequency is being used for this cell, the base station signal might easily be received by all the Group Member UEs 12A, 12B of the UE Group 17 without the need of forwarding the information via the sidelink.

For uplink/downlink data transmission the base station 13 may configure a certain threshold related to the packet size. A small data packet might be relayed, whereas a larger packet may require the Group Member UEs 12A, 12B to move to RRC Connected state and use a regular data bearer for data transmission/reception.

A similar behavior may be defined for the uplink, where based on configuration (received by the Group Member UEs 12A, 12B either from the base station 13 or from the Group Manager UE 11 during connection setup), the Group Member UEs 12A, 12B may relay RRC messages, small data packets or certain services (e.g. V2V or V2X services, IoT/MTC service, voice service) via the Group Manager UE 11.

The benefit thereof may once again a largely reduced control overhead (e.g. uplink scheduling requests or PDCCH uplink grants/resource assignments are only for a single group manager and not for each UE) as well as a more efficient link due to its more accurate link adaptation and beam forming.

In the following, the invention shall be explained in some other words by means of different bullet points which describe embodiments of the invention. The terms Group and Platoon are interchangeable, as well as the corresponding terms Group Manager and Platoon Manager.

A. Embodiments of a Manager-UE (Also Embodiments for eNB):
- a UE being in RRC Connected State being connected to a serving base station and acting or intending to act as a group/platoon manager having the capability of sidelink transmission and reception and having the capability of acting as a group/platoon manager and deciding to operate as group relay and/or platoon manger and (other UEs of the Platoon might be in another state e.g. Idle or Inactive, since all communication might be relayed via the platoon manager
    - being a moving UE mounted in a car or handset located in the car or a handset connected to equipment in the car
    - IOT case might not be in a car, but stationary IOT cluster with a more powerful group manager UE.
- decoding sidelink signals (e.g. sidelink synchronization signal) and/or sidelink control channels (e.g. sidelink broadcast channel PSBCH or sidelink control channel PSSCH) to detect other UEs in its proximity acting as a group relay and/or platoon manager
    - and/or synchronizing to a sidelink synchronization signal and/or decoding the identity of the source (e.g. a Group/Platoon identity) and/or measuring the signal strength of the sidelink signal
    - and/or decoding the sidelink control information with details about the UE Groups/Platoons in its proximity
    - and deciding not to start operation to become group relay and/or platoon manager
    - and instead selecting another group relay and/or platoon manager to connect to
        - (Procedure for a UE that wants to connect to another platoon will be defined later)
- the decision of the UE to operate as group manager (=platoon manager) being controlled by the serving base station via the base stations downlink control information
    - the downlink control information received via broadcast information on a physical broadcast channel (e.g. PBCH) and/or the physical shared channel (e.g. PDSCH)
    - and/or the downlink control information received via dedicated RRC signalling (e.g. RRC reconfiguration message) based on request from the UE supporting group management functionality
    - the downlink control information being an indicator to support group management functionality in the cell and/or being a separate system information block with configuration details for the group/platoon manager
- upon certain conditions sending a control message to the serving base station requesting the serving base station that it wants to start acting as a group/platoon manager (e.g. named a group creator or platoon creator)
    - whereas certain conditions being an initiation by the user via a user interface at the handset and/or the car
    - whereas certain conditions being an initiation by the car control connected to the UE via a control interface
        - e.g. initiated after two UEs/cars driving behind each other for a certain time and/or with a certain distance of each other
    - whereas certain conditions being a certain number of UEs in proximity detected by the successful reception of sidelink sequences and/or messages (e.g. V2V messages)
        - and after decoding of V2V messages detecting that UEs in its proximity are moving with the same direction and/or speed
    - whereas the request message to the base station might also contain a request to provide further system information with configuration details
    - the control message being a RRC Reconfiguration Request and/or a RRC Service Request and/or an RRC Interest Indication receiving a RRC request message and/or a RRC Reconfiguration message from a base station or a road side unit to order the UE to start operation as a group/platoon manager the base station/road side unit being connected to a V2X server and/or receiving and decoding V2X messages of UEs in its proximity and based on this information ordering the base station to configure a UE as a Group Manager upon reception of base station system information (via broadcast as part of the cell's group manager configuration or dedicated signaling e.g. as part of the group manager configuration) the group manager may or may not relay other control data (e.g. system information updates, paging or other RRC messages) and/or other user data (e.g. for specific services such as V2X, MTC/IoT or voice services)

while the base station may provide some decision criterial to relay or not to relay data, one selection criterial being the message size or the amount of data in the queue considering its battery status and/or its connection to power in its decision start operation to become a group relay and/or platoon manager after having sent a request to the base station to become a group/platoon manager wait for a RRC response message (e.g. RRC Reconfiguration message) to provide the configuration of sidelink operation (e.g. resources to transmit a sidelink synchronization signal, sidelink broadcast channel, sidelink discovery or V2V messages, sidelink shared channel)

after successful decoding the RRC response message configure lower layer for sidelink transmission providing a synchronization signal (e.g. physical sidelink primary or secondary synchronization signal—PSPSS/PSSSS) to other UEs interested in being connected to the group relay UE and sending an group relay identity for the reception of other UEs interested in being connected to the group relay UE providing control information about the sidelink or the group relay functions to other UEs via a physical sidelink broadcast channel (e.g. PSBCH) or via broadcast information mapped on the physical sidelink shared channel (e.g. PSSCH)

by sending a control indication that group relay functionality is supported by providing other sidelink control information (e.g. sidelink bandwidth, D2D system frame number, TDD UL/DL configuration)

announcing its operation as a Group Manager to other UEs via a sidelink control channel (e.g. PSCCH) or a sidelink discovery channel by sending a periodic announcement message that group relay functionality is supported and other moving UEs being connected to the group relay UE forming a moving UE group or platoon being at the front or in the middle of the group or the platoon providing uplink control information towards the base station for the UE group or the platoon e.g.

Scheduling Requests via a control channel (e.g. PUCCH), Buffer Status Reports in-band on a shared channel (e.g. PUSCH) via MAC Control Elements while the scheduling requests might request resources for the uplink and/or the sidelink while scheduling requests might comprise data request of other UEs of the platoon on a per UE basis or based on a combined scheduling request (the scheduling request information being used by the eNB to schedule sidelink or uplink transmissions)

Channel State Information via a control channel (e.g. PUCCH)

based on measurements of the platoon manager of the eNB signal the eNB signal being demodulation reference symbols of the downlink shared channel (e.g. PDSCH) and/or downlink synchronization signals (e.g. PSS/SSS)

containing channel quality indicator and/or a suggest coding and modulation scheme (the channel state information being used by the eNB for link adaptation (e.g. to adjust coding/modulation etc.))

containing a rank indicator suggesting a MIMO rank to be used and/or a pre-coding matrix indicator suggesting a pre-coding to be used (the rank indicator and pre-coding index used by the eNB for adaptive MIMO (e.g. to adjust rank and pre-coding))

Power Headroom Reporting in-band on a shared channel (e.g. PUSCH) via MAC Control Elements based on the actual transmission power relative to the maximum transmit power of the platoon manager (the power headroom reporting being used by the eNB for uplink power control)

receiving downlink control information from the serving eNB via a control channel (e.g. PSCCH) containing resource assignments from the eNB for transmissions on the sidelink control channel (e.g. PSCCH) and/or sideling shared channel (e.g. PSSCH) to/from other UEs of the platoon or between UEs of the platoon for transmissions on the sidelink control channel (e.g. PSCCH) and/or sideling shared channel (e.g. PSSCH) to other UEs not part of the platoon or to other platoons for uplink data transmissions on the uplink shared channel (e.g. PUSCH)

during configuration of the platoon manager by the eNB the UE that will become the platoon manager will receive and process one or more RRC Reconfiguration messages with configuration details from the serving eNB for the transmission and/or reception pool to be used for sidelink transmission/reception for uplink control channel (e.g. PUCCH) for channel feedback reporting and/or scheduling requests and/or sending HARQ feedback information for the uplink shared channel (e.g. PUSCH) for data transmission e.g. user plane information of PHY, MAC, RLC and PDCP layer for the uplink random access channel (e.g. RACH)

will transmit one or more RRC Configuration messages with configuration details of the platoon to the serving eNB providing about the UEs that might be or become part of the platoon using certain UE identities (e.g. Common Radio Network Temporary Identity (C-RNTI) for connected UEs or Temporary Mobile Station Identity (TMSI) for Idle UEs or other identities for other UE states (The UEs are thus visible and reachable by the network)

the group/platoon manager receiving connection setup request messages (e.g. RRC Connection Setup Request) from a UE that wants to connect and/or join the Group/Platoon and/or the Group/Platoon Manager and/or the Group Manager asking the base station via a RRC control message is a UE requesting to join a Group/Platoon is authorized to do so performing admission control to accept or reject a connection setup request message
    the admission control decision based on its processing capabilities, the radio signal quality to the base station as well as the UE that wants to connect, the available bandwidths on the uplink to and downlink from the base station and available bandwidth on the sidelink to other UEs transmitting a connection setup message (e.g. RRC Connection Setup) to a UE that previously was sending a connection setup request message (e.g. RRC Connection Setup Request) the control messages being exchanged via a sidelink shared channel (e.g. PSSCH) via a Radio Resource Control protocol and/or via a new control channel for platoon management and/or via pre-defined sidelink messages, the control messages providing
    control information about certain services or logical channels or data bearer that should be relayed in the uplink via the group manager or should be sent directly to the base station
    control information about the RRC state the UE should use e.g. RRC Inactive State
    control information about if paging and/or system information and/or system information updates and/or small packets are relayed via the group manager or should be received directly by the eNB
    control information if handover and/or tracking area update and/or RAN notification area updates are managed by the group manager or by each UE of the group independently the group/platoon manager being in communication to the UEs of its group/platoon exchanging control and data such as
    proving system information to the group members via a multicast transmissions
    exchanging control data within the group/platoon via a control channel or via predefined V2V messages such as
        platoon management and platoon status information exchanges that are mapped to sidelink data channels
        e.g. join/leave platoon, change distance between UEs of the platoon
        platoon status information such as e.g. speed, direction, target or intended actions such as brake, accelerate, overtake
    exchanging user data within the group/platoon
        e.g. by scheduling resources using a sidelink control channel (e.g. PSCCH)
        sharing sensor or video information e.g. from the platoon manager
        communication between UEs e.g. infotainment
    receiving scheduling request information from UEs within the group/platoon that either want to send data within the group/platoon or that want to send data via the group manager/platoon manager to the base station
        forwarding the scheduling request on a uplink control channel (e.g. out-of-band control channel such as PUCCH or in-band Buffer Status Reports as an MAC Control Element on the uplink shared channel (e.g. PUSCH) to the eNB
        multiplexing the scheduling requests of multiple UEs into a joint scheduling request/buffer status report send in the uplink to the controlling base station
    sending sidelink resource assignments to the UEs within the group/platoon
        to allow Member UEs to send data within the group/platoon
        to allow to send data to the group/platoon manager to be relayed to the base station
        to allow and/or to order Member UEs to send signals and control data to UEs outside the Group or the other Groups
    receiving on the sidelink shared channel RRC messages from UEs within the group/platoon to be relayed to the base station
        e.g. to set up unicast sessions/connections towards the base station
    some UEs of the group/platoon might relay the signal/messages of other UEs towards the platoon manager by multi-hop transmission
        (Benefit: Allows for smaller range in case of high bandwidth transmission.)

the platoon manager relaying data packets and/or RRC control messages from other UEs of its platoon received via the sidelink shared channel (PSSCH) and transmitting to the serving eNB it is connected to via the uplink shared channel (e.g. PUSCH)

the platoon manager relaying data packet and/or RRC control messages received from its serving eNB via a downlink shared channel (e.g. PSSCH) and transmitting the data to other UEs of its platoon via the sidelink shared channel (PSSCH)
    while the Packet Data Units of the different UEs are transmitted and/or received in different resource allocations using the same or different logical channels
    while the Packet Data Units of the different UEs can be multiplexed by the MAC layer within single MAC PDUs
        the MAC header information providing control information about the PDU session, the logical channel, the UE the packet belongs to the platoon manager or a UE assigned by the platoon manager being in communication to UEs not belonging to its platoon and/or to other platoons
    transmitting and receiving V2V messages
    making other UEs aware of the platoon by announcement/warning messages the platoon/group manager in communication with the gNB can be requested to pass its context to the network or over the sidelink to another managing capable UE to facilitate changing of the group manager.

the platoon manager configuring and/or scheduling UEs of its platoon to communicate to UEs not belonging to its platoon and/or to other platoons
    configuring multiple UEs for transmission (incl. the platoon manager itself) (Benefit: provides diversity transmission/message duplication by having multiple sidelink transmissions)
    selecting a UE at the end and/or at the front of the platoon Benefit: maximum diversity by transmission at the beginning and at the end of the platoon e.g. in case the platoon manager is in the middle assigning transmission resources of the same pool and/or the same slot/mini-slot/subframe in case of transmission by multiple UEs (Benefit: due to the half-duplex constrain, UEs can either transmit or receive on the sidelink. Using the same resource pool/subframe reduces the resource consumption for transmission, minimizes the reception time and thus power consumption for the receiving UEs provides the transmitting UEs more time for receiving.)

assigning the same physical resources in case for a synchronized transmission by multiple UEs (Benefit: Basically transmit diversity can be provided by the physical layer. The signal looks like multipath reception of a single signal by the receiver and improve the receive signal quality.)

The group manager having a local application server (e.g. V2X Server or local IOT server) for its group. Handling local message exchange and aggregation towards the network.

B. Embodiments of a Member-UE, which is a UE that Wants to Connect to a Group Relay and/or Platoon (Also Embodiments for eNB):

a UE receiving a signal from a base station that indicates the support of group relays and/or platoon manager, the UE having the capability of sidelink transmission and reception and having the capability to connect to a group manager/platoon manager and interested to connect to another UE operating as a group relay and/or platoon manager and the decision to connect being done based on
  initiation by the user via a user interface at the handset and/or the car
  initiation by the car control connected to the UE via a control interface
    e.g. after some message exchange via other radio technologies and/or wireless network protocols such as WI-FI or 802.11p
  having successfully received and decoded a synchronization signal (e.g. physical sidelink primary or secondary synchronization signal—PSPSS/PSSSS) of a group relay and/or platoon manager with or without an embedded UE identity associated to a group relay and/or platoon manager
  having successfully received and decoded control information send on a physical sidelink broadcast channel (e.g. information about sidelink bandwidth, D2D system frame number, TDD UL/DL configuration)
  having successfully received and decoded a V2V control message (e.g. relay group announcement message) from a group relay and/or a platoon manager and/or a physical sidelink discovery channel or a physical sidelink shared channel
  decoding one or more V2V messages detecting that there is a relay group and/or platoon its proximity are moving with the same direction and/or speed
  evaluating the sidelink signal strength (e.g. Reference Symbol Receive Power or Reference Symbol Receive Quality) against a threshold detecting that the signal strength of the sidelink is sufficiently good to connect to the group relay and/or platoon manager
  considering its battery status and/or its connection to power, detecting that it is advantageous to connect to group relay and/or a platoon manager for power saving the UE receiving control information and configuration data from base station via system information (e.g. broadcast as part of the cell's group manager configuration) or via dedicated RRC signaling (e.g. as part of a RRC reconfiguration message) or from the group manager (e.g. as part of the RRC Connection Setup procedure toward the group manager) that defines its transmission and reception behavior such as information about which services or logical channels or data bearers should be relayed in the uplink via the group manager and which should be sent directly to the base station
  information about the RRC state the UE should use once being connected to a group manager e.g. RRC Inactive State or a new RRC state that indicates that the UE is connected to a group manager
  information about if paging and/or system information and/or system information updates and/or small packets in the downlink are relayed via the group manager or should be received directly from the eNB
  information if the UE should relay uplink control data (e.g. RRC messages) and/or other user data toward the group manager or should send such data directly to the serving base station
    while the base station may provide some decision criterial to relay or not to relay data, one selection criterial being the message size, periodicity, available sidelink resources or the amount of data in the queue
    while certain messages or services might be relayed e.g. voice service, V2V or V2X messages may be handled by the group manager or certain UEs in the group that are assigned sidelink resources; small V2X messages might be relayed via the group manager the base station controlling the UEs decision to connect to a group/platoon manager
  providing sidelink resource information to the UE to receive and decode a signal or a control message from a group UE and/or platoon manager to indicate to the UE that resources it shall monitor and decode
    the resource information being a sidelink reception pool
    the information being send to the UE via broadcast signaling or dedicated RRC signaling
  providing group/platoon manager selection criteria
    the selection criteria being a threshold for sidelink signal strength (e.g. Reference Symbol Receive Power or Reference Symbol Receive Quality)
    the selection criteria being a certain V2V control message the UE receiving and decoding a signal from a specific Group Manager to connect to based on
  receiving sidelink signals (e.g. a primary and secondary synchronization signal) and/or synchronizing to the signals and/or the making signal strength measurements (e.g. RSRP and RSRQ) on the signal and/or decoding an identity from the signal and/or identifying another UE Group/Platoon from the signal receiving additional control information from the UE Group/Platoon via decoding a sidelink broadcast channel (e.g. PSBCH) and/or a sidelink control channel (e.g. PSCCH)

receiving and decoding other V2X messages on a sidelink shared channel (e.g. PSSCH) with information about other UE Groups/Platoons such as direction, speed, target, number or members, selection priority, synchronization source etc.

the UE selecting a specific Group Manager to connect to from multiple receive signals transmitted by multiple Group Managers based on the measures signal strength of the sidelink (e.g. RSRP and RSRQ) and/or based on certain selection priorities part of the control information provided by the Group Manager and/or based on the synchronization source (e.g. GPS, a based station or none of it) and/or based on the identity broadcasted the Group Manager the UE sending a connection setup request message on the sidelink to the group/platoon manager requesting the setup of data and/or signaling connection and requesting radio resources for transmission on the sidelink whereas the request message to the group manager might also contain a request to provide further system information with configuration details waiting for a connection setup response message on the sidelink from the group/platoon manager receiving and decoding the setup response message and configuring the sidelink for transmission and reception the UE as a group member can receive control signaling indicating change of group manager.

The UE as a group member can perform sensing for better groups to join while connected to a group manager. The handover request is initiated when reaching a certain threshold or a group with higher capabilities is sensed.

The UE as a group member can request a inter-group handover by sending a control message to the gNB (either direct or relayed).

C. Embodiments of a Base Station (eNB) Supporting Group Manner:

a base station being in communication with UEs and the base station supporting relay UEs acting as group/platoon manager, sending broadcast information and/or radio resource control information to indicate its support of UEs acting as group/platoon manger in the cell and/or by providing configuration information to group manager and/or group members supporting this functionality.

by sending a bit that indicates the support of this function and/or by sending a separate system information block with configuration details for the group/platoon manager and/or the UEs member of a group/platoon whereas some of the system information with configuration data for the group manager is send on request to group manager supporting this functionality whereas some of the system information with configuration data for group members is send on request to group members supporting this functionality receiving a RRC control message with a request from a UE supporting group/platoon management functions to become a group/platoon manager forwarding the request to the Mobility Management Entity in the core network via the S1-MME interface in case of being EPC connected or forwarding the request to the Core Network Control Plane Function via the N2 interface in case of being 5G core connected the core network authorizing the UE to become a Group Manager via a response message and/or providing security credentials and other required control information sending a RRC control message to respond to the request to become a Group/Platoon Manager and providing detailed configuration information SL resource pool configuration Relay configuration (max. packet size, only V2X traffic/VOIP)

Group parameters (max. UEs, type of supported services e.g. low latency)

Feedback configuration (keep alive or periodic group member status)

being connected to a group/platoon manager and receiving a control message from the group/platoon manager requesting to add (UE joins) or to remove (UE leaves) a UE with a certain user identity to a Group with a certain Group Identity SL pool adjustments SL broadcast adjustments (available resources, group full)

Group member left notification

Group member configuration (Group ID, capabilities, granted services)

RRC reconfiguration message (passed on to joining UE)

the base station being in communication with a one or more configured group/platoon manager that in RRC connected state and are assigned a unique identity in the cell scheduling resources for the Group manager using a downlink control channel (e.g. PDCCH)

using beam forming for the downlink control channel and/or the downlink shared channel and/or the sidelink channel to the Group Manager transmitting pre-coded dedicated reference symbols to support UEs channel estimation using channel feedback information provided by the platoon manager beam index indication, rank indication, pre-coding matrix indicator etc.

using uplink measurements on the demodulation reference symbols and/or the data symbols of uplink shared channel (e.g. PUSCH) or the uplink control channel (e.g. PUCCH)

Time Division Duplex mode can be based on channel reciprocity using other information available at the gNB e.g. angle of arrival of the receive signal, UE position information using link adaptation for the downlink control channel and/or the downlink shared channel and/or the sidelink channel transmitting with different coding and/or modulation
using channel feedback information provided by the
platoon manager
e.g. channel quality indicator, suggested coding
and/or modulation scheme
using uplink measurements on the demodulation
reference symbols and/or the data symbols of
uplink shared channel (e.g. PUSCH) or the uplink
control channel (e.g. PUCCH)
Time Division Duplex mode can be based on
channel reciprocity
using other information available at the gNB such as
measurement of pathloss, UEs timing advance or
UE position information
the base station or Road Side Unit being connected to
a V2X server receiving a message from the server
triggering the initiation to configure a UE as a group
relay and/or platoon manger
(The V2X server has knowledge about all UEs in the
cell and the direction and speed and other car internal
information that can be used to trigger the establishment of a platoon (details are proprietary and will not
be standardized))
the base station being connected to a core network and
in communication with a network to request authorization for UEs to become a Group Manager and/or
UE to become a Group Member and/or to provide
security credentials
the base station might also be a Road Side Unit In the above description, examples and embodiments for UE Groups, Group Manager UEs and Group Member UEs have been described and explained, which may also be used for the following further concepts of the present invention that will be discussed in the following part of the description.

In this following part of the description, examples and embodiments for mobility concepts in cellular communication systems according to the present invention will be described, wherein said mobility concepts may make use of UE Groups, Group Manager UEs and Group Member UEs as explained above.

However, it should be explicitly mentioned here that also other types of groups (e.g. platoons) of User Equipments, or other types of User Equipments and/or base stations, different from the UEs (i.e. Group Manager UEs and/or Group Member UEs) as described above may make use of the following mobility concepts of the present invention.

Accordingly, the mobility concepts which will be described in the following may make use of but do not necessarily require UE Groups, Group Manager UEs or Group Member UEs in the form as described above.

In turn, all of the features that will be described in the following parts of the description can be combined with the concept as explained above, namely with the UE Groups 17 and/or the Group Manager UEs 11 and/or the Group Member UEs 12A, 12B and/or the base station 13, respectively.

For the sake and ease of introducing the following mobility concepts, the above discussed UE Groups, Group Manager UEs and Group Member UEs may be used as non-limiting examples in the following description.

The first following passages may serve to introduce the mobility idea of the invention.

Current mobility concepts in cellular communication systems focus on individual user equipments (UEs) moving through a given scenario. When a given UE is in connected mode, it can be connected to a single fixed base station, in future systems also to a several base stations, e.g. dual connectivity.

Existing concepts support mobility up to certain speeds, e.g. vehicular communications or high-speed train scenarios, with handovers (HO) at cell boundaries. In this way, seamless connectivity across cells can be supported.

The introduction of D2D (device-to-device) communications has given rise to sidelink (SL) communications (with links known as PC5) among devices. In addition, to various connected devices, the introduction of V2X communications will enable connected vehicles to communicate with the cellular infrastructure as well as other connected vehicles.

In a vehicular context, there is an inherent safety critical requirement for seamless connectivity among vehicles and infrastructure. In addition, the large number of vehicles will dramatically increase the traffic load of a mobile network.

One of the key mobility procedures that could be improved in relation to signaling efficiency is the existing LTE HO mechanism. This procedure should be redesigned, especially for dynamic group communication among vehicles (V2V) (also referred to as platooning) to enable and enhance seamless connectivity, while maintaining backward and forward compatibility with existing and future standards.

Thus, the proposed inventive ideas reduces signaling traffic for moving user groups which saves resources in the network. The freed-up resource can be utilized by other services or can be used to increase reliability of the services (e.g. particular group communication service or other services with high reliability demands).

Mobility for Moving User Groups

A main use case may be a group of moving UEs which may have a similar mobility profile (e.g. speed, direction, channel or receiver characteristics etc.). This problem highlights three key issues depending on the particular state (RRC Idle, RRC Connected, RRC Inactive or RRC Lightly Connected) of the UE which need to be addressed:

1. For RRC Idle UEs, although there is no need of a handover procedure, these UEs are required to perform tracking area updates at the border of the tracking area (LTE terminology)/paging area (5G terminology). If there are large moving user groups, there will be a large number of tracking area updates at some cell borders resulting in excessive signaling updates towards the base stations.
2. In case of RRC Connected Mode, the UEs have to make cell measurements of the neighboring cells, report the measurement results to the network and execute the time and signaling intensive handover procedures. In the RRC Connected mode, a large number moving UEs will be required to perform individual RACH procedures in order to establish connections to the network, obtain uplink synchronization and acquire uplink resources. In the case of simultaneous handovers of many UEs, excessive signaling to and from the source base station (in the form of periodic measurement reports and RRC Reconfiguration messages) and target base station (RACH procedures synchronization and timing advance signaling) would degrade network reliability and throughput.
3. RRC Inactive or RRC Lightly Connected: Each member of the group of moving UEs, would have to establish an RRC Connection to operate in the RRC Connected mode, which requires intense signaling over the air as well as toward the core network. In LTE Advanced Pro and 5G networks, a new RRC Inactive state will be defined to overcome some of the drawbacks. This state allows for small data transmissions in the uplink without moving to RRC Connected State. Nevertheless the UE is still only reachable in downlink via paging since the location is not known on cell level. The paging procedure is time and resource consuming as each UE needs to be paging in the whole paging area.

Specifically in the case of Ultra Reliable and Low Latency Communications (URLLC) data transmissions (e.g. needed for autonomous driving or platooning for safety critical applications), the procedures described above might take too much time in addition to the involved signaling overhead. Therefore, new mobility procedures are required to support such mobility for larger user groups.

Figure 11:
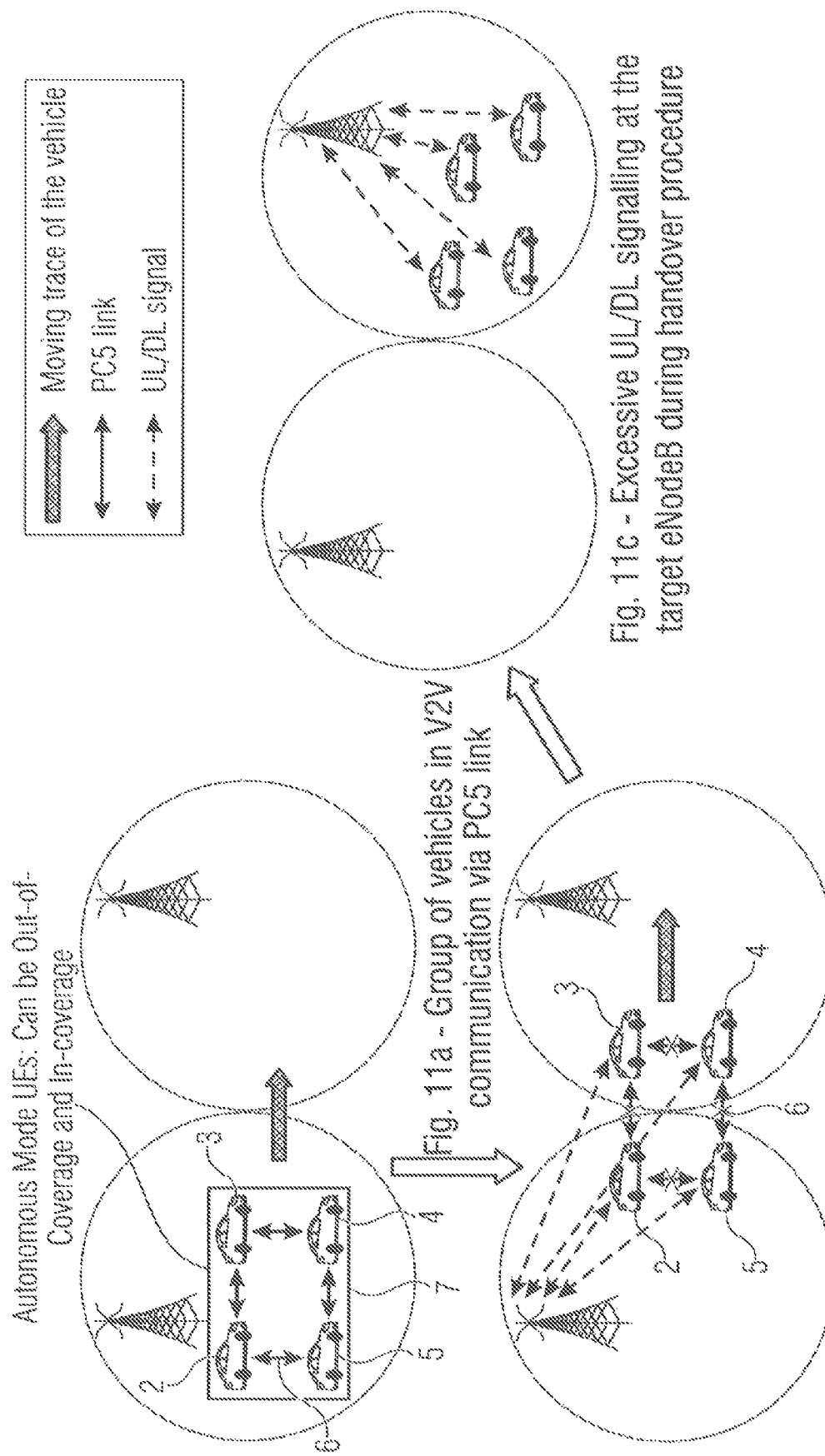
FIG. 11 shows a handover procedure according to the conventional technology.

FIG. 11 is an illustration of the possible issues that can arise when dealing with large groups of highly mobile users according to the conventional technology.

FIG. 11a (top left) depicts a group 7 of vehicular UEs 2, 3, 4, 5 having a common mobility profile. These UEs 2, 3, 4, 5 can operate in autonomous mode being interconnected with PC5 links 6. The group 7 of UEs 2, 3, 4, 5 can be within the coverage of the same cell, out-of-coverage, or be in partial coverage when moving between cells or when moving along cell-edges.

FIG. 11b (bottom left) shows a group of vehicular UEs 2, 3, 4, 5 interconnected via PC5 links 6 moving across cell boundaries. When in the scheduled mode, there is obviously a problem during mobility since the serving base station has changed. The solution is the use of the exceptional transmission resource pool to maintain service continuity. The dotted line between the UEs and the source base station is an example illustration of the control signaling required to schedule the PC5 transmissions, in addition to the multiple measurement reports that are required by base station for each UE. Note, for the handover between cells, the exceptional resource pool configurations might have to be reconfigured for the user group, since source and target cell might have a different configuration.

FIG. 11c (middle right) shows the excessive signaling overhead caused by RACH, synchronization, resource allocation, that would be required for each UE to connect to the target base station individually.

Furthermore, the inventive system as proposed in the following should also allow to perform predictive group HOs, as specified in a further one of the inventors' patent application [2].

Figure 12:
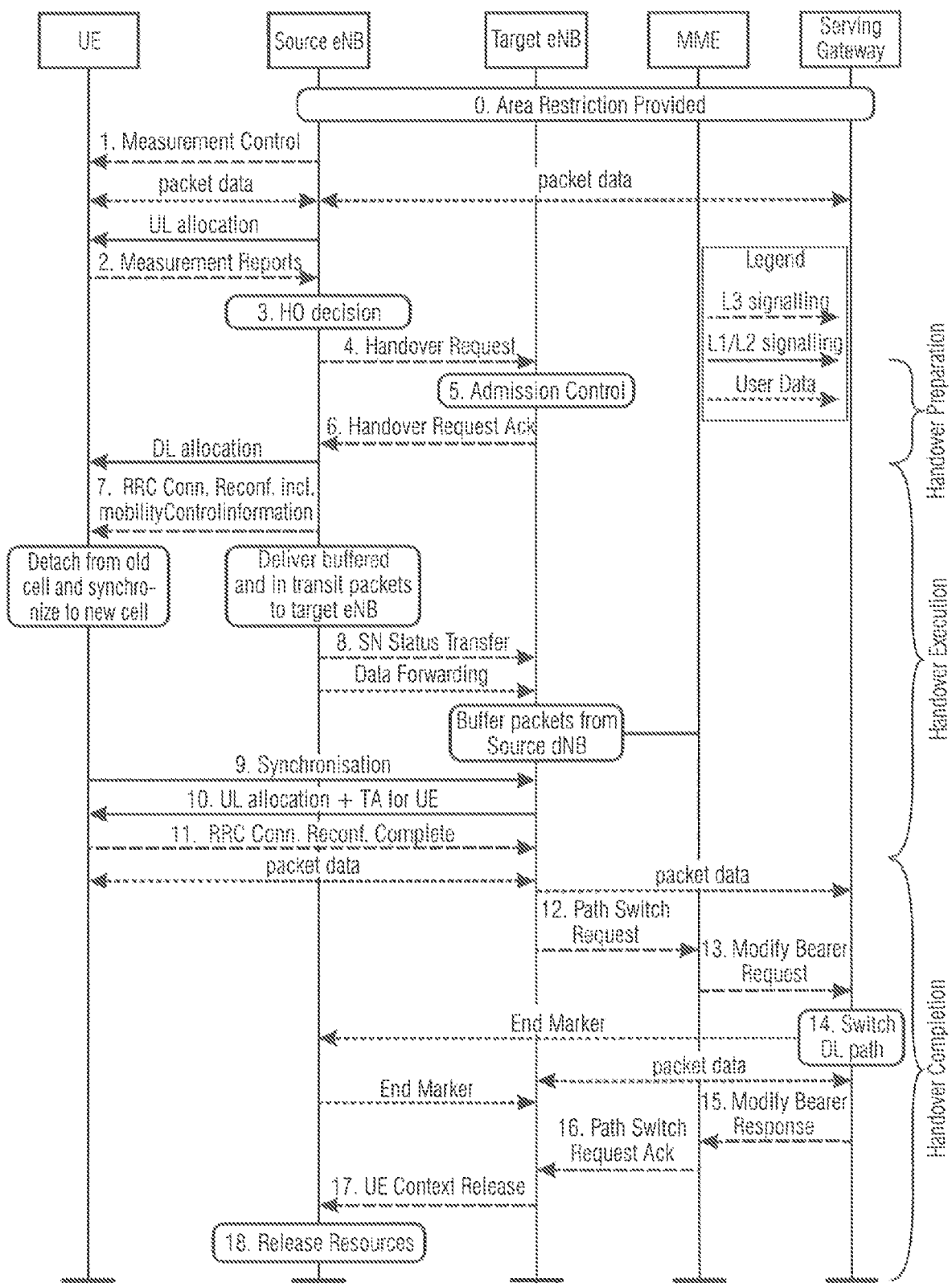
FIG. 12 shows a flow diagram of a standard handover procedure in LTE between source eNB and target eNB of the conventional technology.

FIG. 12 (which is taken from [3]) shows a state of the art communication that may be used for handover (HO) procedures shown in FIG. 11. FIG. 12 depicts a standard HO procedure in LTE between source eNB and target eNB.

Existing X2 HO procedures as specified in the standard are mainly geared toward a single UE HO between a source and target eNB and do not accommodate the requirements of a group of vehicles in a V2X context.

The interruption time and overall signaling overhead during the HO for sidelink (SL) communications can negatively impact the performance at the UE end. Currently, the agreements for SL transmission in Release 14 include the following [7]:

In the case of a HO for V2X SL transmissions, the SL transmission pool configuration (in addition to the exceptional resource pool) of the target cell is transmitted via the HO command (Step 7 in FIG. 12) to reduce interruption time. The objective is that the UE can utilize the SL transmission resources before the HO is complete, provided that the Source synchronization or GNSS synchronization is performed.

This also applies to the reception resource pool configuration of the target cell with the aim of avoiding interruption time of receiving V2X data sent using the HO command.

Furthermore, this applies to UEs in RRC connected mode, while in RRC IDLE it is up to UE implementation to reduce the interruption time for the acquisition of SIB 21 (used to reduce the risk of cell value tag wrap around, and broadcast a range extension of the cell value tag).

In the following, a further introduction to the above mentioned connection states of UEs may be given. Therefore, it shall be referred to FIG. 13 which is taken from [4] and which depicts UE modes discussed in RAN2 for reduced signaling traffic.

Figure 13:
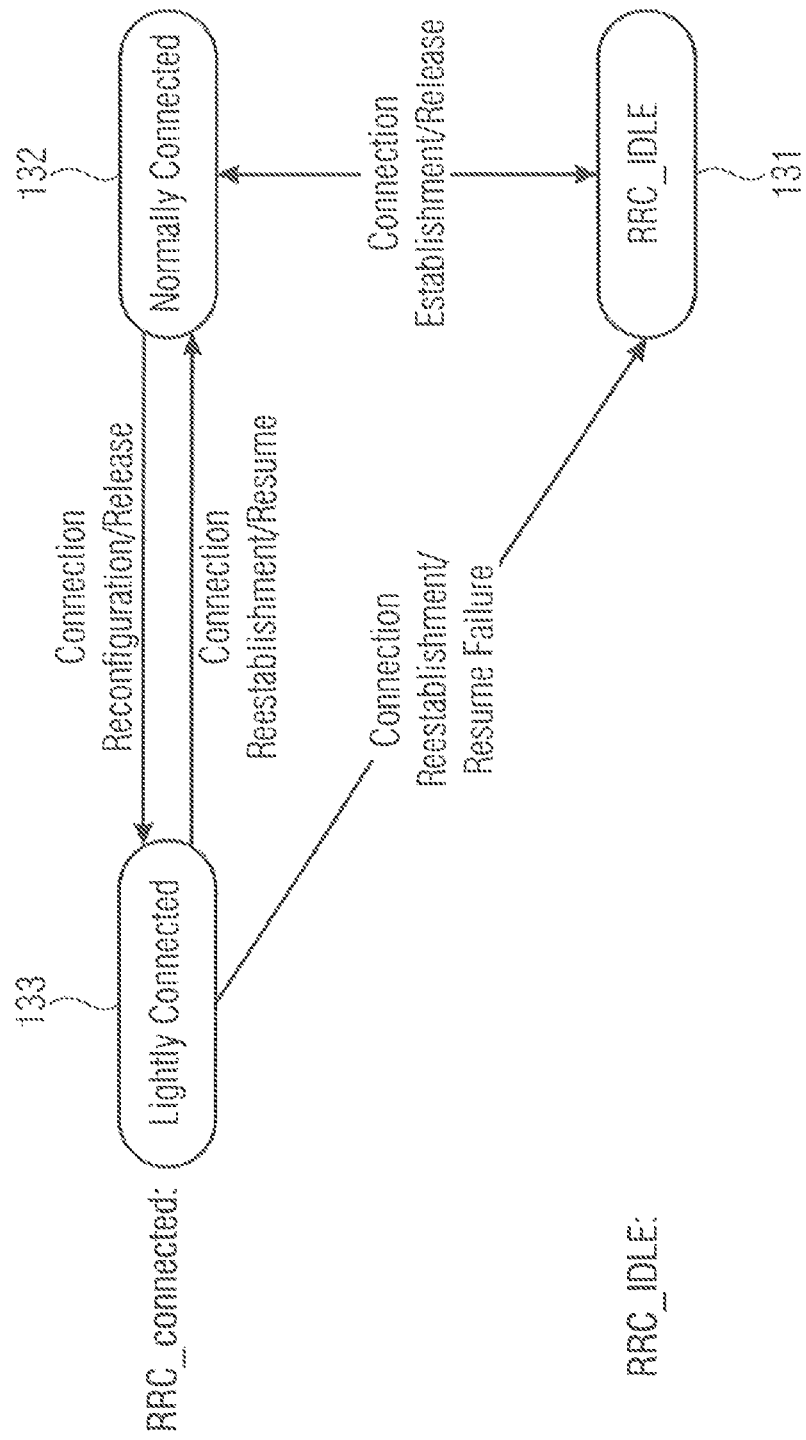
FIG. 13 shows a state machine showing three different connection states of UEs of the conventional technology.

As shown in FIG. 13, a state machine in current control plane protocols in cellular wireless mainly support two modes: the RRC Idle mode 131 and the RRC Connected mode 132 (also referred to as RRC Normally Connected).

In the RRC Idle mode 131, a UE monitors the control channel (PCH) according to a discontinuous reception (DRX) cycle. While in this state, the mobile management entity (MME), which is part of the core network, is responsible for monitoring the UE.

In the RRC connected mode 132, a UE is connected to a known base station and can perform data transfer to and from the device. While in this state, the corresponding base station is responsible for monitoring the UE.

According to the state of the art, HOs are performed when the UE is in the RRC connected mode 132.

Currently it is discussed to introduce a new mode, which is referred to as RRC lightly connected 133 (in LTE) or as RRC inactive state (in 5G new radio (NR)). Note, the RRC connected mode 132 will be renamed to RRC normally connected (in LTE) and RRC active (in 5G).

The overall goal of this enhanced state machine is to increase signaling efficiency for new services and improve UE power savings.

In this new state 133 (lightly connected/inactive state), the UE is responsible for changing into idle or connected states.

The example shown in FIG. 13, reflects the state operation in LTE: The lightly connected UEs enter into legacy behavior in RRC connected via RRC procedure including three messages (i.e. request, response and complete).

In the lightly connected state 133, the S1 connection (e.g. FIG. 15) for this UE is kept and active, and the following inventive signaling scheme from the UE could be introduced, in order to optimize handovers and improve network performance though movement predictions.

A further brief introduction for Exceptional Resource Pools for side link communications shall be given.

For example, support for side link communication, i.e. SL (PC5) communications, in D2D (Device-to-Device) communications is indicated by the transmission of the SIB 18. The SIB 18 is given by the serving base station upon initial connection. In relation to enhancing service continuity for SL communications, the exceptional resource pool contained within the SIB 18 is responsible for handling the state transition between the RRC Idle state and RRC Connected State. An example would be if the UE detects a RLF (Radio Link Failure), which then results in an RRC connection re-establishment. This particular resource pool will be an important component of D2D and V2X communications, especially in areas related to public safety and emergency response where such RLF cannot be tolerated [5].

This strategy may be discussed as means to synchronize the handover procedures between a relay and UE in a D2D context. Examples can be seen in [6]. The scenario described in [6] has the focus on IoT devices, such as wearables, e.g. a smart watch connected via smartphone to a base station.

This is different to the idea described in the vehicular scenario, since IoT devices have very limited power requirements and thus have higher limitations than vehicular UEs. Nevertheless, the ideas described in this invention shall also cover IoT scenarios where the proposed concepts can be applied.

In the following passages, the inventive mobility concepts shall be explained in detail.

For regular communication within a UE Group 17 (in the following also occasionally referred to as a group or a Platoon) using the sidelink communication (e.g. via PC5), it shall be referred to the above description.

For the following concept of the invention, it may be assumed that a group of UEs 11, 12A, 12B with a similar mobility profile may be coordinated by a Group Manager UE 11 or a set of Group Manager UEs 11.

In the following description, UE Groups having a single Group Manager UE 11 may be described as non-limiting examples. All given examples may be extended to a set of Group Manager UEs as described above.

For example, a Group Manager UE 11 may be configured by the base station 13 via uplink/downlink RRC signaling and authorized to coordinate transmissions among and to the Group Member UEs 12A, 12B.

Furthermore, other surrounding UEs 12, 52 may have already joined the group/platoon through a Connection Setup Procedure as described above, toward the Group Manager UE 11 on the sidelink.

The Group Manager UE 11 may be coordinating the communication within the UE Group 17 and towards other platoons and other UEs, in addition to the existing Uu link with the base station 13.

The following paragraph explains an example procedure according to this aspect of the invention as to how a UE may become a Group Manager UE 11.

According to this aspect of the invention, a Group Manager UE may be a UE configured to manage a mobility of a connection between the cellular network and a UE Group 17 which includes itself and one or more other UEs called Group Member UEs 12A, 12B to distinguish them from the Group Manager UE 11. A Group Member UE 12A, 12B according to this aspect is, thus, configured to leave up, at least partially, a management of a mobility of a connection between itself and the cellular network to the Group Manager UE 11 of the UE Group 17. In other words, a member UE is configured so that a mobility of a connection between this member user equipment and the cellular network is managed by a predetermined user equipment, namely the manager UE, of the UE group to which the member user equipment and the predetermined user equipment belong. In even other words, the member UE is part of a UE group and connected to a predetermined UE, namely the manager 11, that manages the mobility of a connection between this member UE 12A, 12B, 12C and the cellular network 10. The Group Manager UE 11, or simply manager, may acquire a group identity used for the enhanced mobility idea proposed in this invention.

For this, the UE may send an interest indication or a service request to the base station 13 or a road side unit, as discussed above with reference to the third step 33 shown in FIG. 3. Once a UE becomes a Group Manager 11, a configuration procedure is executed.

Figure 15:
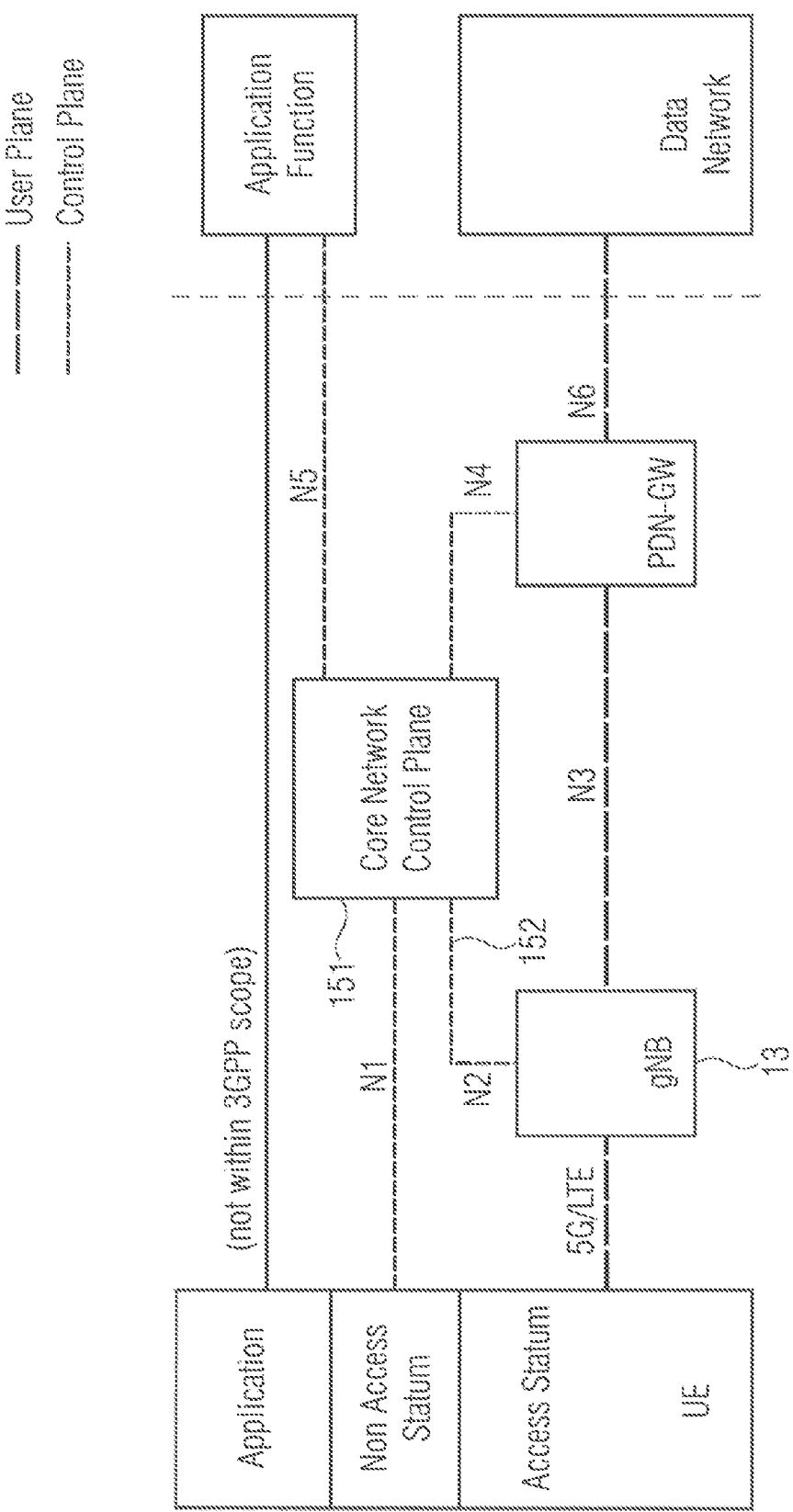
FIG. 15 shows a block diagram of overall 5G architecture including base functionality of the 5G core network.

As shown in FIG. 15, the base station 13 may forward the request to the core network control function 151 (via N2 interface 152) to authorize the UE to become a Group Manager. FIG. 15 illustrates the general overall architecture and interfaces (Nx, x=1 . . . 6) proposed for 5G.

Figure 14:
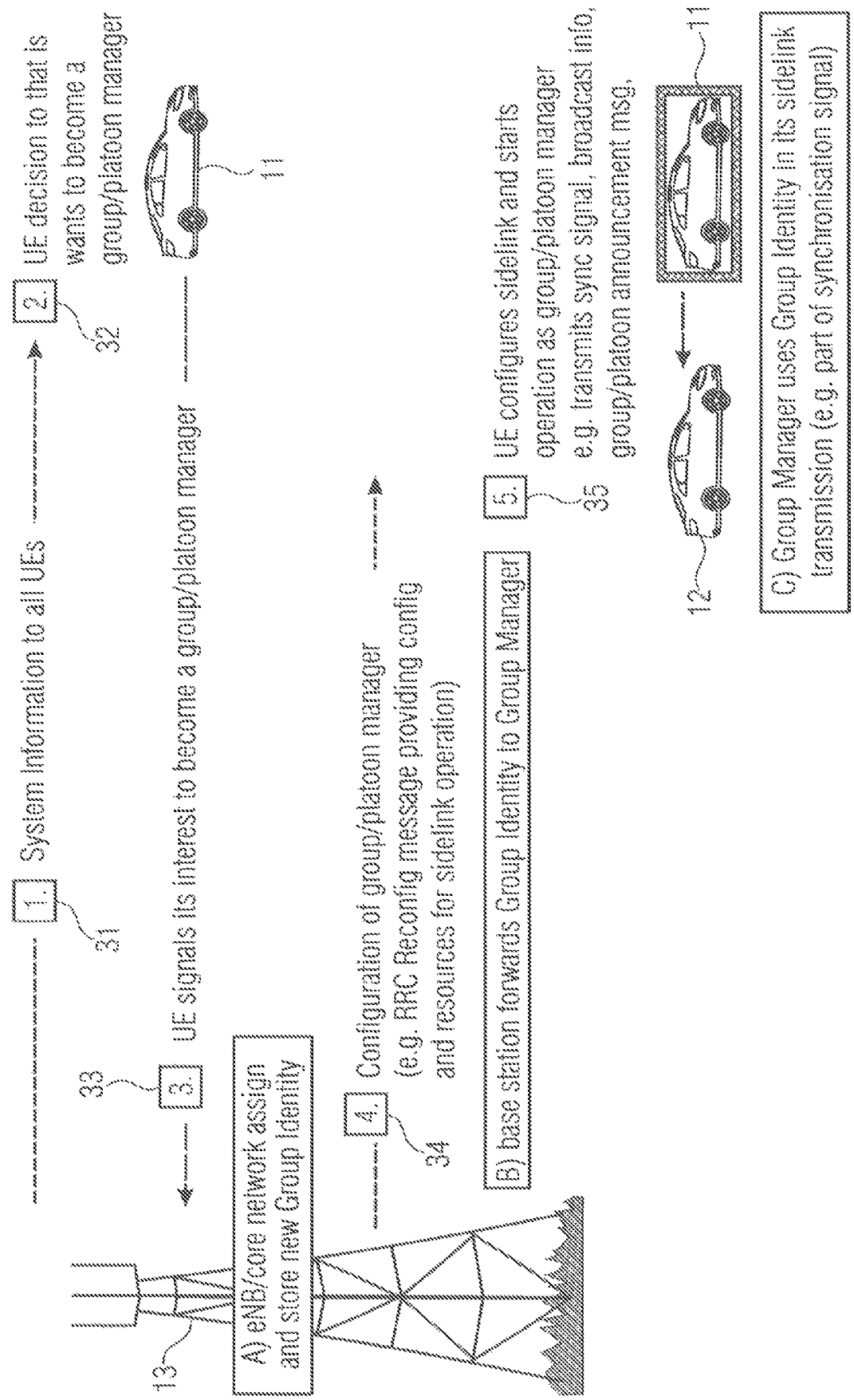
FIG. 14 shows an extended version of FIG. 3 showing a configuration procedure to become a Group Manager according to an embodiment.

Reference shall now be made to FIG. 14 which shows an extended version of the concept of FIG. 3.

The following section explains the involved steps A) to C), which are highlighted in FIG. 14. As part of the procedure in the third step 33, the core network or the base station 13 may, after authorization and admission control, assign a Group Identity (step A).

The Group Identity may or may not be composed of a network identity and/or a base station identity and/or another related novel identifier.

The base station 13 may respond to the UE request message in the fourth step 34 with a configuration message also forwarding the new Group Identity to the new Group Manager (Step B).

Once the Group Manager 11 starts its operation it will use the Group Identity as part of the sidelink signal uniquely identifying the UE Group 17 (or Platoon) within the network or at least within a certain area.

The Group Identity might become part of the synchronization signal and may be signaled via the sidelink broadcast channel or part of an Group Announcement Message sent over the sidelink to potential group candidates.

As already described above, the Group Manager UE 11 may be responsible for informing the base station 13 (and by this also the core network) once a UE 12, 52 joins a UE Group 17. The network should have an overview of all the UEs 11, 12A, 12B that are part of the UE Group 17. The procedure of a yet foreign UE 52 joining a UE Group 17 was already described above with respect to FIG. 4.

Figure 16:
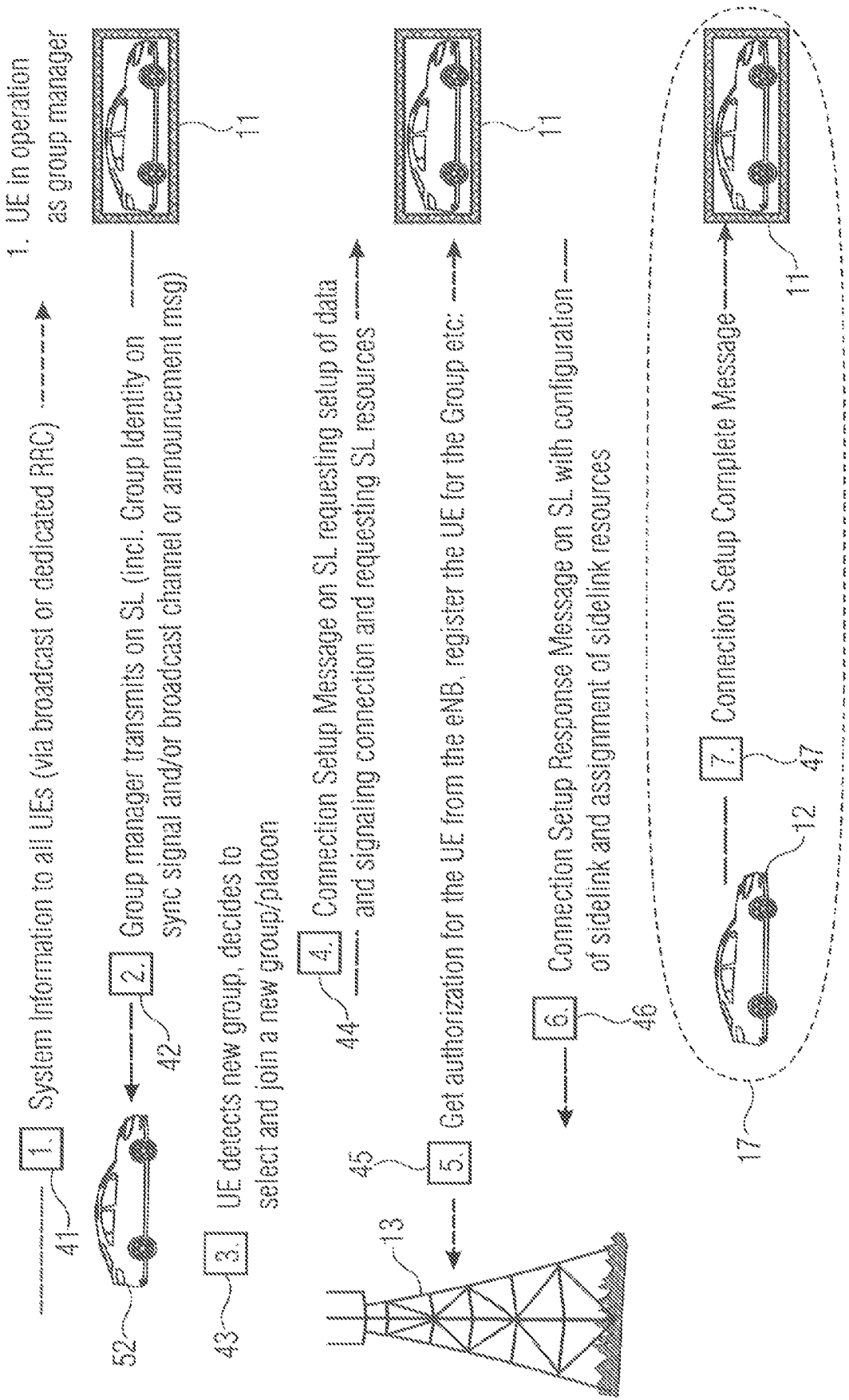
FIG. 16 shows an extended version of FIG. 4.

However, reference shall now be made to FIG. 16 which is a reduced version of FIG. 4.

In the fifth step 45, the Group Manager 11 may request the base station 13 about the authorization of the yet foreign UE 52 to join the UE Group 17.

The Group Manager 11 may forward the above mentioned UE Identity to the base station 13, which may, for instance, be a cell specific identity (such as the Common Radio Network Temporary Identity in LTE) since the UE 11 is expected to be in RRC Connected state/mode.

The signaling to the base station 13 may also include the Group Identity of the UE Group 17 the yet foreign UE 52 wants to join. If a Group Manager 11 may only be able to host a single UE Group 17, the UE identity of the Group Manager 11 itself might be sufficient.

Without loss of generality, it is assumed here that each Group Manager 11 to only hosts a single UE Group 17 and each Group Member UE 12A, 12B may only be member of a single UE Group 17.

The base station 13 may communicate with the core network control function concerning authorization and admission control. Once authorization may have been decided by the base station 13 or the core network the UE 52 that joined the UE Group 17 (and is thus now a Group Member UE 12) might already be registered in the UE Group 17 and the base station 13 may send a positive response message to the Group Manager 11.

It is up to the Group Manager 11 to update the base station/road side unit/core network about any UE 52 joining and leaving the UE Group 17, so that the network knows the UE identities of a UE Group 17.

Once a UE leaves the UE Group 17 via a sidelink message, the Group Manager 11 may inform the base station 13 via RRC Control Signaling (e.g. a Group Update procedure).

The Group Manager 11 may also implement a new procedure to verify if all the UEs 12A, 12B are still part of the UE Group 17 (e.g. by regular polling of Group Member UEs 12A, 12B).

A UE 12A, 12B might for some reason have lost the connection to the UE Group 17 without being able to send a leave message. In one realization, a multicast message will be sent to all UEs 12A, 12B (at least to the ones that have not been active for a long time), asking the UEs 12A, 12B to respond to this message. For this, a timer may be used, which is started in the Group Manager 11. If the timer expires and the Group Manager 11 did not get any feedback from a certain UE 12A, 12B, it considers this UE 12A, 12B to be lost, having left the UE Group 17.

In the sixth step 36, the Group Manager 11 may provide the Connection Setup Response Message to the yet still foreign UE 52 to confirm that the UE 52 has joined the Group 17 and has therefore become a Group Member UE 12, and the Group Manager 11 may provide further sidelink configuration information (e.g. assignment of sidelink resources).

Depending on the kind of service request of the UE 12, 52 and depending on the configuration of the Group Manager 11 the UE 12, 52 might remain RRC Connected and might transition to another state after having sent the Connection Setup Complete Message.

Figure 17:
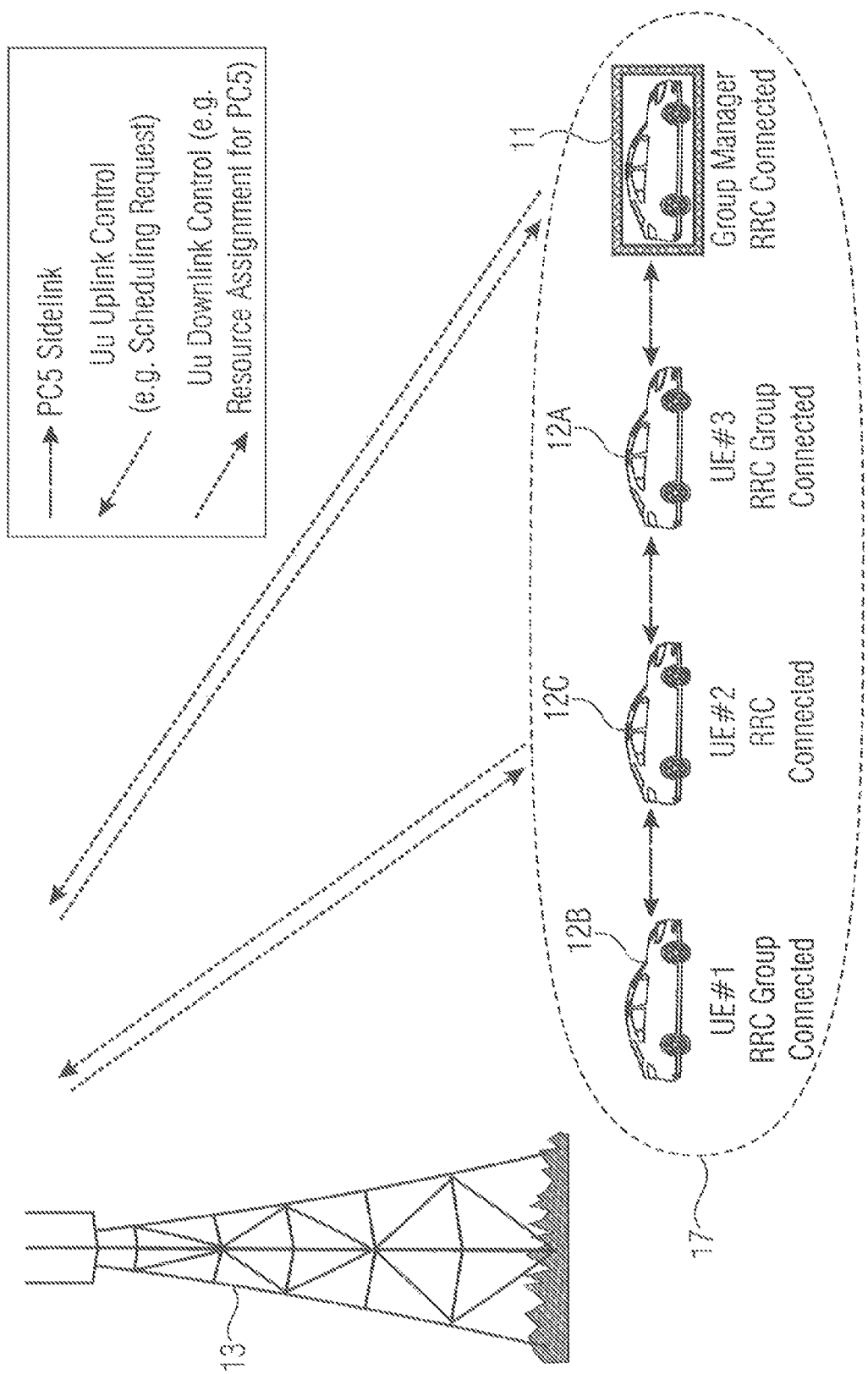
FIG. 17 shows a UE Group with UE Group Members and a UR Group Manager and their respective RRC states within the UE Group according to an embodiment of the invention.

If the UE 12, 52 keeps a direct connection to the base station it will remain in RRC Connected state (see FIG. 17).

As described above, the Group Manager UE 11 may be in RRC Connected state, while the Group Member UEs 12A, 12B may, depending on their configuration (e.g. services relayed via the Group Manager 11 or not) and depending on the availability of data transmission, be in the RRC Connected state (see UE #2 in FIG. 17) or in another state.

For UEs that are not RRC Connected to a base station 13, but are in communication with a Group Manager 11, a new state is introduced that is called "RRC Group Connected" (see UE #1 and UE #3 of FIG. 17). This RRC Group Connected State may be one main concept of this aspect of the invention which will now be discussed in more detail below. In this regard, it should be noted that sometimes in the following, two RRC Group Connected states are distinguished, namely one which may be called a group lightly connected mode (FIG. 24), and one which may be called a group connected or group active mode (FIG. 23), occasionally also referred to as a group directly connected mode. Details are set forth below. In case no further distinction is made, the meant state or mode should become clear from the context.

The new state may provide limited services, such as only enabling transmission of small packets between base station 13 and RRC Group Connected-UEs 12A, 12B via the Group Manager's downlink, in addition to other packets transmitted via the sidelink coordinated by the Group Manager 11. This is in a sense a kind of dual-connectivity involving downlink-sidelink relaying which is novel and enabled by this new state.

The RRC Group Connected state according to the invention may be similar to the aforementioned RRC Idle state (FIG. 13) in a sense that the individual UE 12A, 12B of a UE Group 17 may not be in communication with the base station 13 directly (no user data transmission and reception on shared channel possible).

There may be no need of mobility procedures in the RRC Group Connected state, since mobility may be handled by the Group Manager 11. This means that the Group Member UE 12A, 12B may not perform handover measurements like in the RRC Connected state.

Mobility (e.g. Handovers) may be managed by the Group Manager 11 that may be configured by the base station 13 with RRC measurement reporting and that may also execute a handover procedure in coordination with the base station 13.

That is, the Group Manager UE 11 (or simply called managing UE 11), being in the directly connected mode (i.e. directly connected to the base station 13), may perform a handover in case of a transition of this managing UE 11 from one cell to another, and the handover may inherently keep the cellular network updated on the tracking/paging area in which the UE Group 17 is located, namely on cell level.

Those Group Member UEs 12A, 12B (or simply called member UEs 12A, 12B) being in a Group Connected mode, and therefore having no active connection to the cellular network, may keep track of their tracking/paging area in which the respective Group Member UE 12A, 12B is currently located in, namely by updating its tracking/paging area responsive to inbound tracking/paging area messages from the managing UE 11.

On the side of the cellular network, an apparatus for or of the cellular network (CN), such as the MME, which manages a connectivity between the CN and a plurality of UEs 11, 12A, 12B, 52, may, responsive to such a handover of a managing UE 11, update the tracking/paging area for any UE 11, 12A, 12B of the UE Group 17 which is in the lightly-connected mode so as to be the cell which the handover targets at.

During the Handover procedure, the Group Manager UE 11 may keep the Group Member UEs 12A, 12B informed about the status of the Handover. That is, the managing UE 11 is configured to, in the directly connected mode, keep the one or more other member UEs 12A, 12B of the UE Group 17 updated on a development of the handover.

In the most simple case, it will inform the Group Member UEs 12A, 12B of a start of a handover procedure and of a completion of a handover procedure. If the sidelink resources need to be reconfigured (e.g. use of an exceptional pool in base station controlled mode—Mode 3 in LTE) it may send a multicast message to all Group Member UEs 12A, 12B informing them to use different sidelink resources.

Figure 18:
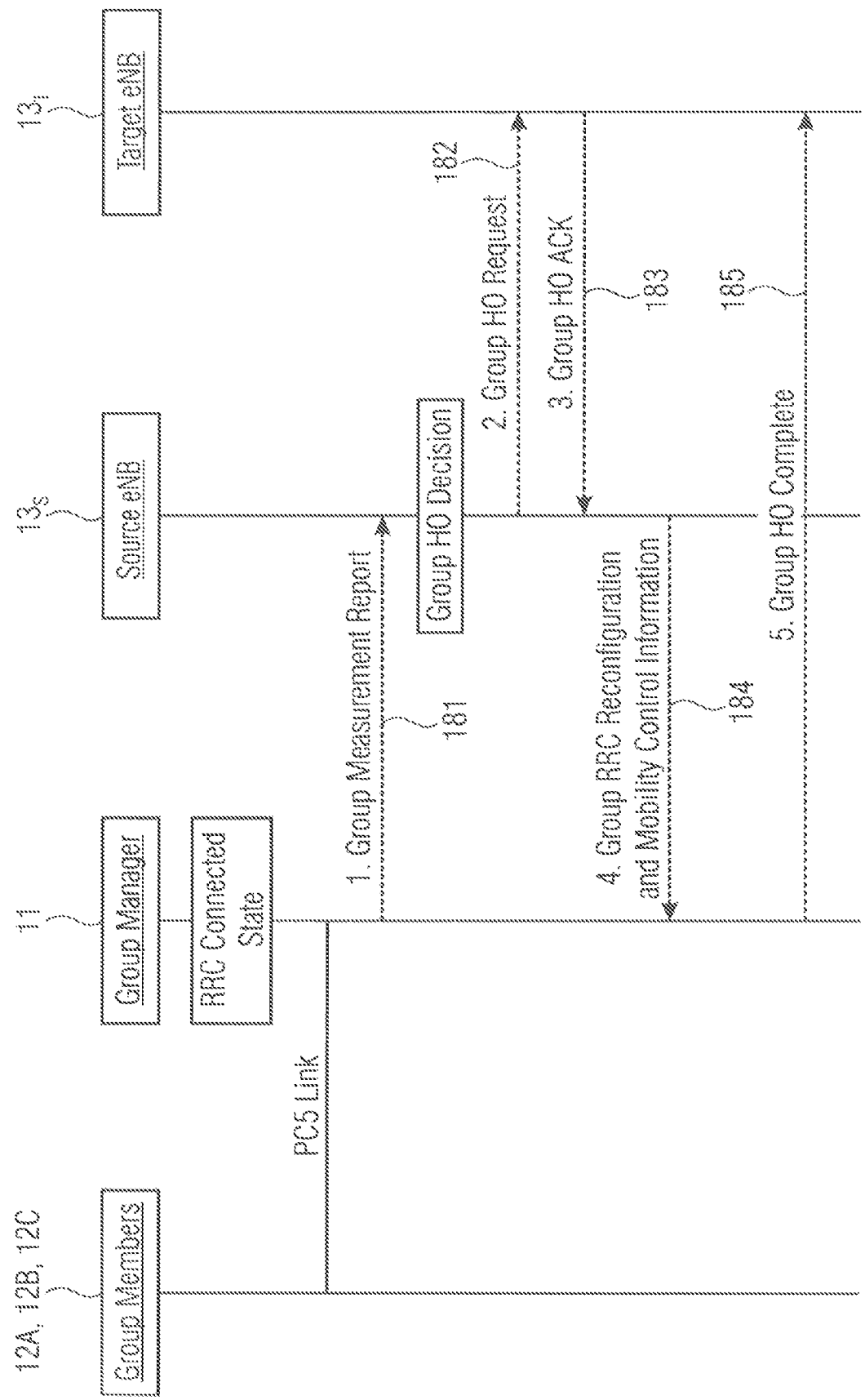
FIG. 18 shows a sequence chart according to an embodiment.

FIG. 18 shows an example of a message sequence chart with details for the air interface as well as for the inter-base station signaling. The key signaling procedures to enable Group HOs are shown here. FIG. 18 shows an example Sequence Chart detailing the Group HO procedure with the Group Manager 11 according to the invention.

In a first step 181 the Group Manager 11 may transmit a collective measurement report indicating the group measurement values.

In a second step 182 the source eNB 13$_S$ may determine, based on the Group Measurement Report, if a Handover is required and then requests a Handover for the entire group based on the stored Group ID in the source eNB 13$_S$.

In a third step 183 the target eNB 13$_T$ may acknowledge that a Group HO may occur by transmitting an Acknowledgement (ACK) message.

In a fourth step 184 the source eNB 13$s$ may then proceed to forward the Handover command with a new Group RRC Reconfiguration and Mobility Control Information message to the Group Manager 11 including access control parameters of the target cell e.g. PRACH preambles, C-RNTI in case of RRC Connected, SL-RNTI, SL resource configuration of target cell. If the new target cell does not support SL communication (which will be indicated in this new Group RRC Reconfiguration and Mobility Control Information message), the Group Manager 11 may then multicast this message via SL to the other Group Members 12A, 12B before moving to the new cell. This may enable the Group Members 12A, 12B to directly connect to the target cell (not supporting SL communications) without the overhead required to setup individual connections.

In a fifth step 185 the Group Manager 11 may then send an acknowledgement message to the target eNB 13$_T$ indicating that the Group HO is complete (successful Group HO).

That is, an CN apparatus such as the serving or source base station 13$_S$, determines whether an handover is required for UEs 12A, 12B of any UE Group 17 collectively for each UE Group 17 on the basis of a measurement report received from a predetermined UE of the respective UE Group 17, namely the Group Manager UE 11 of the respective UE Group 17, and further, it sends an handover command to the Manager UE 11 of the respective UE Group 17 exclusively, and not to any Group Member UE 12A, 12B in case of the handover being determined to be required. The managing UE 11, being in directly connected mode, performs the handover, thus, not only for itself, but also for the other members 12A, 12B of the UE Group 17. As part of keeping the latter updated, the managing UE 11 may also inform the members 12A, 12B about one or more handover parameters. Such a handover parameter represents an example for a connection parameter in general, i.e. a parameter controlling the connection between any UE 11, 12A, 12B and the CN. Any member UE 12A, 12B being itself in a directly connected mode, which receives the one or more connection parameter from a corresponding connection parameter message from the managing UE 11 uses the one or more connection parameters thus received for the active connection between the CN and UE 12A, 12B such as for handover purposes. In other words, a UE 11, 12A, 12B being in an active or directly connected state, may act differently depending on whether same is a Group Member UE 12A, 12B of a UE group 17 or not: in case of an absence of the UE's membership to any UE group 17, i.e. the UE 52 not being member to any UE group 17 (e.g. being a foreign UE 52), the UE 52 intermittently performs connection measurements on the active connection between the CN and the UE 52 to obtain one or more connection parameters such as in form of an handover command which is a reaction to the measurement message once sent to the source eNB 13s and use the one or more connection parameters thus obtained for the active connection between the CN and UE 52. In case of a membership or, during the UE's membership to an UE group 17 (e.g. being a Group Member UE 12A, 12B), the UE 12A, 12B suspends the performing the connection measurements, receives the one or more connection parameters from an inbound connection parameter message such as from the managing UE 11 and uses the one or more connections parameter thus received for the active connection between the CN and UE 12A, 12B, such as for handover to the target base station 13T.

The RRC Group Connected UEs 12A, 12B may also do not have to perform cell selection as if in the RRC Idle state. This enables power saving in the UE 12A, 12B since new cells do not have to be measured and also the broadcast channel does not have to be read all the time. In a way, all the Group Members 12A, 12B may be RRC Connected because the Group Manager 11 may be RRC Connected and may be in communication with the base station 13.

For example, a member UE 12A, 12B being in a group connected mode, may simply suspend keeping track of the tracking/paging area, in which the UE 12A, 12B is currently located, and resume keeping track of the tracking/paging area, in which the UE 12A, 12B is currently located, after the group connected mode on the basis on a tracking/paging area reported by an inbound tracking/paging area message at the end of the group connected mode, such as one sent from the managing UE 11. In other words, UEs may act differently depending on whether being in group connected mode or lightly connected mode: in the lightly-connected mode, the UE 12A, 12B keeps track of tracking/paging area by sensing an UE's leaving a current position of the tracking/paging area and informing the CN on the UE's leaving the current position of the tracking/paging area by sending an outbound tracking/paging area message to the CN. In the group connected mode, the UE 12A, 12B leaves up to the Group Manager 11 the informing the CN on the UE's 12A, 12B leaving the current position of the tracking/paging area or the keeping track of tracking/paging area and the informing the CN on the UE's 12A, 12B leaving the current position of the tracking/paging area.

Figure 19:
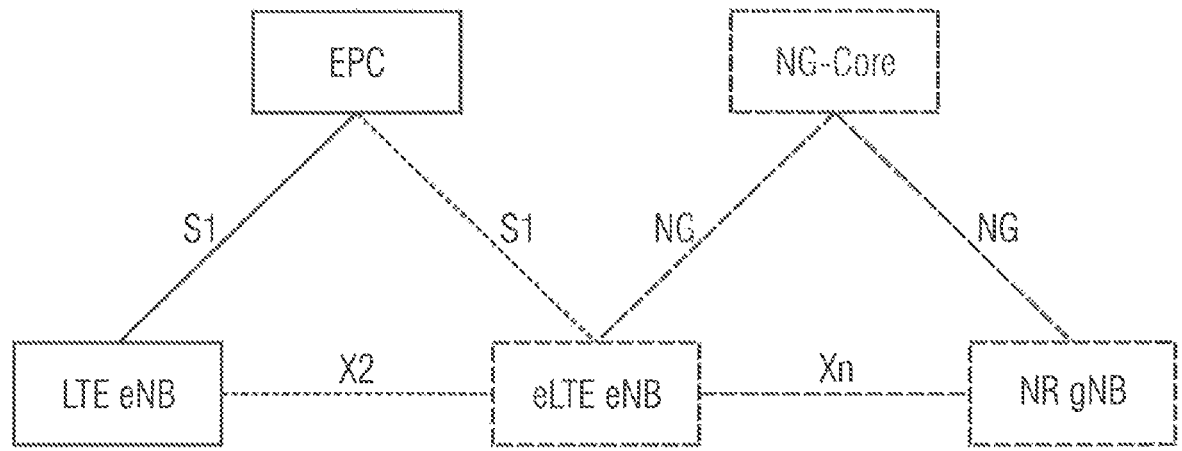
FIG. 19 shows a block diagram of inter base station interfaces for LTE, eLTE and 5G.

During Handover, the Group Manager 11 may get connected with a new base station, called target base station 13$_T$. This target base station 13$_T$ might have been provided with a UE Context of the Group Manager 11 from the source base station 13$_S$ via an LTE X2 Interface or an 5G Xn interface that inter-connects the base stations (see FIG. 19). That is, the target base station 13$_T$ might have been informed on the UEs 12A, 12B to be handed-over.

In case the Group Manager 11 is allowed to leave the RRC Connected state, the Group Manager 11 may also have to perform Tracking Update Procedures for all the RRC Group Connected UEs 12A, 12B of the UE Group 17. That is, a managing UE 11 may be in a lightly-connected mode, and when in the lightly-connected mode, keep the CN updated on a tracking/paging area in which the UE Group 17 is located by way of tracking/paging area update messages.

This might still be a valid scenario for small UE Groups/Platoons 17, e.g. with two to four UEs. Within the tracking area update or RAN Notification Area update procedure the Group Manager 11 may inform the cellular network (CN) about the new location of the Group 17 using the Group Identity and/or inform all the Group Members 12A, 12B of the Group 17 using the respective UE Identities. Similarly the Group Manager 11 may also perform a RAN paging area notification update like in the RRC Inactive state (in LTE this state is called RRC Lightly Connected). At least for larger user groups, it is suggested that the Group Manager 11 may keep the connection to the base station 13. In this case, the Paging Area Update and RAN Notification Area Update procedure over the air can be avoided completely, since the handover procedure is performed between the base station 13 and the Group Manager 11. Thus, the whole UE Group 17 based on a group identity moves to this new cell (target base station). Depending on the location of the mobility management function, the base station 13 may forward this information to the core network control function.

The benefit is that due to this novel procedure, the location of the Group 17 and all the Group Members 12A, 12B is known to the network at cell level. Once a handover, a RAN notification area update or tracking area update is done, it is done for a whole UE Group 17 and not for each individual UE 11, 12A, 12B. This reduces the need for extensive signaling over the air and within the network.

Therefore, in this newly invented RRC Group Connected state, differently from the RRC Idle state, the network may know the location of all RRC Group Connected UEs 11, 12A, 12B on cell level, since it is in communication with the Group Manager UE 11 and the Group Manager UE 11 may perform mobility (e.g. Handovers) based on a group identity (UE Group ID).

Since the base station 13 may be in contact with the Group Manager UE 11, new means may be available to reach the RRC Group Connected UE 12A, 12B in the downlink. If the Group Manager 11 is in RRC Connected state, all the UEs 12A, 12B of the UE Group 17 may be reached via control and data transmission that is routed via the Group Manager 11 (which may act as a relay). If the Group Manager 11 may not be RRC Connected, paging may still be sent to the Group Manager 11 that forwards it to the Group Members 12A, 12B, similar to system information updates. The paging identity or the resource (e.g. slot or subframe where the PDCCH should be decoded) used for paging might depend on the Group Identity. Also small data packets may be received via the Group Manager UE 11 in this state.

For larger transmissions, the direct communication of the Group Member UEa 12A, 12B to the base station 13 may be beneficial to avoid overload of the sidelink within the UE Group 17. Furthermore, the transmission power of the Group Manager 11 may become a bottleneck in the uplink for power limited situations.

This shall be exemplarily explained with reference to FIG. 17. For example, the UE #2 in FIG. 17 may be a Group Member UE 12C that may be permanently in RRC Connected state in case data transmission is ongoing. Otherwise the state may change, once data transmission is completed, from RRC Connected to RRC Group Connected. This transition may happen after a time of inactivity (expiration of a timer, similar to a DRX mechanism), by an indication in the last downlink packet or after an explicit RRC command (e.g. RRC Connection Release message) sent by the base station 13. Once new uplink data arrives and the amount of data exceeds the preconfigured threshold (configured by system information sent from the base station or from the Group Manager 11 via RRC broadcast or dedicated RRC signaling), the UE 12C may re-establish the RRC Connection towards the base station 13. By default the procedure is done via a RACH procedure (1. RACH, 2. RACH response with small UL resource assignment and timing advance, 3. Uplink Scheduling Request or some other RRC control message, 4. Downlink Response with contention resolution and a possible larger uplink resource assignment), since no uplink resources may exist and the uplink timing advance may not be known.

Figure 20:
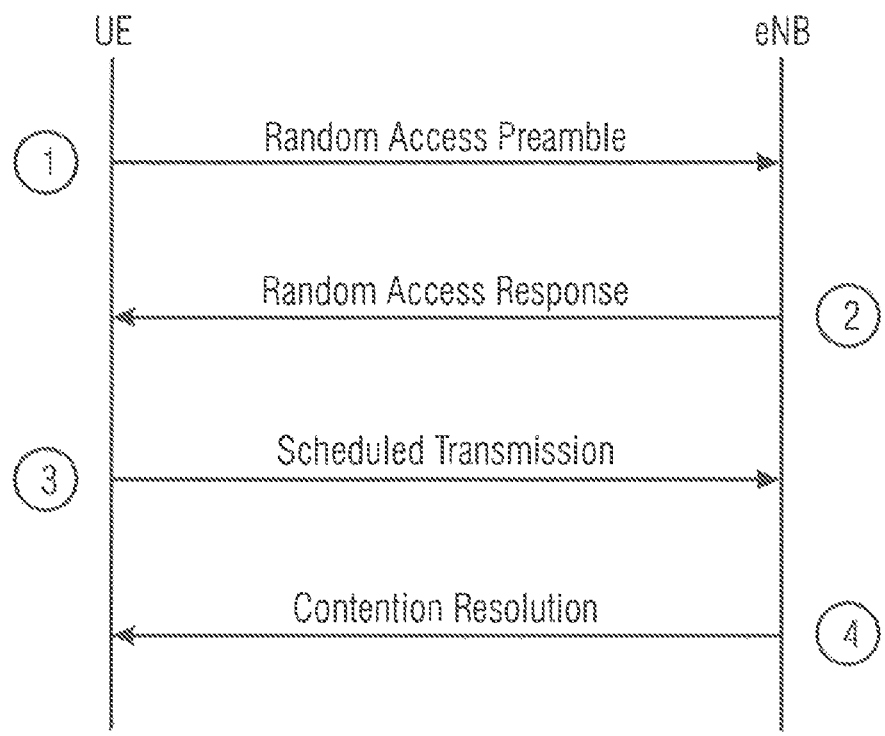
FIG. 20 shows a sequence chart of a LTE and 5G RACH procedure.

However, as can be seen in FIG. 20, said RACH procedure is time consuming, particularly the transmission of the Random Access Preamble. RACH resources might only be configured once a radio frame (every 10 ms) and also collisions can happen, further delaying the transmission of uplink packets.

Figure 21:
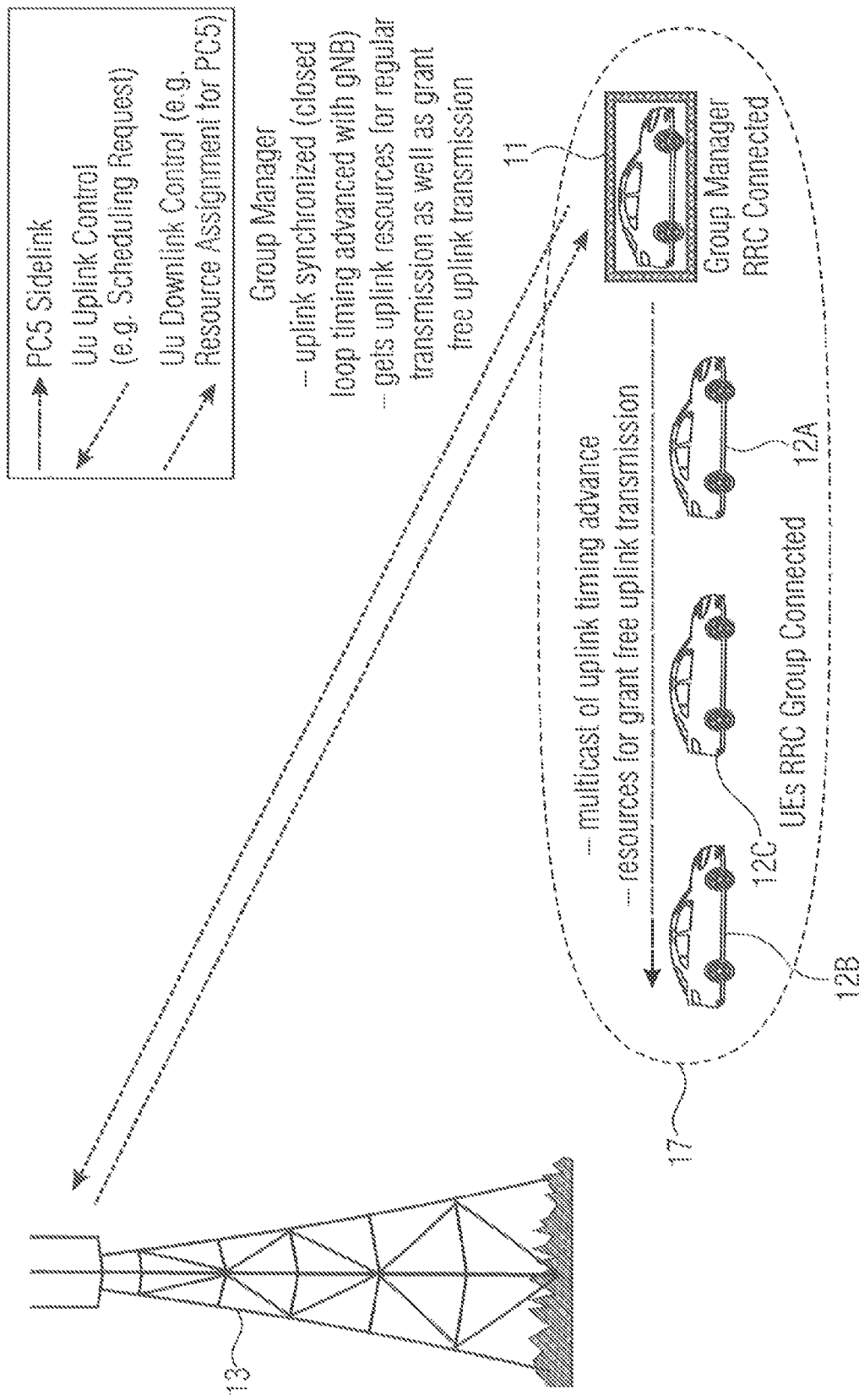
FIG. 21 shows an example of uplink resource allocation forwarded via a Group Manager according to an embodiment.

In order to solve this problem, the present invention suggests that the Group Manager 11 may provide its timing advance via multicast to the Group Member UEs 12A, 12B of its UE Group 17, as exemplarily shown in FIG. 21. This provides means for the UEs 12A, 12B of the UE Group 17 to obtain a RACH-less uplink synchronization or to perform a RACH-less handover procedure. Uplink resources might be used in a synchronized way using a grant-free uplink transmission or a newly defined non-orthogonal uplink access scheme (NOMA) currently discussed in 5G.

Furthermore, the Group Manager 11 could also forward uplink or downlink resource assignment to the group members 12A, 12B via sidelink (PC5). In this way, group members 12A, 12B do not have to perform blind decoding on the downlink control channel (e.g. PDCCH or PUCCH) to know where to perform uplink or downlink transmission. This will move the UE from RRC Group Connected (e.g. UEs 12A, 12B) to RRC Basestation-Connected (e.g. UE 12C—see also FIG. 17). It is much easier for the group manager 11 to ask for resources based on its ongoing communication compared to the to a RRC Group Connected UE 12A, 12B that does not yet have an ongoing communication with the base station 13. The group manager 11 might continuously multicast a pool of uplink resources to all the group members 12A, 12B, 12C that a Group Member UE 12A, 12B, 12C can use for fast uplink transmission without previously asking the base station 13 for a grant. This provides the larger reduction in uplink latency that is most important for Ultra-low reliable low latency services (URLLC). In addition, signaling can be reduced in the downlink direction to allow a fast downlink push to the group member 12A, 12B, 12C without relaying data via the group manager 11.

Figure 22:
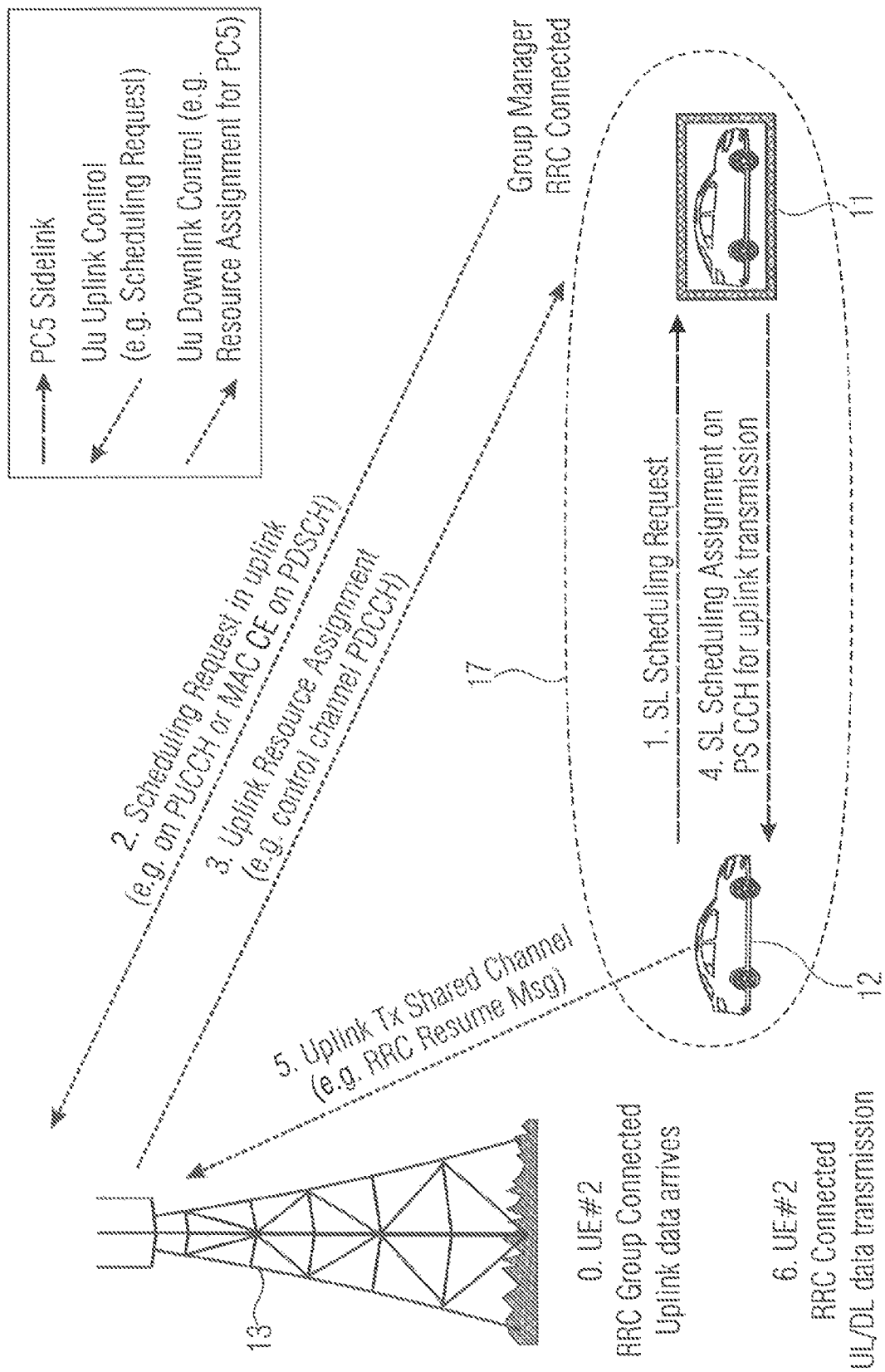
FIG. 22 shows a procedure when uplink resources are provided by the Group Manager according to an embodiment.

In another embodiment, as shown in FIG. 22, the Group Member UE 12 being in the RRC Group Connected state that wants to move to RRC (base station) Connected state to transmit uplink data may send a fast scheduling request to the Group Manager 11 via the sidelink (e.g. sidelink control channel PSCCH). The Group Manager 11 might either provide the UE resources of a pre-assigned pool for grant-free uplink access or might forward the scheduling request to the base station 13 (out-band via uplink PUCCH or in-band via a Buffer Status Report in a MAC Control Element) that in response assigns new uplink resources that are relayed from the base station 13 to the UE 12 via the Group Manager 11. Therefore, in this invention a resource assignment from the Group Manager 11 to the Group Member UE 12 via the sidelink control channel will assign resources (previously already granted in the downlink by the base station 13) on the uplink shared channel.

Figure 23:
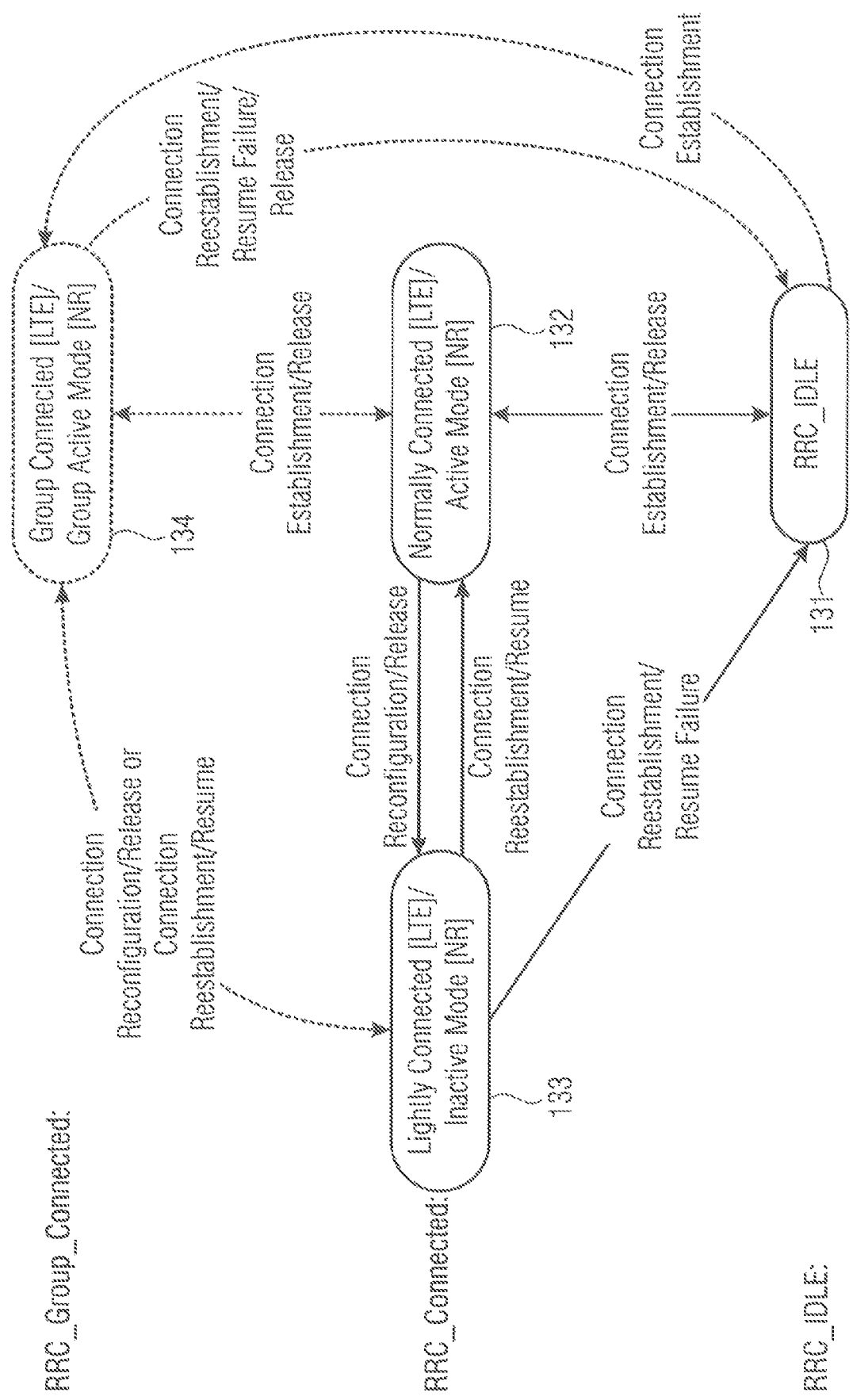
FIG. 23 shows a state machine to include an inventive new Group Connected State.
Figure 24:
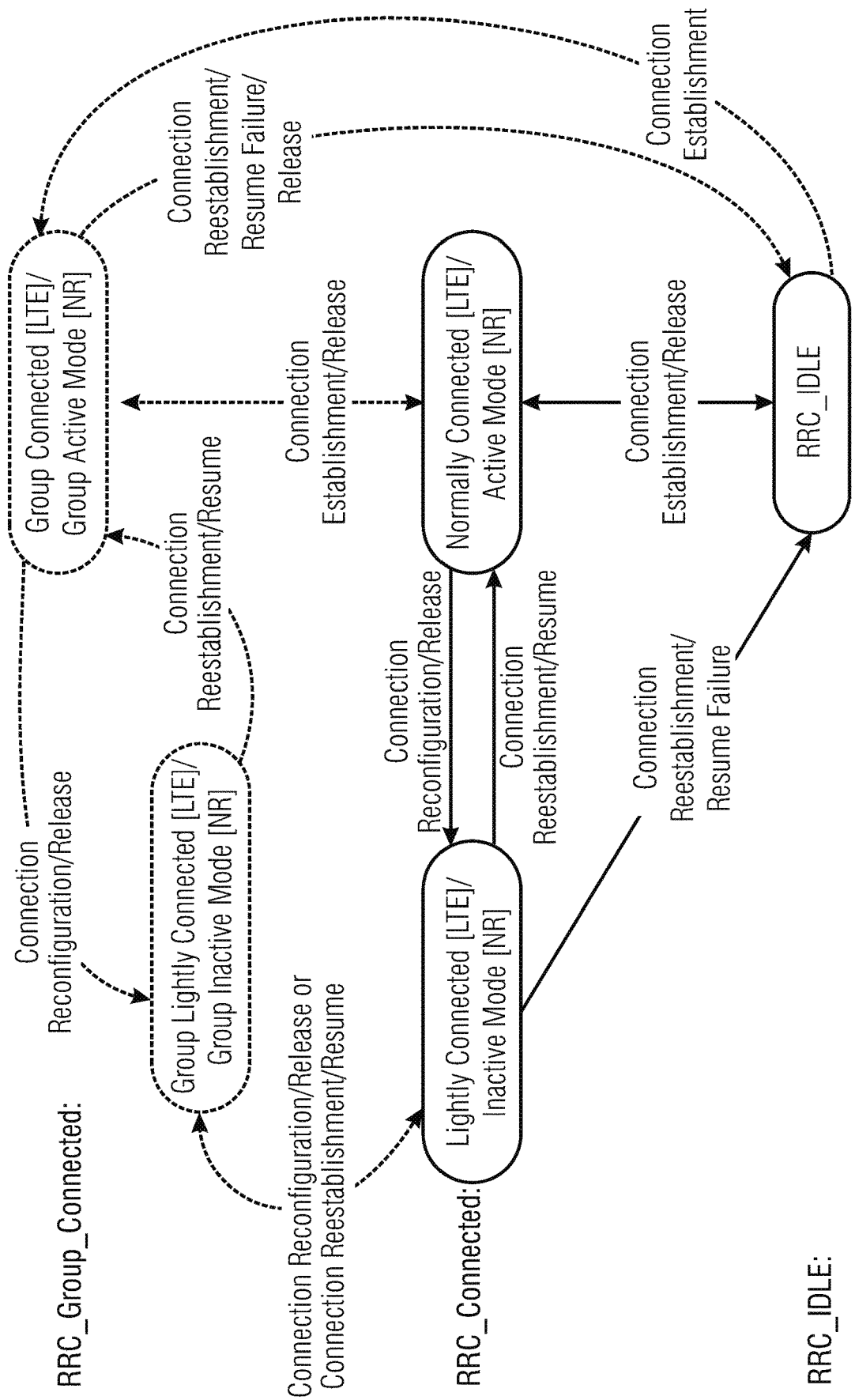
FIG. 24 shows a further state machine to include an inventive new Group Lightly Connected State.

The table below summarizes the states of the previously described embodiments including the newly defined RRC Group Connected state 134 and its features. FIG. 23 depicts the relationship between the newly developed Group Connected State 134 and the existing states 131, 132, 133 (see also FIG. 13) to illustrate failsafe modes when dropping out of this new state 134.

| RRC Connected | RRC Group Connected | RRC Inactive | RRC Idle |
|---|---|---|---|
| Mobility decided by base station based on measurements from UE | Mobility decided by base station based on measurements from the group manager the UE is connected to | Idle mode cell selection procedure by UE with updates of the RAN notification area if new base state broadcasts a new notification area code | Idle mode cell selection procedure by UE with updates of the tracking area if new base state broadcasts a new tracking area code |

| RRC Connected | RRC Group Connected | RRC Inactive | RRC Idle |
| --- | --- | --- | --- |
| location known on cell level | location known on cell level | location known on RAN notification area level | location known on tracking area level |
| UE got a C-RNTI | Group manager got a C-RNTI and/or a group identity. UE might have a group member identity and/or some other kind of identity | UE got a C-RNTI plus the cell identity from the cell the UE was last connected to (anchor cell) | UE got a paging identity used for paging and a TMSI in the core network. No identity in the RAN. |
| no UL/DL data transmission Paging possible in DL. RACH possible in UL. | UL/DL data transmission via the group manager for small data according to criteria. DL Paging not required (base station can move UE to RRC Connected), but paging also possible via the group manager. Accelerated UL access by obtaining timing advanced and uplink resource assignments from the group manager. | UL data transmission possible for small data according to criteria, Otherwise UE performs RACH and moves to RRC Connected. Paging used to reach the UE in the DL. | UE performs RACH and moves to RRC Connected. Paging used to reach the UE in the DL. |

In summary the newly invented RRC state 134 provides means to resume data transmission in the uplink and downlink at any time via the Group Manager 11. There is no need of mobility procedures since everything is handled by the Group Manager 11 that informs the RRC Group Connected UEs (i.e. Group Member UEs 12A, 12B). The base station 13, due to fast closed loop link adaptation and beamforming with continuous transmission and UE feedback, may have a highly efficient radio connection to the Group Manager 11 that can be leveraged for services only requiring small data transmissions such as V2X services, distribution of CAM messages, MTC/IoT services as well as voice communication. Group Member UEs 12A, 12B may be static or mobile users. Mobile users are not limited to vehicles (cars, trains, trucks, busses) but can also include drones, planes, helicopters or other unmanned aerial vehicles (UAVs).

For larger packets, the UE (e.g. the Group Member UE 12A, 12B) may move into the well-known RRC Connected state to communicate directly to the base station 13. The Group Manager 11 may support the Group Member UEs 12A, 12B to accelerate the uplink transmission by multicast of the uplink timing advance as well as by proving uplink resource allocations for a fast uplink transmission for a grant-free transmission or with the previous scheduling request that may have been sent to the Group Manager 11.

It is noted with respect to the above description, that the network location can be cell ID or tracking/paging area. The UE may be passive with knowing it's ID and location within the network (paging area/Cell ID) with, however, not updating it itself. A member UE having no active connection to the CN may be in lightly connected/idle or RRC group lightly connected mode. Cell level location is allowed to be done without much overhead. Tracking area updates are infrequent already. As to network location and paging/access configuration the following is noted, namely: Where the network location and acc. is a tracking/paging area—configuration pertains Paging ID. Where the net. loc a. acc is a cell ID—configuration pertains Paging ID in RRC lightly connected state or RNTI/TA/Pow . . . in RRC connected mode. A managing UE 11 may be in one of two modes, namely Connected or group connected mode. A managing UE 11 which successfully performs a handover may send the UE group any of the following parameters of target eNB, e.g. cell ID, carrier frequency, PRACH resources and preambles, master and system information blocks, C-RNTI), bandwidth, supported MIMO modes and/or antenna configuration.

The invention may also be realized by the following embodiments that may be combined with the herein described examples and embodiments as well as with the embodiments as defined in the claims:

1. User equipment (12A, 12B, 12C) for a cellular network (10), the UE being configured so that a mobility of a connection between the user equipment and the cellular network (10) is managed by a predetermined user equipment of a UE Group (17) to which the user equipment (12A, 12B, 12C) and the predetermined user equipment (11) belong.

2. User equipment (12A, 12B, 12C) for a cellular network (10), being part of a UE Group (17) and connected to a predetermined UE (11), that manages the mobility of a connection between the UE (12A, 12B, 12C) and the cellular network (10).

3. User equipment (12A, 12B, 12C) for a cellular network (10), configured to leave up, at least partially, a management of a mobility of a connection between the UE (12A, 12B) and the cellular network (10) to a predetermined UE (11) of an UE Group (17) to which the UE (12A, 12B, 12C) and the predetermined UE (11) belong.

4. User equipment (12A, 12B, 12C) of at least one of embodiments 1 to 3, configured to, when being in a group connected state (134), neither perform cell selection nor handover related procedures.

5. User equipment (12A, 12B, 12C) of at least one of embodiments 1 to 3, configured to, when in a group lightly connected mode (134)

in which the UE (12A, 12B, 12C) does not have a direct connection with a base station (13),
neither performs cell selection or handover related procedures.
6. User equipment (12A, 12B, 12C) of at least one of embodiments 1 to 3, configured to, when in a group direct connected mode
in which the UE (12A, 12B, 12C) does have a connection with a base station (13),
neither performs cell selection or handover related procedures.
7. User equipment (12A, 12B, 12C) of at least one of embodiments 1 to 3, configured to, when in a group lightly connected mode, has no direct connection to the cellular network (10) and keeps track of the tracking/paging area, in which the UE (12A, 12B, 12C) is currently located, by updating the tracking/paging area through or via inbound tracking/paging area messages.
8. User equipment (12A, 12B, 12C) of embodiment 7, configured to receive the inbound tracking/paging area messages from the predetermined UE (11).
9. User equipment (12A, 12B, 12C) of at least one of embodiments 1 to 3, comprising a group lightly connected mode (134), wherein in said group connected mode (134) the UE (12A, 12B, 12C) has no active connection to the cellular network (10) and suspends keeping track of the tracking/paging area in which the UE (12A, 12B, 12C) is currently located and resumes keeping track of the tracking/paging area, in which the UE (12A, 12B, 12C) is currently located, after the group lightly connected mode (134) on the basis on a tracking/paging area reported by an inbound tracking/paging area message at the end of the group connected mode (134).
10. User equipment (12A, 12B, 12C) of embodiment 9, configured to receive the inbound tracking/paging area message from the predetermined UE (11).
11. User equipment (12A, 12B, 12C) of any of the previous embodiments, comprising a group lightly connected mode (134), in which the UE (12A, 12B, 12C) has no active connection to the cellular network (10), and a normal lightly-connected mode (133), in which the UE (12A, 12B, 12C) has no active connection to the cellular network (10), wherein the UE (12A, 12B, 12C) is
configured to, in the normal lightly-connected mode (133), keep track of a tracking/paging area by sensing its changing of a current position of the tracking/paging area and inform the cellular network (10) on the UE's (12A, 12B, 12C) changing of the current position of the tracking/paging area by sending an outbound tracking/paging area message to the cellular network (10), and
configured to, in the group lightly connected mode (134), leave up to the predetermined UE (11) the informing the cellular network on the UE's (12A, 12B, 12C) changing of the current position of the tracking/paging area or the keeping track of tracking/paging area and the informing the cellular network (10) on the UE's (12A, 12B, 12C) changing of the current position of the tracking/paging area.
12. User equipment (12A, 12B, 12C) of any of the previous embodiments, comprising a group directly connected mode (132), in which the UE (12A, 12B, 12C) has an active connection to the cellular network (10), wherein the UE (12A, 12B, 12C) is configured to, in the group directly connected mode (132), receive one or more connection parameters from a connection parameter message from the predetermined UE (11) and use the one or more connection parameters thus received for the active connection between the cellular network (10) and UE (12A, 12B, 12C).
13. User equipment (12A, 12B, 12C, 52) of any of the previous embodiments, comprising a group directly connected mode (132), in which the UE (12A, 12B, 12C) has an active connection to the cellular network (10), wherein the UE (12A, 12B, 12C) is configured to, in the group directly connected mode (132), refrain from performing any handover.
14. User equipment (12A, 12B, 12C, 52) of any of the previous embodiments, comprising a group directly connected mode and comprising a normal directly connected mode, in which the UE (12A, 12B, 12C, 52) has an active connection to the cellular network (10), wherein in the group directly connected mode the UE belongs to the UE Group and in the normal directly connected mode the UE is currently no member of any UE Group, wherein the UE (12A, 12B, 12C, 52) is configured to, in the normal directly connected mode,
intermittently perform connection measurements on the active connection between the cellular network (10) and the UE (52) to obtain one or more connection parameters and use the one or more connection parameters thus obtained for the active connection between the cellular network (10) and the UE (52), and
in the normal directly connected mode, suspend from performing the connection measurements, receive the one or more connection parameters from an inbound connection parameter message and use the one or more connection parameter thus received for the active connection between the cellular network (10) and the UE (12A, 12B, 12C).
15. User equipment (12A, 12B, 12C) of embodiment 13 or 14, wherein the one or more connection parameter comprises one or more of parameters relating to, or being,
power control,
power headroom,
a RACH resources and parameters,
a time advance value,
a RNTI or a unique user ID,
a channel frequency offset (CFO),
a Doppler shift,
RSSI,
RSRP, and
RSRQ.
16. User equipment (12A, 12B, 12C) of any of embodiments 1 to 15, wherein the UE (12A, 12B, 12C) is configured to send an uplink scheduling request to the predetermined UE (11), receive a scheduling message from the predetermined UE (11), answering the uplink scheduling request, indicating a share of physical resources, and use the share of physical resources for an uplink connection from the UE (12A, 12B, 12C) to the cellular network (10).
17. User equipment (11) for a cellular network (10) configured to manages a mobility of a connection between the cellular network (10) and a UE Group (17) which includes the UE (11) and one or more other UEs (12A, 12B).
18. User equipment (11) of embodiment 17, configured to keep the cellular network (10) updated on a tracking/paging area in which the UE group (17) is located.
19. User equipment (11) of embodiment 18, comprising a lightly-connected mode (133), wherein the UE (11) is configured to, in the lightly-connected mode in which the UE (11) has no active connection to the cellular network (10) while in the tracking/paging area, keep the cellular network (10) updated on a tracking/paging area.

20. User equipment (11) of embodiment 17 or 18, comprising a directly connected mode (132) in which the UE (11) has an active connection to the cellular network (10), wherein the UE (10) is configured to, in the directly connected mode (132), perform a handover in case of cell transition.
21. User equipment (11) of embodiment 17 to embodiment 20, wherein the UE (11) is configured to, in the lightly-connected mode (133),
keep the cellular network (10) updated on a tracking/paging area in which the UE group (17) is located by way of tracking/paging area update messages,
and wherein the UE (11) is configured to, in the directly connected mode (132), perform a handover in case of cell transition, thereby keeping the cellular network (10) updated on the tracking/paging area in which the UE group (17) is located on cell level.
22. User equipment (11) of any of embodiment 20 or 21, wherein the UE (11) is configured to, in the directly connected mode (132), keep the one or more other UEs (12A, 12B) of the UE group (17) updated via a handover control message on a status of the handover.
23. User equipment (11) of embodiment 22, whereas the status of the handover can be one of the following: HO measurement, HO preparation phase, HO execution phase, HO completion phase, HO execution, HO failure.
24. User equipment (11) of at least one of embodiments 22 or 23, configured to send the handover control message via multicast to all members of the UE Group (17).
25. User equipment (11) of any of embodiments 20 to 24, wherein the UE (11) is configured to, in the directly connected mode (132), relay data transmitted via the active connection to/from a respective one UE (12A, 12B) of the UE group (17).
26. User equipment (11) of embodiment 25, wherein the UE (11) is configured to, in the directly connected mode (132), relay data transmitted via the active connection to/from the respective one (12A, 12B) of the UE group (17) via a UE-to-UE side link connection.
27. User equipment (11) of any of embodiments 17 to 25, configured to retrieve one or more connection parameters from a set-up or a maintenance of an active connection between the UE (11) and the cellular network (10) and inform the one or more other UEs (12A,12B) about the one or more connection parameter by way of a connection parameter message.
28. User equipment (11) of embodiment 26 or 27, wherein the one or more connection parameter comprises one or more of parameters relating to, or being, power control, power headroom, a RACH parameter, a RNTI ID, a channel frequency offset (CFO), a doppler shift, RSSI, RSRP, and RSRQ.
29. User equipment (11) of any of embodiments 17 to 28, configured to
perform a synchronization to a base station (13) via a random access channel to obtain a timing advance value, and
forward the timing advance value to the one or more other UEs (12A, 12B) of the UE group (17).
30. User equipment (11) of any of embodiments 17 to 29, configured to receive an uplink scheduling request from a member UE (12A, 12B) of the UE group (17) and pass a share of physical resources pre-allocated to the UE group (17) to the member UE (12A, 12B).
31. Apparatus for a cellular network (10) configured to manage a connectivity between the cellular network (10) and a plurality of UEs (11, 12A, 12B, 12C, 52) individually, and
in units of UE groups (17), each UE group (17) containing two or more UEs (11, 12A, 12B, 12C).
32. Apparatus according to embodiment 31, wherein the apparatus comprises a mobility management apparatus or a base station (13).
33. Apparatus of embodiment 31 or 32, configured to receive a tracking area update message with respect to a UE group (17) of UEs (11, 12A, 12B, 12C) from a predetermined one (11) of the UEs (11, 12A, 12B, 12C) and update a tracking/paging area for each UE (11, 12A, 12B, 12C) of the UE group (17) so as to be a tracking/paging area indicated in the tracking area update message.
34. Apparatus of any of embodiments 31 to 33, configured to, responsive to a handover of a predetermined one (11) of the UEs (11, 12A, 12B, 12C) of the UE group (17), update a tracking/paging area for any lightly-connected UE of the UE group (17) so as to be the cell which the handover targets at.
35. Apparatus of any of embodiments 31 to 34, configured to determine whether a handover is required for UEs (11, 12A, 12B, 12C) of any UE group (17) collectively for each UE group (17) on the basis of a measurement report received from a predetermined UE (11) of the respective UE group (17).
36. Apparatus of any of embodiments 31 to 35, configured to determine whether a handover is required for UEs (11, 12A, 12B, 12C) of any UE group (17) collectively for each UE group (17) and send a handover command to a predetermined UE (11) of the respective UE group (17) exclusively in case of the handover is determined to be required.
37. Methods performed by any of the above mentioned apparatuses and computer program for instructing a processor to perform, when executed by said processor, any of these methods.

The invention may also be further realized by the following embodiments that may be combined with the herein described examples and embodiments as well as with the embodiments as defined in the claims:

1. A User Equipment—UE—(11) for a cellular network (10), the UE (11) comprising
a first interface (15) for UE-to-Basestation communication configured to communicate with a base station (13) of the cellular network (10), and
a second interface (16) for UE-to-UE communication configured to communicate with one or more other UEs (12A, 12B) of a UE-Group (17) to which the UE (11) belongs,
wherein the UE (11) is configured to receive via its first interface (15) configuration data for configuring its second interface (16), and to coordinate, via the second interface (16), a communication within the UE Group (17).
2. The UE (11) of embodiment 1, wherein the UE (11) is configured to allocate physical resources of the second interface (16) to members of the UE Group (17) so as to coordinate the communication within the UE Group (17).
3. The UE (11) of embodiment 2, wherein the physical resources are pre-allocated by the cellular network (10).
4. The UE (11) of one of the preceding embodiments, wherein the first interface (15) of the UE (11) is configured to operate on a first frequency, and the second interface (16) of the UE (11) is configured to operate on a second frequency.
5. The UE (11) of embodiment 1, wherein the UE (11) is further configured to receive predetermined data via the second interface (16), and to relay said predetermined data to the base station (13) via the first interface (15), or to receive predetermined data via the first interface (15) from the base station (13), and to relay said predetermined data via the second interface (16).

6. A User Equipment—UE—(11) for a cellular network (10), the UE (11) comprising a first interface (15) for UE-to-Basestation communication configured to communicate with a base station (13) of the cellular network (10), and a second interface (16) for UE-to-UE communication configured to communicate with one or more other UEs (12A, 12B) of a UE group (17) to which the UE (11) belongs, wherein the UE (11) is configured to receive predetermined data via the second interface (16), and to relay said predetermined data to the base station (13) via the first interface (15), or to receive predetermined data via the first interface (15) from the base station (13), and to relay said predetermined data via the second interface (16).

7. The UE (11) of embodiment 5 or 6, wherein said predetermined data is at least one of a configuration data or a user data.

8. The UE (11) of one of embodiments 5 to 7, wherein the UE (11) is configured to decide, based on a decision criterion, whether to relay the predetermined data.

9. The UE (11) of embodiment 8, wherein said decision criterion is a data size and/or a QoS parameter and/or a radio bearer parameter and/or a requested bit rate and/or the maximum delay and/or a combined constraint and/or a jitter constraint of the predetermined data to be relayed.

10. The UE (11) of one of the preceding embodiments, wherein the UE (11) is configured to receive system information from the base station (13) via the first interface (15) via broadcast information on a physical broadcast channel, and/or via system information on a physical data channel, and/or via a dedicated Radio Resource Control (RRC) message on a physical data channel.

11. The UE (11) of embodiment 10, wherein the system information received from the base station (13) comprises an indicator to support a Group-Management-Functionality and/or a Group Communication Functionality in the cell served by the base station (13), and/or a system information block with configuration details related to the Group Management Function and/or the Group Communication Function and/or a radio resource configuration message with configuration details related to the UE-Group.

12. The UE (11) of one of the preceding embodiments, wherein the UE (11) is configured to send a request message to the base station (13) to request the base station (13) to be authorized and/or allowed to coordinate the communication within the UE Group (17) and to provide the configuration data that enables the UE (11) to coordinate the communication within the UE Group (17).

13. The UE (11) of embodiment 12, wherein sending the request message is initiated by a user and/or by a car control of the UE (11) and/or by a reception of V2V messages from other UEs within the proximity of the UE (11).

14. The UE (11) of one of embodiments 11 to 13, wherein the UE (11) is configured to decide, based on its battery status and/or its connection to a power supply, whether to send the request message.

15. The UE of one of embodiments 11 to 14, wherein the request message comprises at least one of a reconfiguration request message comprising a request to provide system information comprising the configuration data for the UE-to-UE communication within the UE Group (17), a service request message, or an interest indication message.

16. The UE (11) of one of the preceding embodiments, wherein the UE (11) is configured to receive one or more response messages from the base station (13), wherein said response message comprises at least a portion of the configuration data, and wherein the at least a portion of the configuration data comprises at least system information with configuration details for UE-to-UE communication within the UE Group (17).

17. The UE (11) of embodiment 16, wherein the one or more response messages comprise configuration information for at least one of a transmission and/or reception handling and/or transmission and/or reception resources to be used for UE-to-UE communication within a UE Group (17), a Group Identity assigned to the UE Group (17), an uplink control channel for UE-to-Basestation communication, an uplink shared channel for UE-to-Basestation communication, or an uplink random access channel for UE-to-Basestation communication.

18. The UE (11) of one of the preceding embodiments, wherein the configuration data received from the base station (13) contains physical resource assignments for UE-to-UE communication between the UE (11) and one or more of the other UEs (12A, 12B) of the UE-Group (17) to which the UE (11) belongs, and/or physical resource assignments for UE-to-UE communication between two or more of the other UEs (12) of the UE-Group (17) to which the UE (11) belongs whereas the UE (11) may or may not be part of the UE-to-UE communication.

19. The UE (11) of one of the preceding embodiments, wherein the configuration data received from the base station (13) contains physical resource assignments for UE-to-UE communication between the UE (11) and at least one further UE (52) that is not part of the UE-Group (17) to which the UE (11) belongs and/or between the UE (11) and at least one further UE-Group (17B), and/or physical resource assignments for UE-to-UE communication between one of the other UEs (12A, 12B) of the UE-Group (17) to which the UE (11) belongs and the at least one further UE (52) that is not part of the UE-Group (17) to which the UE (11) belongs.

20. The UE (11) of one of the preceding embodiments, wherein the UE (11) is configured to transmit control information to the base station (13), the control information comprising status information regarding the UE-to-UE communication within the UE-Group (17) to which the UE (11) belongs.

21. The UE (11) of embodiment 20, wherein the control information being sent to the base station (13) comprises at least one of a scheduling request requesting the physical resources for the UE-to-UE communication within the UE Group (17) and/or for the UE-to-Basestation communication, a channel state information, or a signal strength measurement, or an interference measurement, or a Power Headroom or Power Control Reporting, or a timing advance value, or sensing information, or channel busy ratio, or channel occupancy ratio, or positioning information, or a suggested semi-persistent scheduling pattern, or control information configuring a discontinuous reception cycle (DRX) to be used by UE members of the group.

22. The UE (11) of one of the preceding embodiments, wherein the UE (11) is configured to provide a synchronization and/or physical broadcast channel and/or system information on a sidelink data channel to other UEs (12A, 12B) within the UE Group (17) and/or to other UEs (52) outside the UE Group (17) that are interested in being connected to the UE-Group (17) to which the UE (11) belongs.

23. The UE (11) of embodiment 22, wherein the synchronization signal and/or physical broadcast channel and/or system information on the sidelink data channel contains a Group Identity.

24. The UE (11) of embodiment 23, wherein the Group Identity was previously assigned to the UE (11) by the base station (13) via control signaling.

25. The UE (11) of one of the preceding embodiments, wherein the UE (11) is configured to provide at least a portion of the configuration data of the UE-to-UE communication to the other UEs (12A, 12B) within the UE-Group (17).

26. The UE (11) of one of the preceding embodiments, wherein the UE (11) is configured to provide control information to the other UEs (12A,12B) within the UE-Group (17), wherein said control information is to announce a Group-Management-Functionality of the UE (11) towards the other UEs (12A, 12B).

27. The UE (11) of one of the preceding embodiments, wherein the UE (11) is configured to exchange control data and/or user data via its second interface (16) with at least one or more of the other UEs (12A, 12B) within the UE-Group (17).

28. The UE (11) of embodiment 27, wherein the UE (11) is configured to exchange the control data and/or user data directly with a first other UE (12A, 12B), and/or to exchange the control data and/or user data with the first other UE (12A) via a second other UE (12B).

29. The UE (11) of one of the preceding embodiments, wherein the UE (11) is configured to receive, via its second interface (16), a scheduling request information and/or a suggested Semi-Persistent Scheduling Pattern and/or sensing information and/or channel busy ratio, and/or channel occupancy ratio, from at least one of the other UEs (12A, 12B) within the UE-Group (17), when said at least one other UE (12A, 12B) intends to send predetermined data to at least another one of the other UEs (12A, 12B) within the UE-Group (17), or when said at least one other UE (12A, 12B) intends to send predetermined data to the base station (13) via the UE (11).

30. The UE (11) of one of the preceding embodiments, wherein the UE (11) is configured to send the physical resource assignments for the UE-to-UE communication to at least one of the other UEs (12A, 12B) within the UE-Group (17).

31. The UE (11) of one of the preceding embodiments, wherein the UE (11) is configured to receive, via its second interface (16), a connection setup request message from a foreign UE (52) that is not part of the UE-Group (17) to which the UE (11) belongs, said connection setup request message indicating towards the UE (11) that the foreign UE (52) wants to join the UE-Group (17) to which the UE (11) belongs.

32. The UE (11) of embodiment 31, wherein the connection setup request message contains at least one of a control information, a UE identity from the foreign UE (52), a Group Identity of the UE-Group (17) the foreign UE (52) wants to join, a suggested identity within the UE-Group (17) and/or suggested position within the UE-Group (17) and/or a request for at least one of the following: a service, a bearer, a logical channel, a Quality of Service, a data transmission, a data rate for within the UE-Group (17) or for transmission towards the predetermined UE (11) to be relayed to the base station (13).

33. The UE (11) of one of embodiments 31 or 32, wherein the UE (11) is configured to send, via its second interface (16), a connection setup response message to the foreign UE (52), wherein the connection setup response message comprises control information related to the connection setup.

34. The UE (11) of embodiment 33, wherein the control information comprises at least one of control information about one or more services and/or logical channels and/or data bearer and/or data flows that are to be relayed by the UE (11) to the base station (13) via its first interface (15) and/or via its second interface (16), or that are to be sent directly from the foreign UE (52) to the base station (13) via its first interface (15);

control information about a connection state that is to be used by the foreign UE (52);

control information about an assigned identity and/or an assigned position within the UE-Group (17);

control information about if paging and/or system information and/or system information updates and/or data packets below a predetermined size are to be relayed by the UE (11) to the base station (13) via its first interface (15) and/or via its second interface (16), or that are to be sent directly from the foreign UE (52) to the base station (13) via its first interface (15).

35. A User Equipment—UE—(12) for a cellular network, the UE (12) comprising a first interface (15) for UE-to-Basestation communication configured to communicate with a base station (13) of the cellular network, and a second interface (16) for UE-to-UE communication configured to communicate with one or more other UEs (11, 12A, 12B) of a UE Group (17) to which the UE (12) belongs, wherein the UE (12) is configured to communicate via its second interface (16) with at least one or more of the other UEs (11, 12A, 12B) of the UE Group (17), wherein the communication is coordinated by a predetermined UE (11) of the UE Group (17).

36. The UE (12) of embodiment 35, wherein the UE (12) comprises two communication paths, wherein for a first communication path, the UE (12) is configured to communicate via its second interface (16) with at least one or more of the other UEs (11, 12A, 12B) of the UE Group (17), wherein the communication is coordinated by a predetermined UE (11) of the UE Group (17), and wherein for a second communication path, the UE (12) is configured to communicate via its first interface (15) directly with the base station (13).

37. The UE (12) of embodiment 36, wherein for the second communication path the communication is coordinated by the base station (13).

38. The UE (12) of one of embodiments 35 to 37, wherein the UE (12) is configured to get assigned physical resources of the second interface (16) from the predetermined UE (11) for a communication within the UE Group (17).

39. The UE (12) of embodiment 38, wherein the physical resources of the first interface (15) are assigned by the cellular network (10).

40. The UE (12) of one of embodiments 35 to 39, wherein the UE (12) is configured to
send predetermined data via the second interface in a manner relayed by the predetermined UE (11) to the base station (13), or
receive predetermined data via the second interface in a manner relayed by the predetermined UE (11) from the base station (13).

41. A User Equipment—UE—(12) for a cellular network, the UE (12) comprising
a first interface (15) for UE-to-Basestation communication configured to communicate with a base station (13) of the cellular network, and
a second interface (16) for UE-to-UE communication configured to communicate with one or more other UEs (11, 12A, 12B) of a UE Group (17) to which the UE (12) belongs, and
wherein the UE (12) is configured to
send predetermined data via the second interface (16) in a manner relayed by a predetermined UE (11) to the base station (13), or
receive predetermined data via the second interface (16) in a manner relayed by a predetermined UE (11) from the base station (13).

42. The UE (12) of one of embodiments 35 to 41, wherein the UE (12) is configured to decide, based on a predetermined criterion, to send the predetermined data via the first interface (15) directly to the base station (13) and/or to send the predetermined data via the second interface (16) in a manner relayed by the predetermined UE (11) to the base station (13).

43. The UE (12) of embodiment 42, wherein the UE (12) is configured to receive said predetermined criterion from the base station (13).

44. The UE (12) of one of embodiments 42 or 43, wherein the predetermined criterion comprises at least one of service type, bearer type, message size, periodicity, bit rate, minimum and/or maximum delay demands, a Power Class and/or Power Headroom, the current or past transmission power, a battery status of the UE (12), the kind of power supply of the UE (12), a distance and/or pathloss from a base station (13), or an availability of physical resources assigned to the UE (12).

45. The UE (12) of one of embodiments 35 to 44, wherein the UE (12) is configured by the base station (13) to receive the predetermined data via the first interface (15) directly from the base station (13) and/or configured by the predetermined UE (11) to receive the predetermined data via the second interface (16) in a manner relayed by the predetermined UE (11) from the base station (13).

46. The UE (12) of one of embodiments 35 to 45, wherein the UE (12) comprises two communication paths, wherein for the first communication path the UE (12) is configured to communicate via its second interface (16) with the predetermined UE (11), and for the second communication path the UE (12) is configured to communicate via its first interface (15) directly with the base station (13), and wherein the UE (12) is configured to receive via one of its first or second communication paths predetermined data and to also receive via the other one of its first and second communication paths redundancy data for the predetermined data.

47. The UE (12) of embodiment 46, wherein the redundancy data received via the first communication path is a copy of at least a part of the predetermined data received via the second communication path or a complete copy of the predetermined data.

48. The UE (12) of embodiment 46 or 47, wherein the predetermined data and the redundancy data together form a FEC-Codeword.

49. The UE (12) of one of embodiments 35 to 48, wherein the UE (12) is configured to receive control information from the base station (13) via its first interface (15) and/or from the predetermined UE (11) via its second interface (16).

50. The UE (12) of one of embodiments 35 to 49, wherein the UE (12) is configured to determine from the control information its transmission and reception behavior of its first interface (15) and/or second interface (16).

51. The UE (12) of one of embodiments 35 to 50, wherein in case the UE (12) decided to use the first interface (15) for direct UE-to-Basestation communication and the UE (12) does not have any transmission resources for the first interface (15) assigned by the base station (13), the UE (12) is configured to send an uplink random access signal and/or message on a random access channel and/or another signal/message on a physical resource that can be used without a previous grant.

52. The UE (12) of one of embodiments 35 to 51, wherein in case the UE (12) decided to use the first interface (15) for direct UE-to-Basestation communication and the UE (12) has pre-allocated transmission resources for the first interface (15) assigned by the base station (13), the UE (12) is configured to send an uplink scheduling request on a uplink control channel and/or a buffer status report with or without an indication of a logical channel and/or a priority for which resources are requested on a uplink shared channel and/or the UE (12) will use the pre-allocated transmission resources to directly send the all or part of the predetermined data on the first interface (15).

53. The UE (12) of one of embodiments 35 to 52, wherein in case the UE (12) decided to use the second interface (16) for an indirect communication to the base station (13) via the predetermined UE (11), the UE (12) is configured to send a sidelink scheduling request on a sidelink control channel and/or a buffer status report with or without an indication of a logical channel and/or a priority for which resources are requested on a sidelink shared channel and/or the UE will use the pre-allocated transmission resources to directly send the all or part of the predetermined data on the second interface (16).

54. The UE (12, 52) of one of embodiments 35 to 53, wherein the UE (12, 52) is configured to send a connection setup request message via the second interface (16) to the predetermined UE (11) in order to request the predetermined UE (11) to assign physical resources of the second interface and/or to join a UE-Group (17) and/or to send at least a portion of the configuration data and/or control information for UE-to-UE communication within a UE-Group (17) to the UE (12, 52) via the second interface (16).

55. The UE (12, 52) of embodiment 54, wherein the connection setup request message contains at least one of a control information, a UE identity from the foreign UE (52), a Group Identity of the UE-Group (17) the foreign UE (52) wants to join, a suggested identity within the UE-Group (17) and/or suggested position within the UE-Group (17) and/or a requested for one of the following a service, a bearer, a logical channel, a Quality of Service, a data transmission, a data rate for within the UE-Group (17) or for transmission towards the predetermined UE (11) to be relayed to the base station (13).

56. The UE (12, 52) of one of embodiments 35 to 55, wherein the UE (12, 52) is configured to receive a connection setup response message from the predetermined UE (11), wherein said connection setup response message comprises at least the requested control information.

57. The UE (12, 52) of one of embodiments 35 to 56, wherein the control information comprises at least one of
   - an information as to which services and/or logical channels and/or data bearers and/or data flows and/or service flows are to be relayed in the uplink to the base station (13) in manner relayed by the predetermined UE (11) or to be directly sent from the UE (12, 52) to the base station (13);
   - information as to a network connection state of the UE (12, 52) that the UE (12, 52) is to use when being connected to a UE Group (17);
   - information about if paging and/or system information and/or system information updates and/or packets of a predetermined size are to be received in the downlink in a manner relayed by the predetermined UE (11) or to be received by the UE (12, 52) directly from the base station (13);
   - information if the UE (12, 52) is to relay configuration data and/or user data to the predetermined UE (11) via the second interface (16) or to send said configuration data and/or user data directly to the base station (13).

58. The UE (12, 52) of one of embodiments 35 to 57, wherein the UE (12, 52) is configured to select one predetermined UE (11) out of a multitude of predetermined UEs based on a signal characteristic of signals received from said multitude of predetermined UEs, and to get assigned physical resources from the selected one (11) of the predetermined UEs.

59. The UE (12, 52) of embodiment 58, wherein the UE (12, 52) is configured to select the one predetermined UE (11) based on a selection criterion, wherein said selection criterion is provided by the base station (13).

60. The UE (12, 52) of embodiment 59, wherein the selection criterion is at least one of a receive signal strength, a link quality, or a physical identity.

61. The UE (12, 52) of embodiment 59 or 60, wherein the selection criterion considers control information received from the multitude of predetermined UEs with at least one of a priority indication, an identity, the type of synchronisation source, or the type of services that are offered.

62. A base station (13) for a cellular network, wherein the base station (13) is configured to
   communicate with one or more User Equipments—UEs—(11, 12A, 12B) of a UE Group (17),
   wherein the base station (13) comprises
   a first mode in which the base station (13) coordinates the communication with the one or more UEs (11, 12A, 12B) of the UE Group (17),
   and a second mode in which the base station (13) is configured to appoint a predetermined UE (11) for coordinating the communication within the UE Group (17).

63. The base station (13) of embodiment 62, wherein the base station (13) is configured to send configuration data to the appointed UE (11), wherein said configuration data contains information for the appointed UE (11) how to configure its communication interface (16) for a UE-to-UE communication so as to coordinate the communication between the one or more UEs (11, 12A, 12B) of the UE Group (17).

64. The base station (13) of embodiment 62 or 63, wherein the base station (13) is configured to provide to the appointed UE (11) physical resources for the communication between the one or more UEs (11, 12A, 12B) of the UE Group (17).

65. The base station (13) of embodiment 64, wherein said physical resources are pre-allocated by the cellular network (10).

66. A base station (13) for a cellular network, configured to send predetermined data to a first User Equipment—UE—(12A, 12B) of an UE Group (17) via a second UE (11) of the UE Group (17) in a manner relayed by the second UE (11),
   or to receive predetermined data from a first UE (12A, 12B) of the UE Group (17) via a second UE (11) of the UE Group (17) in a manner relayed by the second UE (11).

67. A cellular network comprising an UE (11, 12A, 12B) according to at least one of embodiments 1 to 61 and a base station (13) according to at least one of embodiments 62 to 66.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A User Equipment—UE—for a cellular network, the UE comprising
   a first interface for UE-to-Basestation communication configured to communicate with a base station of the cellular network, and
   a second interface for UE-to-UE communication configured to communicate with one or more other UEs of a UE-Group to which the UE belongs,
   wherein the UE is configured to receive via its first interface configuration data for configuring its second interface, and configured to send control information to the one or more other UEs for informing them how to configure their respective second interface, and configured to coordinate, via the second interface, an intra-group communication between the one or more other UEs within the UE-Group,
   wherein the UE is configured to send a request message to the base station to request the base station to be authorized and/or allowed to coordinate the intra-group communication within the UE-Group and to provide the configuration data that enables the UE to coordinate the intra-group communication within the UE-Group,
   wherein the request message comprises at least one of a reconfiguration request message comprising a request to provide system information comprising the configuration data for the intra-group communication within the UE-Group, a service request message, or an interest indication message,
   wherein sending the request message is initiated by a user and/or by a car control of the UE and/or by a reception of V2V messages from other UEs within the proximity of the UE,
   or wherein the UE is configured to decide, based on its battery status and/or its connection to a power supply, whether to send the request message.

2. The UE of claim 1, wherein the UE is configured to allocate physical resources of the second interface to members of the UE-Group so as to coordinate the intra-group communication within the UE-Group,
   wherein the configuration data contains physical resource assignments for UE-to-UE communication between the UE and one or more of the other UEs of the UE-Group to which the UE belongs, and/or physical resource assignments for UE-to-UE communication between two or more of the other UEs of the UE-Group to which the UE belongs whereas the UE may or may not be part of the UE-to-UE communication, or
   wherein the configuration data contains physical resource assignments for UE-to-UE communication between the UE and at least one further UE that is not part of the UE-Group to which the UE belongs and/or between the UE and at least one further UE-Group, and/or physical resource assignments for UE-to-UE communication between one of the other UEs of the UE-Group to which the UE belongs and the at least one further UE that is not part of the UE-Group to which the UE belongs, or
   wherein the physical resources are pre-allocated by the cellular network.

3. The UE of claim 1, wherein the first interface of the UE is configured to operate on a first frequency, and the second interface of the UE is configured to operate on a second frequency.

4. The UE of claim 1, wherein the UE is further configured to
   receive first predetermined data via the second interface, and to relay said first predetermined data to the base station via the first interface,
   or to receive second predetermined data via the first interface from the base station, and to relay said second predetermined data via the second interface.

5. The UE of claim 4, wherein said first and second predetermined data is at least one of a configuration data or a user data.

6. The UE of one of claim 4, wherein the UE is configured to decide, based on a decision criterion, whether to relay the first or second predetermined data,
   wherein said decision criterion is at least one of a data size, a QoS parameter, a radio bearer parameter, a requested bit rate, the maximum delay, a combined constraint, or a jitter constraint of the predetermined data to be relayed.

7. The UE of claim 1, wherein the UE is configured to receive system information from the base station via the first interface via at least one of a broadcast information on a physical broadcast channel, via system information on a physical data channel, or via a dedicated Radio Resource Control (RRC) message on a physical data channel,
   wherein the system information received from the base station comprises an indicator to support a Group-Management-Functionality and/or a Group Communication Functionality in the cell served by the base station, and/or a system information block with configuration details related to the Group Management Function and/or the Group Communication Function and/or a radio resource configuration message with configuration details related to the UE-Group.

8. The UE of claim 1, wherein the UE is configured to receive one or more response messages from the base station, wherein said one or more response messages comprise at least a portion of the configuration data, and wherein the at least a portion of the configuration data comprises at least system information with configuration details for the intra-group communication within the UE-Group, and/or
   wherein the one or more response messages comprise configuration information for at least one of a transmission and/or reception handling and/or transmission and/or reception resources to be used for the intra-group communication within a UE-Group, a Group Identity assigned to the UE-Group, an uplink control channel for UE-to-Basestation communication, an uplink shared channel for UE-to-Basestation communication, or an uplink random access channel for UE-to-Basestation communication.

9. The UE of claim 1, wherein the UE is configured to transmit control information to the base station, the control information comprising at least one of a status information regarding the intra-group communication within the UE-Group to which the UE belongs, a scheduling request requesting the physical resources for the intra-group communication within the UE-Group and/or for the UE-to-Basestation communication, a channel state information, or a signal strength measurement, or an interference measurement, or a Power Headroom or Power Control Reporting, or a timing advance value, or sensing information, or channel busy ratio, or channel occupancy ratio, or positioning information, or a suggested semi-persistent scheduling pattern, or control information configuring a discontinuous reception cycle (DRX) to be used by UE members of the group.

10. The UE of claim 1, wherein the UE is configured to provide a synchronization and/or physical broadcast channel and/or system information on a sidelink data channel to other UEs within the UE-Group and/or to other UEs outside the UE-Group that are interested in being connected to the UE-Group to which the UE belongs, wherein the synchronization signal and/or physical broadcast channel and/or system information on the sidelink data channel contains a Group Identity, wherein the Group Identity was previously assigned to the UE by the base station via control signaling.

11. The UE of claim 1, wherein the UE is configured to provide control information to the other UEs within the UE-Group, wherein said control information is to announce a Group-Management-Functionality of the UE towards the other UEs.

12. The UE of claim 1, wherein the UE is configured to exchange control data and/or user data via its second interface with at least one or more of the other UEs within the UE-Group, wherein the UE is configured to exchange the control data and/or user data directly with a first other UE, and/or to exchange the control data and/or user data with the first other UE via a second other UE.

13. The UE of claim 1, wherein the UE is configured to receive, via its second interface, a scheduling request information and/or a suggested Semi-Persistent Scheduling Pattern and/or sensing information and/or channel busy ratio, and/or channel occupancy ratio, from at least one of the other UEs within the UE-Group, when said at least one other UE intends to send predetermined data to at least another one of the other UEs within the UE-Group, or when said at least one other UE intends to send predetermined data to the base station via the UE.

14. The UE of claim 1, wherein the UE is configured to send the physical resource assignments for the intra-group communication to at least one of the other UEs within the UE-Group.

15. The UE of claim 1, wherein the UE is configured to receive, via its second interface, a connection setup request message from a foreign UE that is not part of the UE-Group to which the UE belongs, said connection setup request message indicating towards the UE that the foreign UE wants to join the UE-Group to which the UE belongs, wherein the connection setup request message contains at least one of a control information, a UE identity from the foreign UE, a Group Identity of the UE-Group the foreign UE wants to join, a suggested identity within the UE-Group and/or suggested position within the UE-Group and/or a request for at least one of the following: a service, a bearer, a logical channel, a Quality of Service, a data transmission, a data rate for within the UE-Group or for transmission towards the predetermined UE to be relayed to the base station.

16. The UE of claim 15, wherein the UE is configured to send, via its second interface, a connection setup response message to the foreign UE, wherein the connection setup response message comprises control information related to the connection setup,
wherein the control information comprises at least one of
control information about one or more services and/or logical channels and/or data bearer and/or data flows that are to be relayed by the UE to the base station via its first interface and/or via its second interface, or that are to be sent directly from the foreign UE to the base station via its first interface;
control information about a connection state that is to be used by the foreign UE;
control information about an assigned identity and/or an assigned position within the UE-Group;
control information about if paging and/or system information and/or system information updates and/or data packets below a predetermined size are to be relayed by the UE to the base station via its first interface and/or via its second interface, or that are to be sent directly from the foreign UE to the base station via its first interface.

17. A base station for a cellular network, wherein the base station is configured to
communicate with one or more User Equipments—UEs—of a UE-Group,
wherein at least one of the UEs
has a first interface for UE-to-Basestation communication configured to communicate with the base station of the cellular network, and
a second interface for UE-to-UE communication configured to communicate with one or more other UEs of a UE-Group to which the at least one UE belongs,
wherein the at least one UE is configured to receive via its first interface configuration data for configuring its second interface, and configured to send control information to the one or more other UEs for informing them how to configure their respective second interface, and configured to coordinate, via the second interface, an intra-group communication between the one or more other UEs within the UE-Group,
wherein the at least one UE is configured to send a request message to the base station to request the base station to be authorized and/or allowed to coordinate the intra-group communication within the UE-Group and to provide the configuration data that enables the at least one UE to coordinate the intra-group communication within the UE-Group,
wherein the request message comprises at least one of a reconfiguration request message comprising a request to provide system information comprising the configuration data for the intra-group communication within the UE-Group, a service request message, or an interest indication message,
wherein sending the request message is initiated by a user and/or by a car control of the UE and/or by a reception of V2V messages from other UEs within the proximity of the at least one UE, or wherein the at least one UE is configured to decide, based on its battery status and/or its connection to a power supply, whether to send the request message, wherein the base station comprises
- a first mode in which the base station coordinates the intra-group communication with the one or more UEs of the UE-Group,
- and a second mode in which the base station is configured to appoint the at least one UE for coordinating the intra-group communication within the UE-Group.

18. The base station of claim 17, wherein the base station is configured to send configuration data to the appointed at least one UE, wherein said configuration data contains information for the appointed at least one UE how to configure its communication interface for the intra-group communication so as to coordinate the communication between the one or more UEs of the UE-Group,
- wherein the base station is configured to provide to the appointed at least one UE physical resources for the intra-group communication between the one or more UEs of the UE-Group, and
- wherein said physical resources are pre-allocated by the cellular network.

19. A cellular network comprising:
a first User Equipment—UE—for a cellular network, the first UE comprising
- a first interface for UE-to-Basestation communication configured to communicate with a base station of the cellular network, and
- a second interface for UE-to-UE communication configured to communicate with one or more other UEs of a UE-Group to which the first UE belongs,
- wherein the first UE is configured to receive via its first interface configuration data for configuring its second interface, and configured to send control information to the one or more other UEs for informing them how to configure their respective second interface, and configured to coordinate, via the second interface, an intra-group communication between the one or more other UEs within the UE-Group,
- wherein the first UE is configured to send a request message to the base station to request the base station to be authorized and/or allowed to coordinate the intra-group communication within the UE-Group and to provide the configuration data that enables the first UE to coordinate the intra-group communication within the UE-Group,
- wherein the request message comprises at least one of a reconfiguration request message comprising a request to provide system information comprising the configuration data for the intra-group communication within the UE-Group, a service request message, or an interest indication message,
- wherein sending the request message is initiated by a user and/or by a car control of the UE and/or by a reception of V2V messages from other UEs within the proximity of the first UE,
- or wherein the first UE is configured to decide, based on its battery status and/or its connection to a power supply, whether to send the request message,
the cellular network further comprising
a second User Equipment—UE—for the cellular network, the second UE comprising
- a first interface for UE-to-Basestation communication configured to communicate with a base station of the cellular network, and
- a second interface for UE-to-UE communication configured to communicate with one or more other UEs of the UE-Group to which the first and second UE belong,
- wherein the second UE is configured to communicate via its second interface with at least one or more of the other UEs of the UE-Group, wherein the communication is coordinated by the first UE,
and wherein the cellular network further comprises
a base station for the cellular network, wherein the base station is configured to
communicate with one or more User Equipments—UEs—of the UE-Group,
wherein the base station comprises
- a first mode in which the base station coordinates the intra-group communication with the one or more UEs of the UE-Group,
- and a second mode in which the base station is configured to appoint the first UE for coordinating the intra-group communication within the UE-Group.

* * * * *